(12) United States Patent
Tonami

(10) Patent No.: US 6,914,867 B2
(45) Date of Patent: Jul. 5, 2005

(54) REPRODUCING APPARATUS

(75) Inventor: Junichiro Tonami, Yokohama (JP)

(73) Assignee: Victor Company of Japan, Ltd., Yokohama (JP)

( * ) Notice: Subject to any disclaimer, the term of this patent is extended or adjusted under 35 U.S.C. 154(b) by 480 days.

(21) Appl. No.: 10/147,466

(22) Filed: May 17, 2002

(65) Prior Publication Data

US 2003/0117925 A1 Jun. 26, 2003

(30) Foreign Application Priority Data

Dec. 26, 2001 (JP) ........................................ 2001-394878

(51) Int. Cl.$^7$ ............................................. G11B 7/005
(52) U.S. Cl. ............................... 369/59.22; 369/47.35; 369/59.16
(58) Field of Search .......................... 369/59.22, 59.21, 369/47.35, 59.16

(56) References Cited

U.S. PATENT DOCUMENTS

| | | | | | |
|---|---|---|---|---|---|
| 5,459,757 | A | * | 10/1995 | Minuhin et al. | ............ 375/376 |
| 5,729,517 | A | * | 3/1998 | Fujiwara et al. | ......... 369/59.22 |
| 6,445,662 | B1 | * | 9/2002 | Tonami | ................... 369/59.21 |
| 2002/0067677 | A1 | * | 6/2002 | Miyashita et al. | ....... 369/59.16 |
| 2002/0159350 | A1 | * | 10/2002 | Ogura et al. | ............ 369/47.35 |

FOREIGN PATENT DOCUMENTS

| | | |
|---|---|---|
| JP | 7-192270 | 7/1995 |
| JP | 10-106161 | 4/1998 |
| JP | 2001-110146 | 4/2001 |

* cited by examiner

*Primary Examiner*—W. R. Young
*Assistant Examiner*—Lixi Chow
(74) *Attorney, Agent, or Firm*—Louis Woo

(57) ABSTRACT

A signal of a run-length-limited code is reproduced from a recording medium. The reproduced signal is sampled to generate a sampling-resultant signal. An odd-sample signal and an even-sample signal are generated in response to the sampling-resultant signal. A first transversal filter subjects the odd-sample signal to first partial-response waveform equalization to generate an equalization-resultant odd-sample signal. The first partial-response waveform equalization depends on first tap coefficients. The first tap coefficients are controlled on a feedback basis to minimize an error of the equalization-resultant odd-sample signal. A second transversal filter subjects the even-sample signal to second partial-response waveform equalization to generate an equalization-resultant even-sample signal. The second partial-response waveform equalization depends on second tap coefficients. The second tap coefficients are controlled on a feedback basis to minimize an error of the equalization-resultant even-sample signal. The equalization-resultant odd-sample signal is decoded. The equalization-resultant even-sample signal is decoded.

10 Claims, 40 Drawing Sheets

OUTPUT VALUE / INPUT VALUE

FIG. 12

| RLL MODE | PR MODE | 1 | 2 | 3 | 4 | 5 | 6 |
|---|---|---|---|---|---|---|---|
| | | PR(1,1) | PR(1,1,1,1) | PR(1,2,2,1) | PR(1,3,3,1) | PR(2,3,3,2) | PR(3,4,4,3) |
| RLL(1,X) {M1-7, MMVF, MD2} | 2a+2b | | | 6→+3 | 8→+4 | 10→+5 | 14→+7 |
| | a+2b | | | 5→+2 | 7→+3 | 8→+3 | 11→+4 |
| | 2b | | | 4→+1 | 6→+2 | 6→+1 | 8→+1 |
| | a+b | | | 3→0 | 4→0 | 5→0 | 7→0 |
| | 2a | | | 2→−1 | 2→−2 | 4→−1 | 6→−1 |
| | a | | | 1→−2 | 1→−3 | 2→−3 | 3→−4 |
| | 0 | | | 0→−3 | 0→−4 | 0→−5 | 0→−7 |
| | GAIN G | A | A/2 | A/3 | A/4 | A/5 | A/7 |
| RLL(2,X) {EFM, EFMP, M8-15, PR} | 2a+2b | | 4→+2 | 6→+3 | 8→+4 | 10→+5 | 14→+7 |
| | a+2b | 2→+1 | 3→+1 | 5→+2 | 7→+3 | 8→+3 | 11→+4 |
| | a+b | 1→0 | 2→0 | 3→0 | 4→0 | 5→0 | 7→0 |
| | a | 0→−1 | 1→−1 | 1→−2 | 1→−3 | 2→−3 | 3→−4 |
| | 0 | | 0→−2 | 0→−3 | 0→−4 | 0→−5 | 0→−7 |

FIG. 47
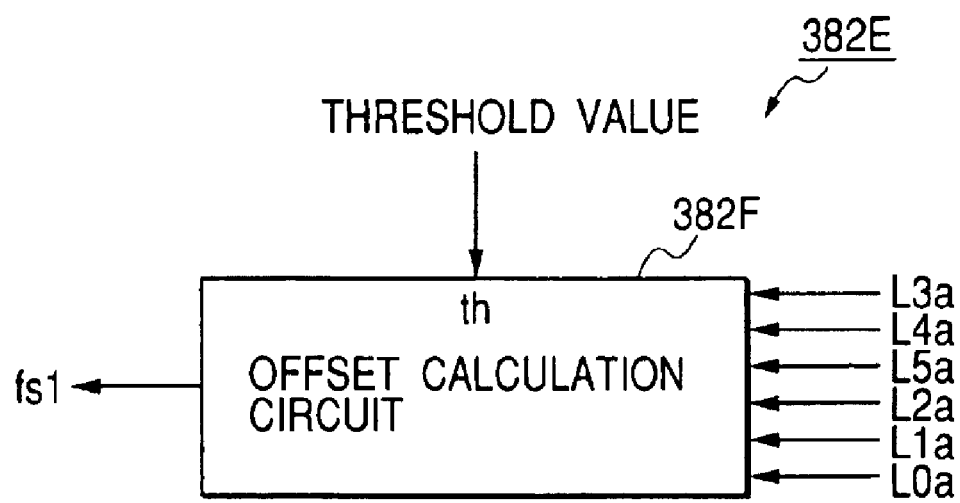
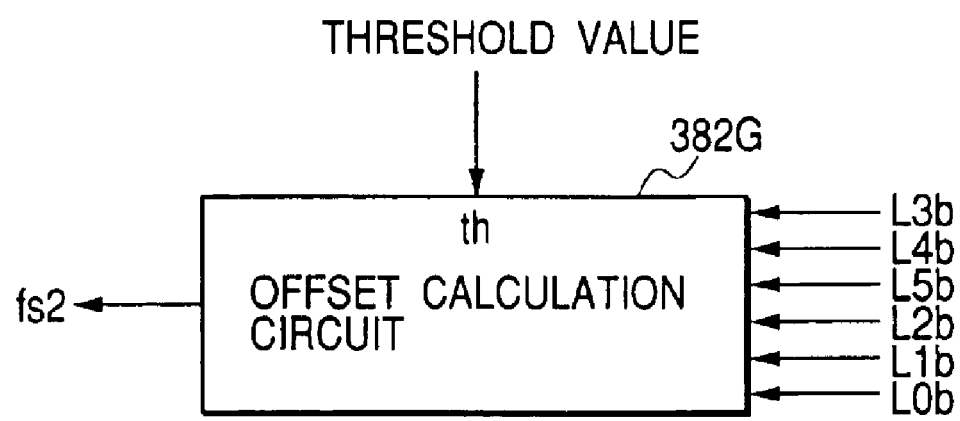

400

REPRODUCING APPARATUS

BACKGROUND OF THE INVENTION

1. Field of the Invention

This invention generally relates to an apparatus for reproducing information from a recording medium such as an optical disc. This invention specifically relates to an information reproducing apparatus including a waveform equalization circuit for processing a reproduced signal of a run-length-limited code. In addition, this invention relates to a decoding apparatus.

2. Description of the Related Art

Japanese patent application publication number 10-106161/1998 discloses an optical information reproducing apparatus based on a PRML (partial response maximum likelihood) system. In the apparatus of Japanese application 10-106161, information of a run-length-limited code is reproduced from an optical disc through a reproducing section, and a transversal filter subjects the reproduced waveform to partial-response equalization depending on tap coefficients. The output signal of the transversal filter is decoded into binary data by a maximum-likelihood decoder. A parameter setting device selects intersymbol-interference imparting values in the partial-response equalization in accordance with the characteristics of the reproduced waveform. Also, the parameter setting device sets the tap coefficients of the transversal filter and a decision point signal level for the maximum-likelihood decoder as parameters in response to the selected intersymbol-interference imparting values.

In the apparatus of Japanese application 10-106161, the parameter setting device includes a memory loaded with parameter-setting reference data. A target after-equalization waveform is determined on the basis of the parameter-setting reference data and the selected intersymbol-interference imparting values. The apparatus of Japanese application 10-106161 premises that the optical disc has predetermined pits (reference pits) representative of the parameter-setting reference data. A reference-data signal is reproduced from the predetermined pits in the optical disc. The tap coefficients of the transversal filter are set to equalize the waveform of the reproduced reference-data signal to the target after-equalization waveform.

In the apparatus of Japanese application 10-106161, the parameter setting device includes an error-rate deciding device which compares the binary data outputted from the maximum-likelihood decoder and the parameter-setting reference data fed from the memory to calculate the rate of bit errors therebetween. The error-rate deciding device judges whether or not the calculated bit error rate is within an allowable range. The selection of intersymbol-interference imparting values are responsive to the result of the judgment by the error-rate deciding device. The tap coefficients of the transversal filter and the decision point signal level for the maximum-likelihood decoder which occur when the calculated bit error rate is within the allowable range are actually used in the partial-response equalization and the decoding procedure.

The apparatus of Japanese patent application 10-106161 fails to implement suitable waveform equalization for a signal reproduced from an optical disc which lacks predetermined pits representative of parameter-setting reference data.

Japanese patent application publication number 7-192270/1995 discloses an apparatus for reproducing a digital signal of a run-length-limited code from an optical disc. The apparatus of Japanese application 7-192270 uses a method suited for a high information recording density. The method in Japanese application 7-192270 performs ternary equalization whose objects are only an amplitude except for points corresponding to a data train provided with a minimum code inverting gap among points just before or just after the inverting position of a code and an amplitude at the inverting position of the code.

In the apparatus of Japanese application 7-192270, a signal is read from an optical disc by an optical head, and the read signal is applied through an amplifier to an equalizer. A decider following the equalizer discriminates the level of the output signal of the equalizer. The decider includes two comparators. The output signals of the comparators are fed to an error calculation circuit as level discrimination results. Since the decider includes the two comparators, the signal processing by the decider is relatively complicated and the level discrimination results provided by the decider tend to be adversely affected by noise and signal distortion.

SUMMARY OF THE INVENTION

It is a first object of this invention to provide an improved reproducing apparatus.

It is a second object of this invention to provide an improved decoding apparatus.

A first aspect of this invention provides a reproducing apparatus comprising first means for reproducing a signal of a run-length-limited code from a recording medium; second means for sampling the signal reproduced by the first means to generate a sampling-resultant signal; third means for generating an odd-sample signal and an even-sample signal in response to the sampling-resultant signal generated by the second means; a first transversal filter subjecting the odd-sample signal generated by the third means to first partial-response waveform equalization to generate an equalization-resultant odd-sample signal, the first partial-response waveform equalization depending on first tap coefficients; a second transversal filter subjecting the even-sample signal generated by the third means to second partial-response waveform equalization to generate an equalization-resultant even-sample signal, the second partial-response waveform equalization depending on second tap coefficients; a first temporary decision device for calculating a temporary decision value of the equalization-resultant odd-sample signal generated by the first transversal filter; a first subtracter for calculating a first difference between the temporary decision value of the equalization-resultant odd-sample signal and an actual value thereof, and generating a first error signal in response to the calculated first difference; a second temporary decision device for calculating a temporary decision value of the equalization-resultant even-sample signal generated by the second transversal filter; a second subtracter for calculating a second difference between the temporary decision value of the equalization-resultant even-sample signal and an actual value thereof, and generating a second error signal in response to the calculated second difference; fourth means for controlling the first tap coefficients of the first transversal filter in response to the first error signal generated by the first subtracter; fifth means for controlling the second tap coefficients of the second transversal filter in response to the second error signal generated by the second subtracter; a first decoder for decoding the equalization-resultant odd-sample signal generated by the first transversal filter; and a second decoder for decoding the equalization-resultant even-sample signal generated by the second transversal filter.

A second aspect of this invention is based on the first aspect thereof, and provides a reproducing apparatus wherein the fourth means and the fifth means comprise means for calculating first basic coefficients in response to the first error signal, means for calculating second basic coefficients in response to the second error signal, means for averaging the calculated first basic coefficients and the calculated second basic coefficients into average tap coefficients, and means for using the average tap coefficients as the first tap coefficients of the first transversal filter and also the second tap coefficients of the second transversal filter.

A third aspect of this invention is based on the first aspect thereof, and provides a reproducing apparatus further comprising sixth means for detecting whether or not a combination of the odd-sample signal and the even-sample signal generated by the third means corresponds to a zero-cross point, and generating 0-point information in response to a result of said detecting, the generated 0-point information including a first 0-point information signal relating to the odd-sample signal and a second 0-point information signal relating to the even-sample signal; a delay circuit for delaying the first and second 0-point information signals by different time intervals to generate a first set of at least three successive 0-point information samples and a second set of at least three successive 0-point information samples; seventh means in the first temporary decision device for calculating the temporary decision value of the equalization-resultant odd-sample signal on the basis of a PR mode signal, an RLL mode signal, the first set of the successive 0-point information samples, and the actual value of the equalization-resultant odd-sample signal, the PR mode signal representing a type of the first partial-response waveform equalization and the second partial-response waveform equalization, the RLL mode signal representing a type of the run-length-limited code; and eighth means in the second temporary decision device for calculating the temporary decision value of the equalization-resultant even-sample signal on the basis of the PR mode signal, the RLL mode signal, the second set of the successive 0-point information samples, and the actual value of the equalization-resultant even-sample signal.

A fourth aspect of this invention is based on the first aspect thereof, and provides a reproducing apparatus further comprising sixth means for detecting whether or not a combination of the equalization-resultant odd-sample signal generated by the first transversal filter and the equalization-resultant even-sample signal generated by the second transversal filter corresponds to a zero-cross point, and generating 0-point information in response to a result of said detecting, the generated 0-point information including a first 0-point information signal relating to the equalization-resultant odd-sample signal and a second 0-point information signal relating to the equalization-resultant even-sample signal; a delay circuit for delaying the first and second 0-point information signals by different time intervals to generate a first set of at least three successive 0-point information samples and a second set of at least three successive 0-point information samples; seventh means in the first temporary decision device for calculating the temporary decision value of the equalization-resultant odd-sample signal on the basis of a PR mode signal, an RLL mode signal, the first set of the successive 0-point information samples, and the actual value of the equalization-resultant odd-sample signal, the PR mode signal representing a type of the first partial-response waveform equalization and the second partial-response waveform equalization, the RLL mode signal representing a type of the run-length-limited code; and eighth means in the second temporary decision device for calculating the temporary decision value of the equalization-resultant even-sample signal on the basis of the PR mode signal, the RLL mode signal, the second set of the successive 0-point information samples, and the actual value of the equalization-resultant even-sample signal.

A fifth aspect of this invention is based on the third aspect thereof, and provides a reproducing apparatus wherein at least one of the PR mode signal and the RLL mode signal remains fixed.

A sixth aspect of this invention is based on the third aspect thereof, and provides a reproducing apparatus wherein the second means, the third means, and the sixth means comprise an A/D converter for periodically sampling the signal reproduced by the first means in response to a system clock signal, and converting a result of said sampling into a digital reproduced signal; re-sampling means for re-sampling the digital reproduced signal in response to a bit clock signal to generate the odd-sample signal and the even-sample signal; and detecting means for detecting whether or not a combination of the odd-sample signal and the even-sample signal generated by the re-sampling means corresponds to a zero-cross point, and generating 0-point information in response to a result of said detecting, the generated 0-point information including the first 0-point information signal relating to the odd-sample signal and the second 0-point information signal relating to the even-sample signal.

A seventh aspect of this invention is based on the third aspect thereof, and provides a reproducing apparatus wherein the type of the partial-response waveform equalization which is represented by the PR mode signal is expressed as PR (a, b, b, a), and the first set is of three successive 0-point information samples while the second set is of three successive 0-point information samples, and wherein each of the first and second temporary decision devices comprises means for calculating a value P on the basis of the related set of the three successive 0-point information samples, the value P being equal to $(a+b)^* \cdot G$ when none of the three successive 0-point information samples corresponds to a zero-cross point, the value P being equal to $(b-a)^* \cdot G$ when each of the three successive 0-point information samples except a central sample corresponds to a zero-cross point and a minimum transition interval represented by the RLL mode signal is equal to "2", the value P being equal to $b^* \cdot G$ when each of the three successive 0-point information samples except a central sample corresponds to a zero-cross point and the minimum transition interval represented by the RLL mode signal is not equal to "2", the value P being equal to $b^* \cdot G$ when only one of the three successive 0-point information samples except a central sample corresponds to a zero-cross point, means for calculating the related temporary decision value on the basis of the calculated value P, and means for setting the related temporary decision value equal to "0" when the central sample among the three successive 0-point information samples corresponds to a zero-cross point, where "*" denotes related values resulting from offset to equalize a central value $(a+b)$ to "0", and G denotes a gain factor.

An eighth aspect of this invention is based on the third aspect thereof, and provides a reproducing apparatus wherein the type of the partial-response waveform equalization which is represented by the PR mode signal is expressed as PR (a, b, b, a), and the first set is of five successive 0-point information samples while the second set is of five successive 0-point information samples, and wherein each of the first and second temporary decision devices comprises means for calculating a value P on the basis of the related set of the five successive 0-point information samples, the value P being equal to (a+b)*·G when none of second, third, and fourth samples among the five successive 0-point information samples corresponds to a zero-cross point, the value P being equal to (b–a)*·G when only second and fourth samples among the five successive 0-point information samples correspond to zero-cross points and a minimum transition interval represented by the RLL mode signal is equal to "2", the value P being equal to b*·G when only second and fourth samples among the five successive 0-point information samples correspond to zero-cross points and the minimum transition interval represented by the RLL mode signal is not equal to "2", the value P being equal to b*·G when only one of second and fourth samples among the five successive 0-point information samples corresponds to a zero-cross point, the value P being equal to b*·G when only first and fourth samples among the five successive 0-point information samples corresponds to a zero-cross point, the value P being equal to b*·G when only second and fifth samples among the five successive 0-point information samples corresponds to a zero-cross point, means for calculating the related temporary decision value on the basis of the calculated value P, and means for setting the related temporary decision value equal to "0" when a central sample among the five successive 0-point information samples corresponds to a zero-cross point, where "*" denotes related values resulting from offset to equalize a central value (a+b) to "0", and G denotes a gain factor.

A ninth aspect of this invention provides a decoding apparatus comprising first means for sampling an input signal to generate a sampling-resultant signal; second means for generating an odd-sample signal and an even-sample signal in response to the sampling-resultant signal generated by the first means; third means for calculating first branch metric values in response to the odd-sample signal generated by the second means; fourth means for calculating second branch metric values in response to the even-sample signal generated by the second means; fifth means for adding the first branch metric values and first path metric values, comparing results of said adding, and selecting ones from said results of said adding in response to results of said comparing to calculate second path metric values and to generate first path memory control signals which depend on said results of said adding and results of said selecting; sixth means for adding the second branch metric values and the second path metric values, comparing results of said adding, and selecting ones from said results of said adding in response to results of said comparing to calculate the first path metric values and to generate second path memory control signals which depend on said results of said adding and results of said selecting; and seventh means for generating decoding-resultant odd-sample data and decoding-resultant even-sample data in response to the first path memory control signals generated by the fifth means and the second path memory control signals generated by the sixth means.

A tenth aspect of this invention is based on the first aspect thereof, and provides a reproducing apparatus wherein the first and second decoders comprise sixth means for calculating first branch metric values in response to the equalization-resultant odd-sample signal generated by the first transversal filter; seventh means for calculating second branch metric values in response to the equalization-resultant even-sample signal generated by the second transversal filter; eighth means for adding the first branch metric values and first path metric values, comparing results of said adding, and selecting ones from said results of said adding in response to results of said comparing to calculate second path metric values and to generate first path memory control signals which depend on said results of said adding and results of said selecting; ninth means for adding the second branch metric values and the second path metric values, comparing results of said adding, and selecting ones from said results of said adding in response to results of said comparing to calculate the first path metric values and to generate second path memory control signals which depend on said results of said adding and results of said selecting; and tenth means for generating decoding-resultant odd-sample data and decoding-resultant even-sample data in response to the first path memory control signals generated by the eighth means and the second path memory control signals generated by the ninth means.

BRIEF DESCRIPTION OF THE DRAWINGS

FIG. 12 is a diagram of the relation among PR (a, b, b, a) characteristics, RLL modes, and temporary decision result values.

FIG. 47 is a block diagram of a portion of an offset calculation block in FIG. 46.

DETAILED DESCRIPTION OF THE INVENTION

First Embodiment

Figure 1:
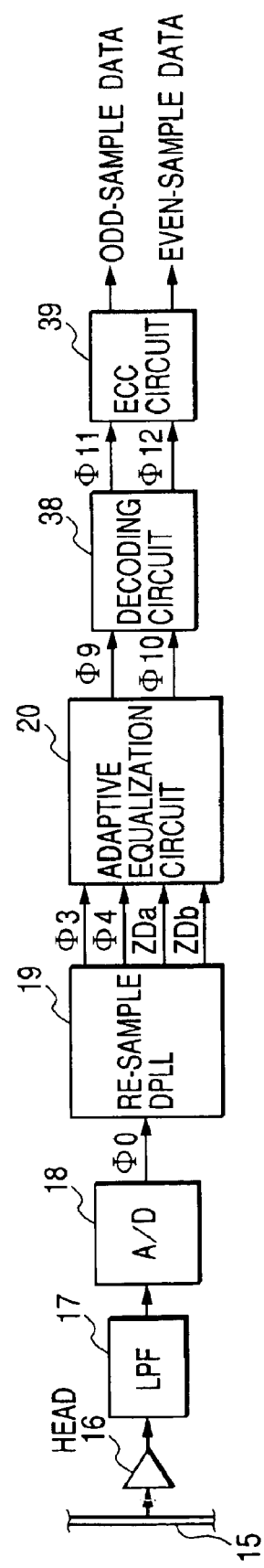
FIG. 1 is a block diagram of a reproducing apparatus according to a first embodiment of this invention.

FIG. 1 shows a reproducing apparatus according to a first embodiment of this invention. With reference to FIG. 1, an optical disc 15 stores a signal of a run-length-limited code at a predetermined high recording density. An optical head 16 reads out the signal of the run-length-limited code from the optical disc 15. The optical head 16 outputs the read-out signal to a low pass filter (LPF) 17. The optical head 16 includes a photodetector, and an amplifier following the photodetector.

The LPF 17 removes high-frequency noise components from the read-out signal. The LPF 17 outputs the resultant signal to an A/D (analog-to-digital) converter 18. The A/D converter 18 changes the output signal of the LPF into a corresponding digital signal $\Phi 0$. Specifically, the A/D converter 18 periodically samples the output signal of the LPF 17 in response to a fixed-frequency system clock signal, and converts every resultant sample into a digital sample. The A/D converter 18 outputs the digital signal $\Phi 0$ to a re-sampling DPLL section 19.

A digital AGC (automatic gain control) circuit may be provided between the A/D converter 18 and the re-sampling DPLL section 19. The AGC circuit subjects the output signal of the A/D converter 18 to automatic gain control for providing a constant signal amplitude on a digital basis. The AGC circuit outputs the resultant digital signal to the re-sampling DPLL section 19. The position of the A/D converter 18 may be between the AGC circuit and the re-sampling DPLL section 19, or between the optical head 16 and the LPF 17.

The re-sampling DPLL section 19 includes a digital PLL (phase locked loop) circuit having a closed loop. The digital PLL circuit re-samples the output signal of the A/D converter 18 (or the output signal of the AGC circuit) in response to a bit clock signal. The re-sampling DPLL section 19 separates the re-sampling-resultant signal into digital signals $\Phi 3$ and $\Phi 4$. A timing related to samples of the output signal of the A/D converter 18 is determined by the system clock signal. A timing related to samples of the digital signals $\Phi 3$ and $\Phi 4$ is determined by the bit clock signal. Samples of the digital signals $\Phi 3$ and $\Phi 4$ have a phase of 180° with respect to the bit clock signal. Thus, samples of the digital signals $\Phi 3$ and $\Phi 4$ are referred to as 180°-phase-point data samples or 180°-phase data samples.

The re-sampling implemented by the re-sampling DPLL section 19 includes at least one of interpolation and decimation designed to generate samples of the re-sampling-resultant signal from samples of the output signal of the A/D converter 18. The re-sampling DPLL section 19 separates samples of the re-sampling-resultant signal into odd-numbered samples and even-numbered samples. The odd-numbered samples compose the digital signal $\Phi 3$ which is also referred to as the odd-sample signal $\Phi 3$. The even-numbered samples compose the digital signal $\Phi 4$ which is also referred to as the even-sample signal $\Phi 4$. The re-sampling DPLL section 19 outputs the digital signals $\Phi 3$ and $\Phi 4$ to an adaptive equalization circuit 20.

The re-sampling DPLL section 19 includes an interpolator which estimates every sample at a phase point of 0° with respect to the bit clock signal from the output signal of the A/D converter 18. Thus, the interpolator generates a sequence of 0°-phase-point data samples. The re-sampling DPLL section 19 also includes a zero-cross detector which senses every point (every zero-cross point) at which the sequence of 0°-phase-point data samples crosses a zero level. The sensing of every zero-cross point is unit of bits. The zero-cross detector generates 0-point information representative of every sensed zero-cross point. Specifically, the zero-cross detector decides whether or not every 0°-phase-point data sample corresponds to a zero-cross point. The zero-cross detector generates 0-point information in response to the result of the decision. In the re-sampling DPLL section 19, the timing of the re-sampling or the frequency and phase of the re-sampling are locked in response to the 0-point information so that the levels represented by zero-cross-point-corresponding samples of the digital signals Φ3 and Φ4 will be equal to "0". The 0-point information generated by the zero-cross detector includes 0-point information ZDa corresponding to the odd-sample signal Φ3 and 0-point information ZDb corresponding to the even-sample signal Φ4. The re-sampling DPLL section 19 outputs the odd-sample 0-point information ZDa and the even-sample 0-point information ZDb to the adaptive equalization circuit 20.

Figure 2:
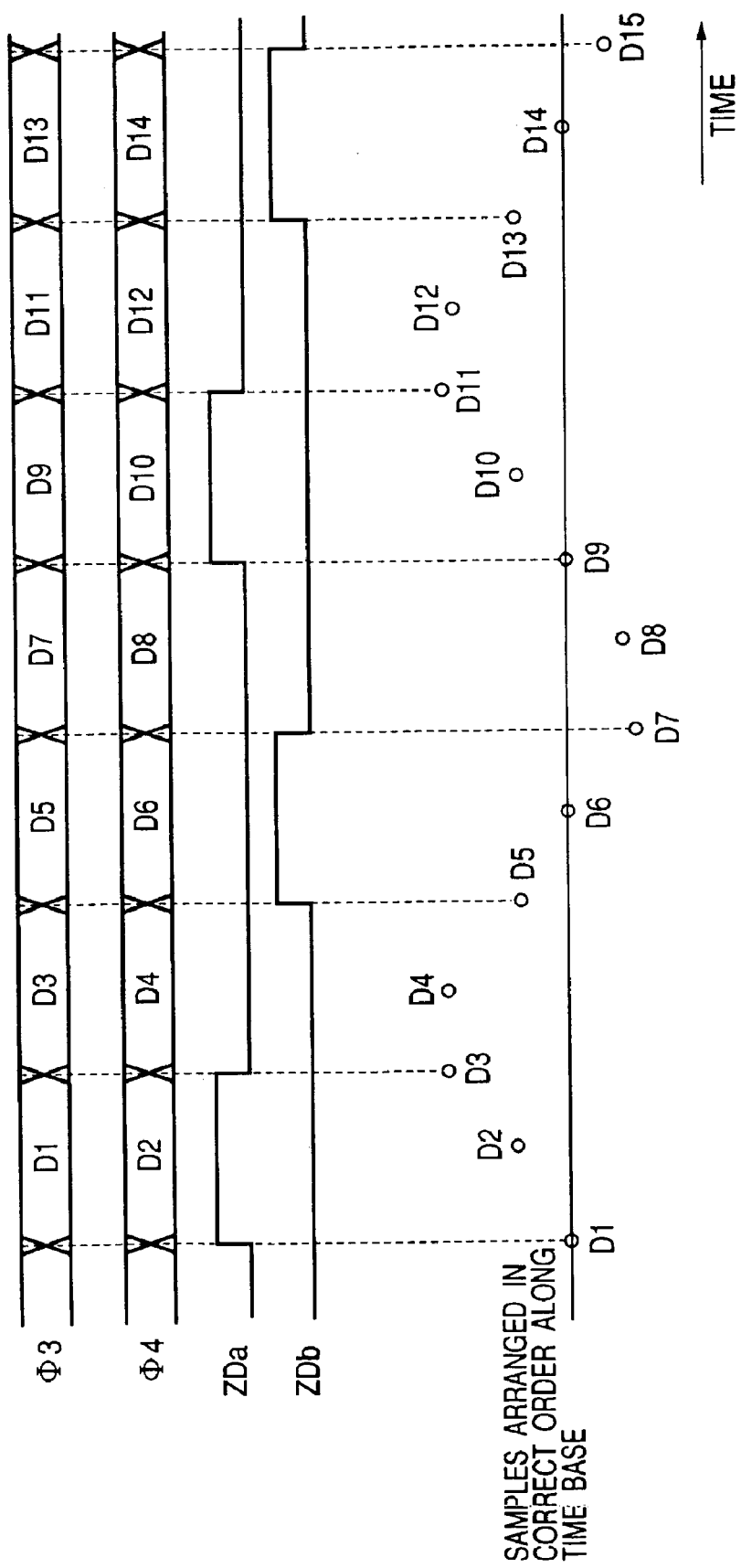
FIG. 2 is a time-domain diagram of an odd-sample signal Φ3, an even-sample signal Φ4, odd-sample 0-point information ZDa, even-sample 0-point information ZDb, and a sequence of samples of the signals Φ3 and Φ4 which occur in the reproducing apparatus of FIG. 1.

As shown in FIG. 2, each of the digital signals Φ3 and Φ4 outputted from the re-sampling DPLL section 19 to the adaptive equalization circuit 20 is updated at timings corresponding to samples (D1, D3, D5, . . . ) of the odd-sample signal Φ3. Also, the odd-sample 0-point information ZDa and the even-sample 0-point information ZDb can be updated at timings corresponding to samples (D1, D3, D5, . . . ) of the odd-sample signal Φ3. The odd-sample 0-point information ZDa is binary. The odd-sample 0-point information ZDa has a rising edge at a moment equal to the time position of a sample (D1 or D9) of the odd-sample signal Φ3 which corresponds to a zero-cross point. The odd-sample 0-point information ZDa returns to a low-level state at a moment equal to the time position of a later sample (D3 or D11) of the odd-sample signal Φ3 which disagrees with a zero-cross point. The even-sample 0-point information ZDb is binary. The even-sample 0-point information ZDb has a rising edge at a moment immediately before the time position of a sample (D6 or D14) of the even-sample signal Φ4 which corresponds to a zero-cross point. The even-sample 0-point information ZDb returns to a low-level state at a moment immediately after the time position of a sample (D6 or D14) of the even-sample signal Φ4 which corresponds to a zero-cross point.

Figure 3:
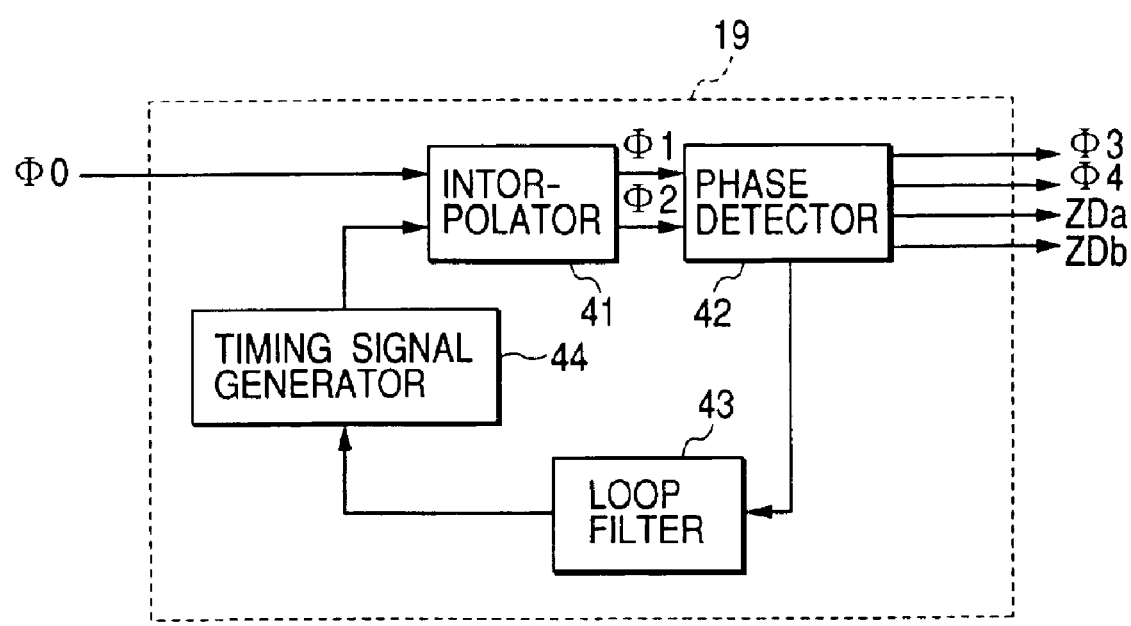
FIG. 3 is a block diagram of a re-sampling DPLL section 19 in FIG. 1.

As shown in FIG. 3, the re-sampling DPLL section 19 includes an interpolator 41, a phase detector 42, a loop filter 43, and a timing signal generator 44 which are connected in a closed loop in that order. The interpolator 41 receives the output signal Φ0 of the A/D converter 18. In addition, the interpolator 41 receives data point phase information and the bit clock signal from the timing signal generator 44. The interpolator 41 estimates 0°-phase-point data samples from samples of the output signal of the A/D converter 18 through interpolation responsive to the data point phase information and the bit clock signal. Here, "phase" is defined relative to the bit clock signal. The interpolator 41 separates the estimated 0°-phase-point data samples into first alternate 0°-phase samples Φ1 and second alternate 0°-phase samples Φ2. The interpolator 41 outputs the first alternate 0°-phase samples Φ1 and the second alternate 0°-phase samples Φ2 to the phase detector 42.

The interpolator 41 may estimates intermediate samples from actual samples of the output signal of the A/D converter 18 through interpolation. In this case, the interpolator 41 places the estimated intermediate samples between the actual samples of the output signal of the A/D converter 18 to generate a first interpolation-resultant signal. The interpolator 41 estimates 0°-phase-point data samples from samples of the first interpolation-resultant signal through interpolation responsive to the data point phase information and the bit clock signal.

In the re-sampling DPLL section 19, the phase detector 42 generates 180°-phase-point data samples from the 0°-phase-point data samples. Specifically, the phase detector 42 calculates a mean of a current 0°-phase-point data sample and an immediately preceding 0°-phase-point data sample, and uses the calculated mean as a current 180°-phase-point data sample. The phase detector 42 separates the 180°-phase-point data samples into odd-numbered samples and even-numbered samples. The odd-numbered samples compose the digital signal (odd-sample signal) Φ3. The even-numbered samples compose the digital signal (even-sample signal) Φ4. The phase detector 42 outputs the odd-sample signal Φ3 and the even-sample signal Φ4 to the adaptive equalization circuit 20. In addition, the phase detector 42 senses zero-cross points from the 0°-phase-point data samples. Furthermore, the phase detector 42 detects a phase error in response to each of the sensed zero-cross points. Specifically, the phase detector 42 senses a zero-cross point by referring to a current 0°-phase-point data sample and an immediately preceding 0°-phase-point data sample. When a zero-cross point is sensed, the phase detector 42 multiplies the polarity of the immediately preceding 0°-phase-point data sample by a mean of the current 0°-phase-point data sample and the immediately preceding 0°-phase-point data sample. The phase detector 42 uses the multiplication result as a phase error. The phase detector 42 generates 0-point information representing the sensed zero-cross points. The 0-point information generated by the phase detector 42 includes 0-point information ZDa corresponding to the odd-sample signal Φ3 and 0-point information ZDb corresponding to the even-sample signal Φ4. Specifically, the 0-point information ZDa represents which of samples of the digital signal Φ3 correspond to sensed zero-cross points respectively. The 0-point information ZDb represents which of samples of the digital signal Φ4 correspond to sensed zero-cross points respectively. The phase detector 42 outputs the odd-sample 0-point information ZDa and the even-sample 0-point information ZDb to the adaptive equalization circuit 20. The phase detector 42 outputs a signal representative of the phase error to the loop filter 43. The loop filter 43 integrates the phase error signal. The loop filter 43 outputs the integration-resultant signal to the timing signal generator 44. The timing signal generator 44 produces the data point phase information and the bit clock signal in response to the output signal of the loop filter 43. The timing signal generator 44 feeds the data point phase information and the bit clock signal to the interpolator 41. Also, the timing signal generator 44 feeds the bit clock signal to other devices and circuits within the reproducing apparatus.

With reference back to FIG. 1, the adaptive equalization circuit 20 receives the odd-sample signal Φ3, the even-sample signal Φ4, the odd-sample 0-point information ZDa, and the even-sample 0-point information ZDb from the re-sampling DPLL section 19. The adaptive equalization circuit 20 subjects the odd-sample signal Φ3 to automatic waveform equalization in response to the odd-sample 0-point information ZDa and the even-sample 0-point information ZDb. The automatic waveform equalization corresponds to a process of providing the signal in question with a partial-response (PR) characteristic. The adaptive equalization circuit 20 outputs the equalization-resultant odd-sample signal Φ9 to a decoding circuit 38. In addition, the adaptive equalization circuit 20 subjects the even-sample signal Φ4 to automatic waveform equalization in response to the even-sample 0-point information ZDb and the odd-sample 0-point information ZDa. The automatic waveform equalization corresponds to a process of providing the signal in question with a partial-response (PR) characteristic. The adaptive equalization circuit 20 outputs the equalization-resultant even-sample signal Φ10 to the decoding circuit 38.

The decoding circuit 38 recovers original odd-sample data Φ11 from the equalization-resultant odd-sample signal Φ9 through a viterbi decoding procedure. The decoding circuit 38 outputs the recovered odd-sample data Φ11 to an ECC (error checking and correcting) circuit 39. In addition, the decoding circuit 38 recovers original even-sample data Φ12 from the equalization-resultant even-sample signal Φ10 through the viterbi decoding procedure. The decoding circuit 38 outputs the recovered even-sample data Φ12 to the ECC circuit 39.

The decoding circuit 38 has a first circuit for the odd-sample data Φ11 and a second circuit for the even-sample data Φ12. The first circuit and the second circuit are similar to each other. Only the first circuit will be explained below in detail. For the odd-sample data Φ11, the decoding circuit 38 includes a memory loaded with a plurality of candidate recovered data pieces. Also, the decoding circuit 38 includes a section for calculating branch metric values from samples of the output signal Φ9 of the adaptive equalization circuit 20. Furthermore, the decoding circuit 38 includes a section for accumulating the branch metric values into path metric values respectively. The path metric values relate to the candidate recovered data pieces respectively. In addition, the decoding circuit 38 includes a section for detecting the minimum value among the path metric values, and generating a selection signal corresponding to the detected minimum path metric value. The selection signal is applied to the memory. One of the candidate recovered data pieces which corresponds to the minimum path metric value is elected in response to the selection signal, being outputted from the memory as the recovered data Φ11.

It should be noted that each of the first and second circuits in the decoding circuit 38 may be of a known decoding structure.

A first example of the ECC circuit 39 operates as follows. The ECC circuit 39 extracts a first error correction code from the recovered data Φ11 outputted by the decoding circuit 38. The ECC circuit 39 corrects errors in the recovered data Φ11 in response to the first error correction code to generate error-free odd-sample data. The ECC circuit 39 outputs the error-free odd-sample data. In addition, The ECC circuit 39 extracts a second error correction code from the recovered data Φ12 outputted by the decoding circuit 38. The ECC circuit 39 corrects errors in the recovered data Φ12 in response to the second error correction code to generate error-free even-sample data. The ECC circuit 39 outputs the error-free even-sample data.

A second example of the ECC circuit 39 operates as follows. The ECC circuit 39 extracts an error correction code from the recovered data Φ11 and Φ12 outputted by the decoding circuit 38. The ECC circuit 39 corrects errors in the recovered data Φ11 and Φ12 in response to the error correction code. The ECC circuit 39 separates the resultant recovered data into error-free odd-sample data and error-free even-sample data. The ECC circuit 39 outputs the error-free odd-sample data and the error-free even-sample data.

Figure 4:
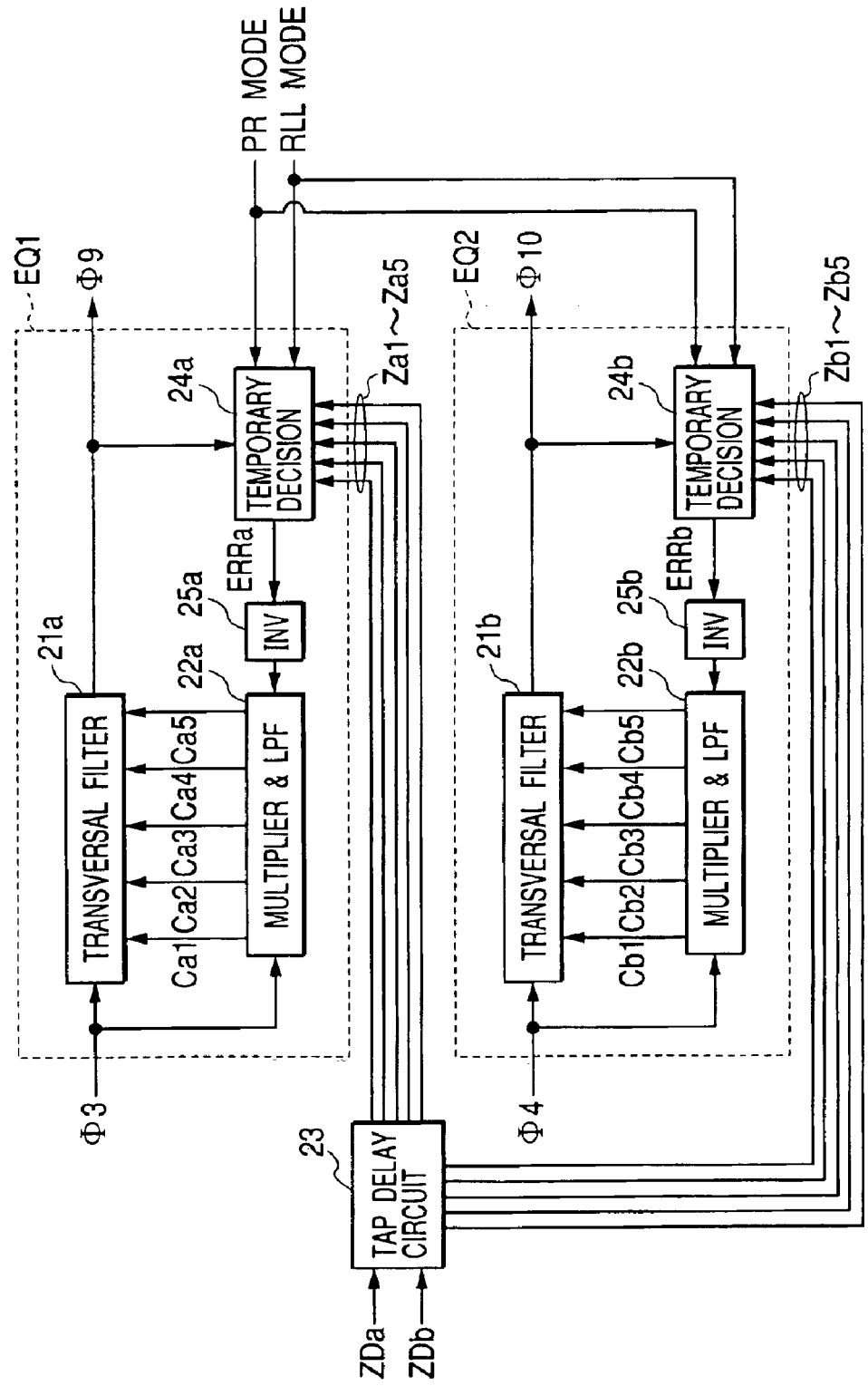
FIG. 4 is a block diagram of an adaptive equalization circuit in FIG. 1.

As shown in FIG. 4, the adaptive equalization circuit 20 includes equalizers EQ1 and EQ2, and a tap delay circuit 23. The equalizers EQ1 and EQ2 are similar to each other in structure and operation. The equalizer EQ1 has a transversal filter 21a, a multiplier and LPF (low pass filter) section 22a, a temporary decision circuit 24a, and an inverter 25a. The transversal filter 21a receives the odd-sample signal Φ3 from the re-sampling DPLL section 19 (see FIG. 1). The transversal filter 21a is connected to the multiplier and LPF section 22a, the temporary decision circuit 24a, and the decoding circuit 38 (see FIG. 1). The temporary decision circuit 24a is connected to the inverter 25a. The inverter 25a is connected to the multiplier and LPF section 22a. The equalizer EQ2 has a transversal filter 21b, a multiplier and LPF section 22b, a temporary decision circuit 24b, and an inverter 25b. The transversal filter 21b receives the even-sample signal Φ4 from the re-sampling DPLL section 19. The transversal filter 21b is connected to the multiplier and LPF section 22b, the temporary decision circuit 24b, and the decoding circuit 38. The temporary decision circuit 24b is connected to the inverter 25b. The inverter 25b is connected to the multiplier and LPF section 22b. The tap delay circuit 23 receives the odd-sample 0-point information ZDa and the even-sample 0-point information ZDb from the re-sampling DPLL section 19. The tap delay circuit 23 is connected to the temporary decision circuits 24a and 24b.

The transversal filter 21a subjects the odd-sample signal Φ3 to PR waveform equalization responsive to tap coefficients Ca1, Ca2, Ca3, Ca4, and Ca5. The multiplier and LPF section 22a varies the tap coefficients Ca1–Ca5 in response to an output signal of the inverter 25a. The tap delay circuit 23 defers or delays the odd-sample 0-point information ZDa and the even-sample 0-point information ZDb by a plurality of different time intervals, and thereby converts the odd-sample 0-point information ZDa and the even-sample 0-point information ZDb into a set of different tap delayed signals Za1, Za2, Za3, Za4, and Za5 and a set of different tap delayed signals Zb1, Zb2, Zb3, Zb4, and Zb5. The tap delay circuit 23 outputs the set of the tap delayed signals Za1–Za5 to the temporary decision circuit 24a. The tap delay circuit 23 outputs the set of the tap delayed signals Zb1–Zb5 to the temporary decision circuit 24b. The temporary decision circuit 24a receives the output signal of the transversal filter 21a. The temporary decision circuit 24a generates an error signal ERRa on the basis of the output signal of the transversal filter 21a, the tap delayed signals Za1–Za5 from the tap delay circuit 23, an RLL (run-length-limited) mode signal, and a PR (partial-response) mode signal. The temporary decision circuit 24a outputs the error signal ERRa to the inverter 25a. The device 25a inverts the error signal ERRa in polarity. The inverter 25a causes negative feedback. The inverter 25a outputs the inversion-resultant error signal to the multiplier and LPF section 22a.

The transversal filter 21b subjects the even-sample signal Φ4 to PR waveform equalization responsive to tap coefficients Cb1, Cb2, Cb3, Cb4, and Cb5. The multiplier and LPF section 22b varies the tap coefficients Cb1–Cb5 in response to an output signal of the inverter 25b. As previously mentioned, the tap delay circuit 23 outputs the set of the tap delayed signals Zb1–Zb5 to the temporary decision circuit 24b. The temporary decision circuit 24b receives the output signal of the transversal filter 21b. The temporary decision circuit 24b generates an error signal ERRb on the basis of the output signal of the transversal filter 21b, the tap delayed signals Zb1–Zb5 from the tap delay circuit 23, the RLL mode signal, and the PR mode signal. The temporary decision circuit 24b outputs the error signal ERRb to the inverter 25b. The device 25b inverts the error signal ERRb in polarity. The inverter 25b causes negative feedback. The inverter 25b outputs the inversion-resultant error signal to the multiplier and LPF section 22b.

The combination of the transversal filter 21a and the multiplier and LPF section 22a is similar to the combination of the transversal filter 21b and the multiplier and LPF section 22b. Only the combination of the transversal filter 21a and the multiplier and LPF section 22a will be explained below in detail.

Figure 5:
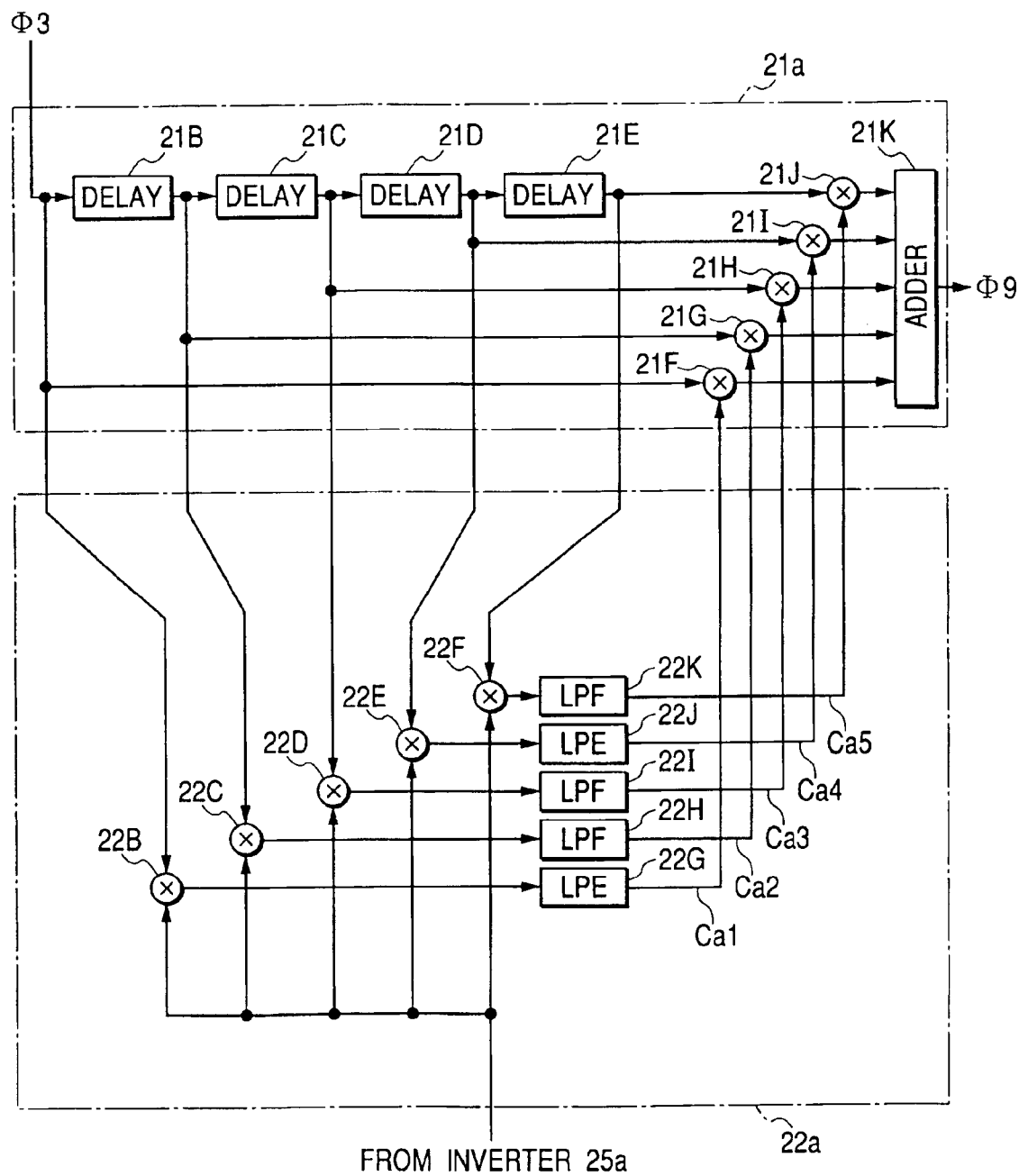
FIG. 5 is a block diagram of a transversal filter and a multiplier and LPF section in FIG. 4.

As shown in FIG. 5, the transversal filter 21a includes delay circuits 21B, 21C, 21D, and 21E, multipliers 21F, 21G, 21H, 21I, and 21J, and an adder 21K.

The delay circuits 21B, 21C, 21D, and 21E are connected in cascade in that order. The input terminal of the delay circuit 21B is subjected to the odd-sample signal Φ3 outputted from the re-sampling DPLL section 19 (see FIG. 1). Also, a first input terminal of the multiplier 21F is subjected to the odd-sample signal Φ3. The input terminal of the delay circuit 21B is connected to the multiplier and LPF section 22a as a first tap in the transversal filter 21a. The output terminals of the delay circuits 21B, 21C, 21D, and 21E form second, third, fourth, and fifth taps in the transversal filter 21a, respectively. The output terminals of the delay circuits 21B, 21C, 21D, and 21E are connected to the multiplier and LPF section 22a. Also, the output terminals of the delay circuits 21B, 21C, 21D, and 21E are connected to first input terminals of the multipliers 21G, 21H, 21I, and 21J, respectively. Second input terminals of the multipliers 21F, 21G, 21H, 21I, and 21J are connected to the multiplier and LPF section 22a. The output terminals of the multipliers 21F, 21G, 21H, 21I, and 21J are connected to input terminals of the adder 21K. The output terminal of the adder 21K is connected to the decoding circuit 38 and the temporary decision circuit 24a.

As shown in FIG. 5, the multiplier and LPF section 22a includes multipliers 22B, 22C, 22D, 22E, and 22F, and low pass filters 22G, 22H, 22I, 22J, and 22K.

A first input terminal of the multiplier 22B is connected to the input terminal of the delay circuit 21B within the transversal filter 21a, that is, the first tap within the transversal filter 21a. Thus, the first input terminal of the multiplier 22B is subjected to the odd-sample signal Φ3. First input terminals of the multipliers 22C, 22D, 22E, and 22F are connected to the output terminals of the delay circuits 21B, 21C, 21D, and 21E within the transversal filter 21a, respectively. In other words, the first input terminals of the multipliers 22C, 22D, 22E, and 22F are connected to the second, third, fourth, and fifth taps within the transversal filter 21a, respectively. Second input terminals of the multipliers 22B, 22C, 22D, 22E, and 22F are connected to the output terminal of the inverter 25a. The output terminals of the multipliers 22B, 22C, 22D, 22E, and 22F are connected to the input terminals of the low pass filters 22G, 22H, 22I, 22J, and 22K, respectively. The output terminals of the low pass filters 22G, 22H, 22I, 22J, and 22K are connected to the second input terminals of the multipliers 21F, 21G, 21H, 21I, and 21J within the transversal filter 21a, respectively.

In the transversal filter 21a, the odd-sample signal Φ3 outputted from the re-sampling DPLL section 19 successively passes through the delay circuits 21B, 21C, 21D, and 21E while being deferred thereby. Each of the delay circuits 21B, 21C, 21D, and 21E provides a predetermined delay corresponding to a 2-sample interval (a 2-bit-corresponding interval). The odd-sample signal Φ3 outputted from the re-sampling DPLL section 19 is also applied to the multiplier 21F. The output signals of the delay circuits 21B, 21C, 21D, and 21E are applied to the multipliers 21G, 21H, 21I, and 21J, respectively. The multipliers 21F, 21G, 21H, 21I, and 21J receive output signals of the multiplier and LPF section 22 which represent tap coefficients Ca1, Ca2, Ca3, Ca4, and Ca5 respectively. The tap coefficients Ca1–Ca5 correspond to waveform equalization coefficients. The device 21F multiplies the odd-sample signal Φ3 and the related tap coefficient Ca1, and outputs the multiplication-resultant signal to the adder 21K. The device 21G multiplies the output signal of the delay circuit 21B and the related tap coefficient Ca2, and outputs the multiplication-resultant signal to the adder 21K. The device 21H multiplies the output signal of the delay circuit 21C and the related tap coefficient Ca3, and outputs the multiplication-resultant signal to the adder 21K. The device 21I multiplies the output signal of the delay circuit 21D and the related tap coefficient Ca4, and outputs the multiplication-resultant signal to the adder 21K. The device 21J multiplies the output signal of the delay circuit 21E and the related tap coefficient Ca5, and outputs the multiplication-resultant signal to the adder 21K. The device 21K adds up the output signals of the multipliers 21F, 21G, 21H, 21I, and 21J into the equalization-resultant odd-sample signal Φ9.

As previously mentioned, the multipliers 22B, 22C, 22D, 22E, and 22F in the multiplier and LPF section 22a receive the output signal of the inverter 25a. As will be made clear later, the output signal of the inverter 25a indicates an amplitude error related to the output signal of the transversal filter 21a. The input signal to the device 21B and the output signals from the devices 21B, 21C, 21D, and 21E within the transversal filter 21a are applied to the multipliers 22B, 22C, 22D, 22E, and 22F within the multiplier and LPF section 22a as tap output signals, respectively. The devices 22B, 22C, 22D, 22E, and 22F multiply the respective tap output signals of the transversal filter 21a by the amplitude error signal fed from the inverter 25a. The multipliers 22B, 22C, 22D, 22E, and 22F output the multiplication-resultant signals to the low pass filters 22G, 22H, 22I, 22J, and 22K, respectively. The low pass filters 22G, 22H, 22I, 22J, and 22K remove high-frequency components from the output signals of the multipliers 22B, 22C, 22D, 22E, and 22F, and thereby process the output signals of the multipliers 22B, 22C, 22D, 22E, and 22F into signals representing the tap coefficients Ca1, Ca2, Ca3, Ca4, and Ca5, respectively. The low pass filters 22G, 22H, 22I, 22J, and 22K output the tap coefficient signals to the multipliers 21F, 21G, 21H, 21I, and 21J within the transversal filter 21a, respectively.

Figure 6:
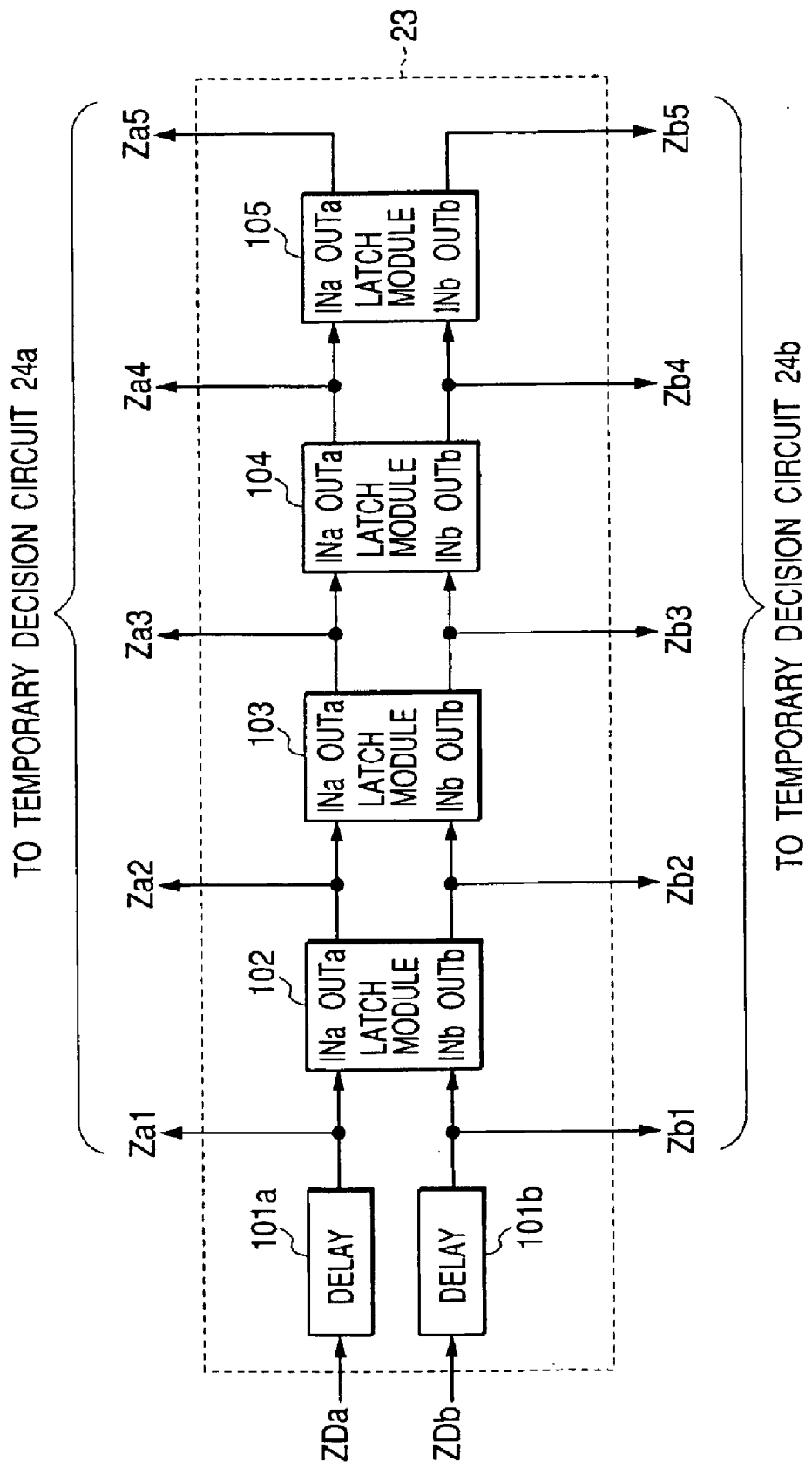
FIG. 6 is a block diagram of a tap delay circuit in FIG. 4.

As shown in FIG. 6, the tap delay circuit 23 includes delay elements 101a and 101b, and latch modules 102, 103, 104, and 105. The delay element 101a receives the odd-sample 0-point information ZDa from the re-sampling DPLL section 19 (see FIG. 1). The delay element 101b receives the even-sample 0-point information ZDb from the re-sampling DPLL section 19. The delay element 101a is connected with the latch module 102 and the temporary decision circuit 24a. The latch modules 102, 103, 104, and 105 are connected in cascade in that order. The output sides of the latch modules 102–105 are connected with the temporary decision circuits 24a and 24b.

Specifically, each of the latch modules 102–105 has a first input terminal INa, a second input terminal INb, a first output terminal OUTa, and a second output terminal OUTb. The first input terminal INa of the latch module 102 is connected with the output terminal of the delay element 101a. The second input terminal INb of the latch module 102 is connected with the output terminal of the delay element 101b. The first output terminal OUTa of the latch module 102 is connected with the first input terminal INa of the latch module 103 and also the temporary decision circuit 24a. The second output terminal OUTb of the latch module 102 is connected with the second input terminal INb of the latch module 103 and also the temporary decision circuit 24b. The first output terminal OUTa of the latch module 103 is connected with the first input terminal INa of the latch module 104 and also the temporary decision circuit 24a. The second output terminal OUTb of the latch module 103 is connected with the second input terminal INb of the latch module 104 and also the temporary decision circuit 24b. The first output terminal OUTa of the latch module 104 is connected with the first input terminal INa of the latch module 105 and also the temporary decision circuit 24a. The second output terminal OUTb of the latch module 104 is connected with the second input terminal INb of the latch module 105 and also the temporary decision circuit 24b. The first output terminal OUTa of the latch module 105 is connected with the temporary decision circuit 24a. The second output terminal OUTb of the latch module 105 is connected with the temporary decision circuit 24b.

Figure 7:
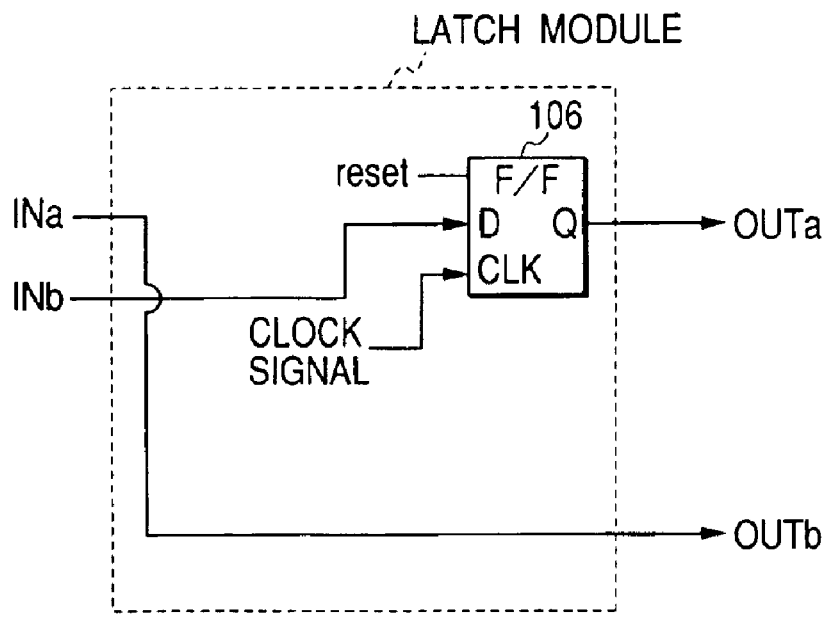
FIG. 7 is a block diagram of a latch module in FIG. 6.

The latch modules 102–105 are similar in structure. One latch module will be explained below in detail. As shown in FIG. 7, a latch module includes a D flip-flop 106. The system clock signal is applied to the clock terminal of the D flip-flop 106. A clock signal resulting from frequency-halving the bit clock signal is applied to the enable terminal (not shown) of the D flip-flop 106. A reset signal is applied to the clear terminal of the D flip-flop 106. The first input terminal INa of the latch module is directly connected to the second output terminal OUTb thereof. Thus, a signal applied to the first input terminal INa of the latch module propagates to the second output terminal OUTb thereof without being delayed. The second input terminal INb of the latch module is connected with the data input terminal of the D flip-flop 106. The data output terminal of the D flip-flop 106 is connected with the first output terminal OUTa of the latch module. The D flip-flop 106 functions to delay a signal by a time interval equal to two periods of the bit clock signal. Accordingly, a signal applied to the second input terminal INb of the latch module propagates to the first output terminal OUTa thereof while being delayed by the D flip-flop 106.

With reference back to FIG. 6, the delay element 101a operates to adjust a delay time of the odd-sample 0-point information ZDa. Specifically, the delay element 101a defers the odd-sample 0-point information ZDa by a fixed time interval or an adjustable time interval. The delay element 101a outputs the resultant signal to the temporary decision circuit 24a and also the first input terminal INa of the latch module 102 as a first tap delayed signal Za1. The delay element 101b operates to adjust a delay time of the even-sample 0-point information ZDb. The delay element 101b defers the even-sample 0-point information ZDb by a fixed time interval or an adjustable time interval. The delay element 101b outputs the resultant signal to the temporary decision circuit 24b and also the second input terminal INb of the latch module 102 as a first tap delayed signal Zb1. The latch module 102 transmits the first tap delayed signal Za1 to its second output terminal OUTb without providing a delay thereto. The first tap delayed signal Za1 which reaches the second output terminal OUTb of the latch module 102 constitutes a second tap delayed signal Zb2. The latch module 102 outputs the second tap delayed signal Zb2 to the temporary decision circuit 24b and also the second input terminal INb of the latch module 103. The D flip-flop 106 in the latch module 102 delays the first tap delayed signal Zb1 to get a second tap delayed signal Za2 which appears at the first output terminal OUTa of the latch module 102. The latch module 102 outputs the second tap delayed signal Za2 to the temporary decision circuit 24a and also the first input terminal INa of the latch module 103. The latch module 103 transmits the second tap delayed signal Za2 to its second output terminal OUTb without providing a delay thereto. The second tap delayed signal Za2 which reaches the second output terminal OUTb of the latch module 103 constitutes a third tap delayed signal Zb3. The latch module 103 outputs the third tap delayed signal Zb3 to the temporary decision circuit 24b and also the second input terminal INb of the latch module 104. The D flip-flop 106 in the latch module 103 delays the second tap delayed signal Zb2 to get a third tap delayed signal Za3 which appears at the first output terminal OUTa of the latch module 103. The latch module 103 outputs the third tap delayed signal Za3 to the temporary decision circuit 24a and also the first input terminal INa of the latch module 104. The latch module 104 transmits the third tap delayed signal Za3 to its second output terminal OUTb without providing a delay thereto. The third tap delayed signal Za3 which reaches the second output terminal OUTb of the latch module 104 constitutes a fourth tap delayed signal Zb4. The latch module 104 outputs the fourth tap delayed signal Zb4 to the temporary decision circuit 24b and also the second input terminal INb of the latch module 105. The D flip-flop 106 in the latch module 104 delays the third tap delayed signal Zb3 to get a fourth tap delayed signal Za4 which appears at the first output terminal OUTa of the latch module 104. The latch module 104 outputs the fourth tap delayed signal Za4 to the temporary decision circuit 24a and also the first input terminal INa of the latch module 105. The latch module 105 transmits the fourth tap delayed signal Za4 to its second output terminal OUTb without providing a delay thereto. The fourth tap delayed signal Za4 which reaches the second output terminal OUTb of the latch module 105 constitutes a fifth tap delayed signal Zb5. The latch module 105 outputs the fifth tap delayed signal Zb5 to the temporary decision circuit 24b. The D flip-flop 106 in the latch module 105 delays the fourth tap delayed signal Zb4 to get a fifth tap delayed signal Za5 which appears at the first output terminal OUTa of the latch module 105. The latch module 105 outputs the fifth tap delayed signal Za5 to the temporary decision circuit 24a.

The tap delayed signal Za2 results from delaying the tap delayed signal Zb1 by two periods of the bit clock signal. The tap delayed signal Za3 results from delaying the tap delayed signal Za1 by two periods of the bit clock signal. The tap delayed signal Za4 results from delaying the tap delayed signal Zb1 by four periods of the bit clock signal. The tap delayed signal Za5 results from delaying the tap delayed signal Za1 by four periods of the bit clock signal. Accordingly, the tap delayed signals Za1, Za2, Za3, Za4, and Za5 correspond to five successive signal samples temporally spaced at 1-bit-corresponding intervals. Similarly, the tap delayed signals Zb1, Zb2, Zb3, Zb4, and Zb5 correspond to five successive signal samples temporally spaced at 1-bit-corresponding intervals.

Figure 8:
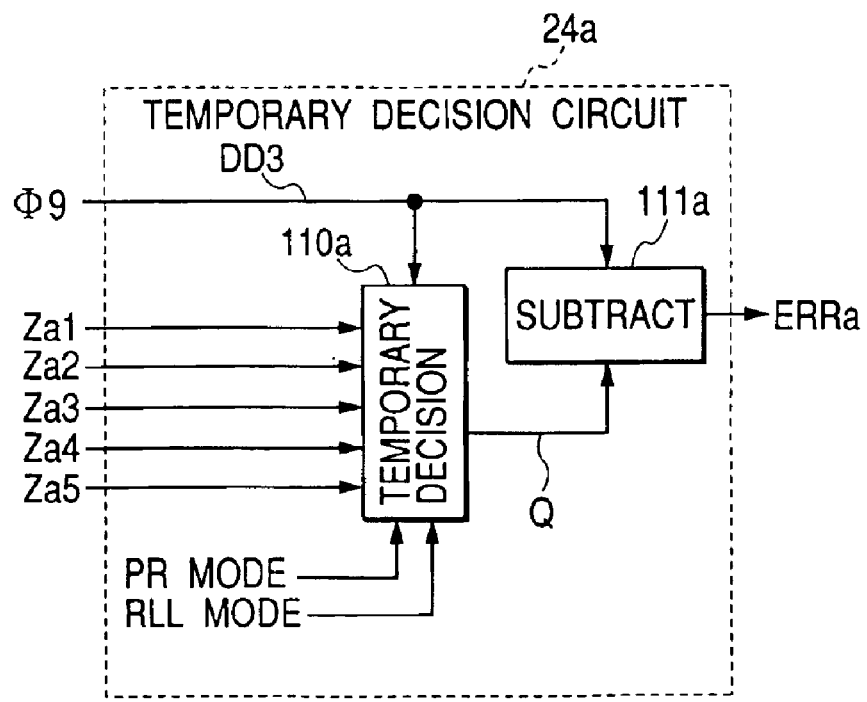
FIG. 8 is a block diagram of a temporary decision circuit in FIG. 4.

The temporary decision circuits 24a and 24b are similar to each other. Only the temporary decision circuit 24a will be explained below in detail. As shown in FIG. 8, the temporary decision circuit 24a includes a temporary decision device 110a and a subtracter 111a. The temporary decision device 110a receives the tap delayed signals Za1–Za5 from the tap delay circuit 23 (see FIGS. 4 and 6). The temporary decision device 110a receives the equalization-resultant odd-sample signal Φ9 from the transversal filter 21*a* (see FIG. 4). The temporary decision device 110*a* handles the equalization-resultant odd-sample signal Φ9 as a signal DD3 occurring at the present moment. The temporary decision device 110*a* receives the PR mode signal and the RLL mode signal. A first input terminal of the subtracter 111*a* receives the equalization-resultant odd-sample signal Φ9 from the transversal filter 21*a*. A second input terminal of the subtracter 111*a* is connected to an output terminal of the temporary decision device 110*a*. The output terminal of the subtracter 111*a* is connected to the input terminal of the inverter 25*a* (see FIG. 4).

The temporary decision device 110*a* includes a logic circuit which is designed to implement a temporary decision in response to the received signals according to a predetermined algorithm. The temporary decision device 110*a* may include a programmable signal processor. In this case, the predetermined algorithm is given as a program for controlling the signal processor. The temporary decision device 110*a* generates a signal Q representing the result of the temporary decision. The temporary decision device 110*a* outputs the temporary decision result signal Q to the subtracter 111*a*. As previously mentioned, the subtracter 111*a* receives the equalization-resultant odd-sample signal Φ9. The device 111*a* subtracts the temporary decision result signal Q from the equalization-resultant odd-sample signal Φ9, thereby generating an error signal (amplitude error signal) ERRa corresponding to the difference therebetween. The subtracter 111*a* outputs the error signal ERRa to the inverter 25*a*.

Figure 9:
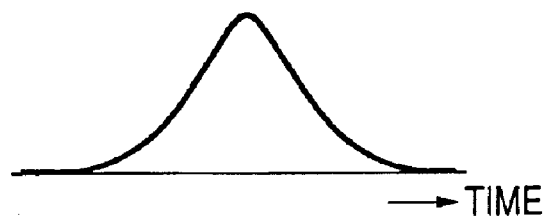
FIG. 9 is a time-domain diagram of an example of an isolated waveform.
Figure 10:
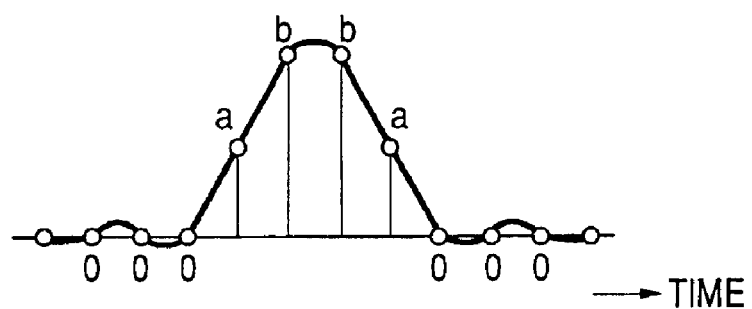
FIG. 10 is a time-domain diagram of a waveform (an equalization-resultant waveform) which results from equalization of the isolated waveform in FIG. 9.
Figure 11:
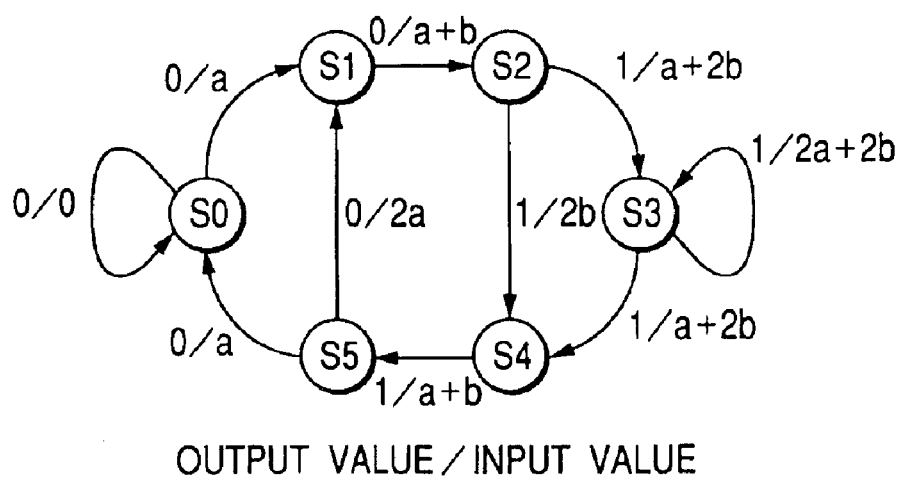
FIG. 11 is a diagram of signal state transitions regarding a partial-response (PR) characteristic and a run-length-limited (RLL) code.

Partial-response (PR) characteristics will be explained below. When an isolated waveform in FIG. 9 is subjected to equalization accorded with the characteristic of PR (a, b, b, a), the equalization-resultant waveform in FIG. 10 is provided. A waveform resulting from the PR (a, b, b, a) equalization of a continuous waveform takes one of seven different values, that is, "0", "a", "a+b", "2a", "2b", "a+2b", and "2a+2b". It is assumed that the 7-value signal of the (1, 7) run-length-limited code is inputted into a viterbi decoder. The state of a current sample of an original signal (an input value) and the state of a current sample of a reproduced signal (an output value) resulting from PR equalization are restricted by the states of previous samples. In the input signal, two successive samples of "1" will not occur. FIG. 11 shows signal state transitions available in this case.

In FIG. 11, S0, S1, S2, S3, S4, and S5 denote signal states determined by immediately-preceding output values. Transitions from the state S2 will be taken as an example. When the input value is "a+2b", the output value becomes "1" and a transition to the state S3 from the state S2 occurs. When the input value is "2b", the output value becomes "1" and a transition to the state S4 from the state S2 occurs. Under normal conditions, regarding the state S2, the input value different from "a+2b" and "2b" does not occur. Thus, the input value different from "a+2b" and "2b" is an error.

FIG. 12 shows the relation among the PR mode, the RLL mode (the run-length-limited mode), and the decision result value outputted from the temporary decision device 110*a*. The PR mode is represented by the PR mode signal inputted into the temporary decision device 110*a*. The RLL mode is represented by the RLL mode signal inputted into the temporary decision device 110*a*. The PR mode indicates the type of the PR waveform equalization implemented by the equalizer EQ1 in the adaptive equalization circuit 20. The RLL mode indicates the type of the run-length-limited code used by the digital signal recorded on the optical disc 15.

With reference to FIG. 12, the PR mode can be changed among identification numbers "1", "2", "3", "4", "5", and "6" assigned to PR (1, 1), PR (1, 1, 1, 1), PR (1, 2, 2, 1), PR (1, 3, 3, 1), PR (2, 3, 3, 2), and PR (3, 4, 4, 3) respectively. The RLL mode can be changed between RLL (1, X) and RLL (2, X). Here, RLL (1, X) means run-length limiting rules such that the minimum transition interval is equal to "2", and the maximum transition interval is equal to a given value X depending on the modulation format. On the other hand, RLL (2, X) means run-length limiting rules such that the minimum transition interval is equal to "3", and the maximum transition interval is equal to a given value X depending on the modulation format.

In the case of RLL (1, X), the waveform resulting from the PR (a, b, b, a) equalization takes one of seven different values "0", "a", "a+b", "2a", "2b", "a+2b", and "2a+2b". In FIG. 12, the decision result values outputted from the temporary decision device 110*a* in correspondence with these values "0", "a", "a+b", "2a", "2b", "a+2b", and "2a+2b" are listed for PR (1, 2, 2, 1), PR (1, 3, 3, 1), PR (2, 3, 3, 2), and PR (3, 4, 4, 3). Each of the related cells indicates two decision result values, that is, a left-hand value and a right-hand value. The left-hand value is a non-offset decision result value while the right-hand value is a decision result value provided by an offset for equalizing the central value "a+b" to "0". The decision result values for RLL (2, X) are similar to those for RLL (1, X) except for the following point. In the case of RLL (2, X), the equalization-resultant waveform takes neither the value "2a" nor the value "2b". Accordingly, the decision result values corresponding to the values "2a" and "2b" are absent from the case of RLL (2, X).

In FIG. 12, PR (1, 1) means PR (a, b, b, a) in which a=0 and b=1. The gain or gain factor G is a multiplication coefficient A/(a+b)* for normalizing the maximum (a+b)* of the absolute after-offset decision result value, where "A" denotes an arbitrary level.

With reference back to FIG. 8, the equalization-resultant odd-sample signal Φ9 inputted from the transversal filter 21*a* is handled as a signal DD3 occurring at the present moment. The present-moment signal DD3 is applied to the temporary decision device 110*a* and the subtracter 111*a*. The tap delayed signals Za1–Za5 are fed to the temporary decision device 10*a* from the tap delay circuit 23 (see FIG. 4). The temporary decision device 110*a* implements a temporary decision according to a predetermined algorithm. The temporary decision device 110*a* generates a signal Q representing the result of the temporary decision. The temporary decision device 110*a* outputs the temporary decision result signal Q to the subtracter 111*a*. The subtracter 111*a* receives the present-moment signal DD3. The device 111*a* subtracts the temporary decision result signal Q from the present-moment signal DD3, thereby generating an error signal ERRa corresponding to the difference therebetween. The subtracter 111*a* outputs the error signal ERRa to the inverter 25*a*.

With reference to FIGS. 4 and 5, the device 25*a* inverts the error signal ERRa in polarity. The inverter 25*a* outputs the inversion-resultant error signal to the multipliers 22B, 22C, 22D, 22E, and 22F in the multiplier and LPF section 22*a*. The tap output signals of the transversal filter 21*a* are applied to the multipliers 22B, 22C, 22D, 22E, and 22F in the multiplier and LPF section 22*a*, respectively. The devices 22B, 22C, 22D, 22E, and 22F multiply the respective tap output signals by the inversion-resultant error signal. The multipliers 22B, 22C, 22D, 22E, and 22F output the multiplication-resultant signals to the low pass filters 22G, 22H, 22I, 22J, and 22K, respectively. The low pass filters 22G, 22H, 22I, 22J, and 22K remove high-frequency components from the output signals of the multipliers 22B, 22C, 22D, 22E, and 22F, and thus process the output signals of the multipliers 22B, 22C, 22D, 22E, and 22F into signals representing tap coefficients Ca1, Ca2, Ca3, Ca4, and Ca5, respectively. The low pass filters 22G, 22H, 22I, 22J, and 22K output the tap coefficient signals to the multipliers 21F, 21G, 21H, 21I, and 21J within the transversal filter 21a, respectively. The tap coefficients Ca1, Ca2, Ca3, Ca4, and Ca5 represented by the output signals of the low pass filters 22G, 22H, 22I, 22J, and 22K cause the equalization by the transversal filter 21a to nullify the error signal ERRa generated by the subtracter 111a within the temporary decision circuit 24a. In this way, the tap coefficients Ca1–Ca5 used by the transversal filter 21a are controlled to nullify the error signal ERRa generated by the subtracter 111a.

As shown in FIG. 2, the odd-sample 0-point information ZDa or the even-sample 0-point information ZDb whose value Z is "1" indicates a zero-cross point. The 0-point information value Z being "1" corresponds to the value "a+b" in FIG. 11, and occurs in the transition from the state S1 to the state S2 and the transition from the state S4 to the state S5. In FIG. 11, transitions from the right-hand states S2, S3, and S4 pass through positive values ("a+2b", "2a+2b", and "2b" when normalization is done so that a+b=0), while transitions from the left-hand states S0, S1, and S5 pass through negative values ("0", "a", and "2a" when normalization is done so that a+b=0). Therefore, a decision as to whether the zero-cross point is in a positive-going path or a negative-going path can be implemented by referring to a value temporally preceding or following the zero-cross point.

In the case where the interval from one zero-cross point to the next zero-cross point is known, or in the case where the number of transitions occurring for the interval from the state S2 to the state S5 or the interval from the state S5 to the state S2 is known, the path is settled and hence values to be taken at respective sample points are definite.

In FIG. 11, the values different from "a+b" do not correspond to the zero-cross point. For the values different from "a+b", the 0-point information value Z is equal to "0". Two or more zero-cross points (Z=1) will not occur in succession. In the case of RLL (1, X), at least one "0" point (Z=0 point) exists between two adjacent zero-cross points (Z=1). For example, the 0-point information value Z changes as 1→0→1 (the state changes as S2→S4→S5 or S5→S1→S2). In the case of RLL (2, X), at least two "0" points (Z=0 points) exist between two adjacent zero-cross points (Z=1) since the values "2a" and "2b" are absent.

Figure 13:
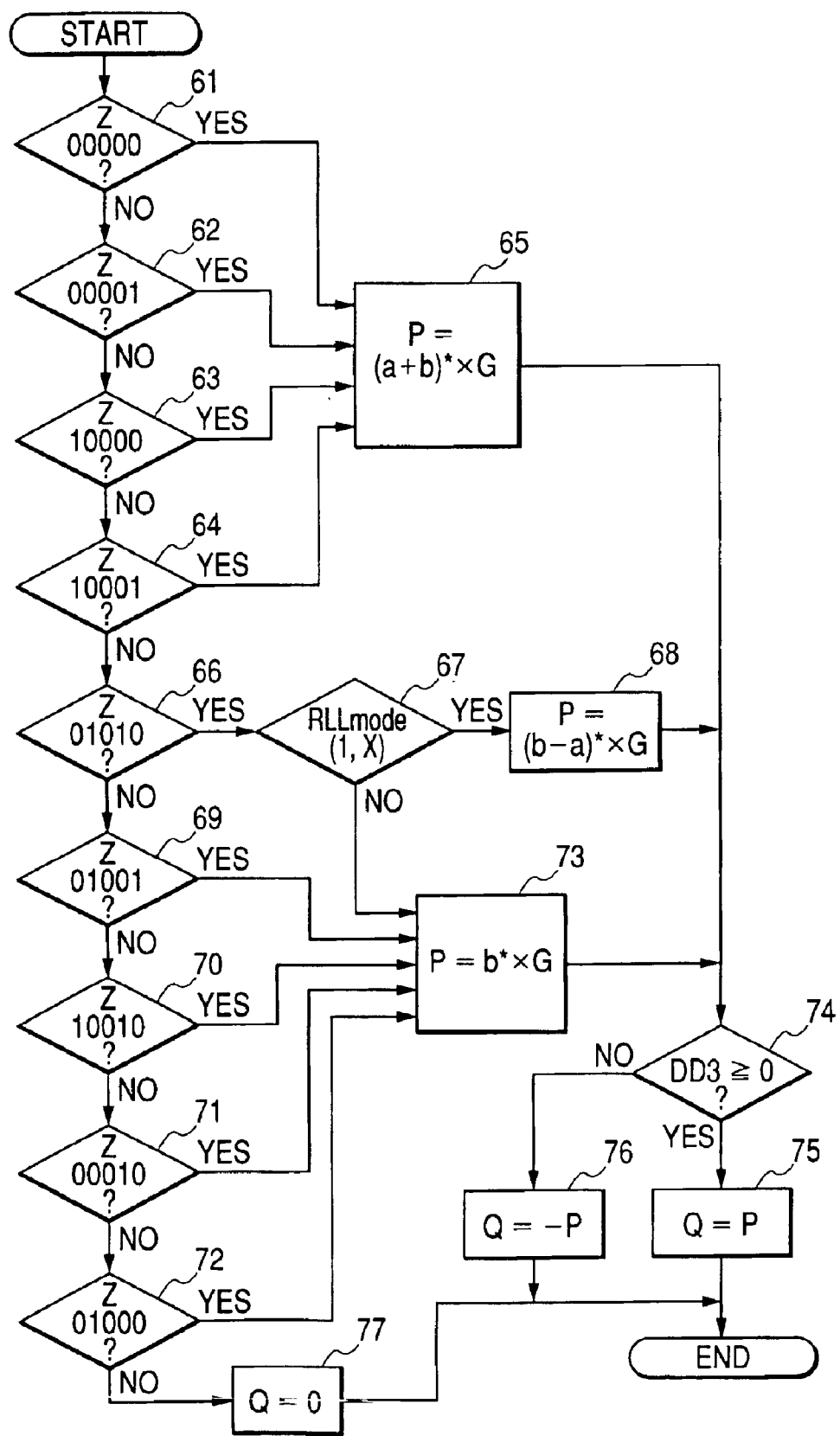
FIG. 13 is a flowchart of an algorithm of a temporary decision by a temporary decision device in FIG. 8.

FIG. 13 is a flowchart of the algorithm of the temporary decision by the temporary decision device 110a. The temporary decision is executed for every two periods of the bit clock signal.

As shown in FIG. 13, a first step 61 of the algorithm decides whether or not five successive 0-point information values Z represented by the output signals Za1–Za5 of the tap delay circuit 23 are "00000". When the five successive 0-point information values Z are "00000", the algorithm advances from the step 61 to a step 65. Otherwise, the algorithm advances from the step 61 to a step 62.

The step 62 decides whether or not the five successive 0-point information values Z are "00001". When the five successive 0-point information values Z are "00001", the algorithm advances from the step 62 to the step 65. Otherwise, the algorithm advances from the step 62 to a step 63.

The step 63 decides whether or not the five successive 0-point information values Z are "10000". When the five successive 0-point information values Z are "10000", the algorithm advances from the step 63 to the step 65. Otherwise, the algorithm advances from the step 63 to a step 64.

The step 64 decides whether or not the five successive 0-point information values Z are "10001". When the five successive 0-point information values Z are "10001", the algorithm advances from the step 64 to the step 65. Otherwise, the algorithm advances from the step 64 to a step 66.

In the case where the five successive 0-point information values Z are "00000", "00001", "10000", or "10001", the before-equalization signal waveform is fixed in a positive side or a negative side for a long time interval. Thus, in this case, the step 65 calculates a relatively large value P according to the following equation.

$$P = (a+b)^* \cdot G \tag{1}$$

where G denotes the gain (the gain factor) shown in FIG. 12, and $a^*$ and $b^*$ denote values derived from the values "a" and "b" by an offset for equalizing the central value "a+b" to "0". The values G, $a^*$, and $b^*$ are known values designated by the PR mode signal and the RLL mode signal. After the step 65, the algorithm advances to a step 74.

The step 66 decides whether or not the five successive 0-point information values Z are "01010". When the five successive 0-point information values Z are "01010", the algorithm advances from the step 66 to a step 67. Otherwise, the algorithm advances from the step 66 to a step 69.

The step 67 decides whether or not the RLL mode signal represents RLL (1, X). When the RLL mode signal represents RLL (1, X), the algorithm advances from the step 67 to a step 68. Otherwise, the program advances from the step 67 to a step 73.

Five successive 0-point information values Z being "01010" can occur only in the case of RLL (1, X). According to the before-equalization signal waveform which corresponds to five successive 0-point information values Z being "01010", the signal polarity changes at an early stage, specifically at a second bit clock pulse. Thus, in this case, the step 68 calculates a relatively small value P according to the following equation.

$$P = (b-a)^* \cdot G \tag{2}$$

After the step 68, the algorithm advances to the step 74.

The step 69 decides whether or not the five successive 0-point information values Z are "01001". When the five successive 0-point information values Z are "01001", the algorithm advances from the step 69 to the step 73. Otherwise, the algorithm advances from the step 69 to a step 70.

The step 70 decides whether or not the five successive 0-point information values Z are "10010". When the five successive 0-point information values Z are "10010", the algorithm advances from the step 70 to the step 73. Otherwise, the algorithm advances from the step 70 to a step 71.

The step 71 decides whether or not the five successive 0-point information values Z are "00010". When the five successive 0-point information values Z are "00010", the algorithm advances from the step 71 to the step 73. Otherwise, the algorithm advances from the step 71 to a step 72.

The step 72 decides whether or not the five successive 0-point information values Z are "01000". When the five successive 0-point information values Z are "01000", the algorithm advances from the step 72 to the step 73. Otherwise, the algorithm advances from the step 72 to a step 77.

In the case where the five successive 0-point information values Z are "01010" and the RLL mode signal does not represent RLL (1, X), and in the case where the five successive 0-point information values Z are "01001", "10010", "00010", or "01000", the before-equalization signal level remains in the same for a short time interval. Thus, in this case, the step 73 calculates an intermediate value P according to the following equation.

$$P = b* \cdot G \qquad (3)$$

After the step 73, the algorithm advances to the step 74.

The step 74 detects the polarity of the present-moment signal DD3. Specifically, the step 74 decides whether or not the present-moment signal DD3 is smaller than "0". When the present-moment signal DD3 is equal to or greater than "0", the algorithm advances from the step 74 to a step 75. When the present-moment signal DD3 is smaller than "0", the algorithm advances from the step 74 to a step 76.

The step 75 sets a temporary decision level (a temporary decision value or a temporary decision result value) Q equal to the value P. On the other hand, the step 76 sets the temporary decision level Q equal to the value −P (the value P multiplied by −1). After the steps 75 and 76, the current execution cycle of the temporary decision ends.

The step 77 sets the temporary decision level Q equal to "0". The algorithm advances to the step 77 in cases including the case where the central one among the five successive 0-point information values Z is "1". After the step 77, the current execution cycle of the temporary decision ends.

The temporary decision device 110*a* outputs a signal representative of the temporary decision level (the temporary decision value) Q to the subtracter 111*a* as a temporary decision result signal. The temporary decision value Q is determined on the basis of one of the previously-indicated equations (1), (2), and (3). Accordingly, the equalization by the transversal filter 21*a* is based on one of the equations (1), (2), and (3). The equalization based on one of the equations (1), (2), and (3) is periodically executed in response to the polarity of the present-moment signal DD3 at a timing of the central one (the third one) among five successive 0-point information values Z.

Figure 14:
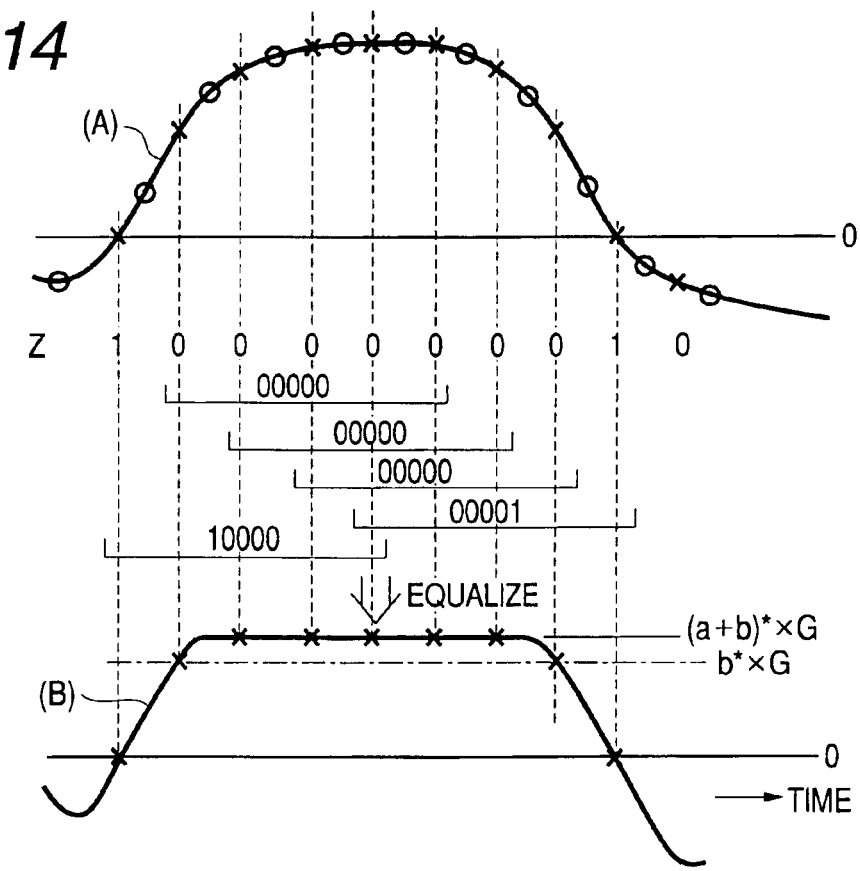
FIG. 14 is a time-domain diagram of a first example of an original waveform and an equalization-resultant waveform.

FIG. 14 shows an example of a waveform (A) of original data points "o" which are represented by respective data segments recorded on the optical disc 15. Sample points "x" on the waveform (A) which are given for the PR equalization by the adaptive equalization circuit 20 are temporally distant from the original data points "o" by angular or phase intervals of 180° with respect to the bit clock signal. Here, the PR equalization by the adaptive equalization circuit 20 means a combination of the PR equalization by the equalizer EQ1 and the PR equalization by the equalizer EQ2. As shown in FIG. 14, 0-point information values Z are generated coincidently with sample points "x", respectively. Five successive 0-point information values Z are notified to the temporary decision device 110*a* within the temporary decision circuit 24*a* by the tap delayed signals Za1–Za5 outputted from the tap delay circuit 23. Similarly, five successive 0-point information values Z are notified to the temporary decision device within the temporary decision circuit 24*b* by the tap delayed signals Zb1–Zb5 outputted from the tap delay circuit 23. According to the waveform (A), five successive 0-point information values Z change as "10000"→"00000"→"00000"→"00000"→"00001". FIG. 14 also shows an example of an equalization-resultant waveform (B) of sample points "x" which originates from the waveform (A). In the case where the five successive 0-point information values Z are "00000", "10000", or "00001", the waveform equalization is executed on the basis of the previously-indicated equation (1) and the polarity of the present-moment signal DD3 at a timing of the central one among the five successive 0-point information values Z. In FIG. 14, since the polarity of the present-moment signal DD3 at a timing of the central one among the five successive 0-point information values Z ("00000", "10000", or "00001") is positive, the waveform equalization reflects the positive value P equal to $(a+b)* \cdot G$. Specifically, the waveform equalization reflects the temporary decision value Q. The equalization-resultant waveform (B) is basically similar to the original waveform (A).

Figure 15:
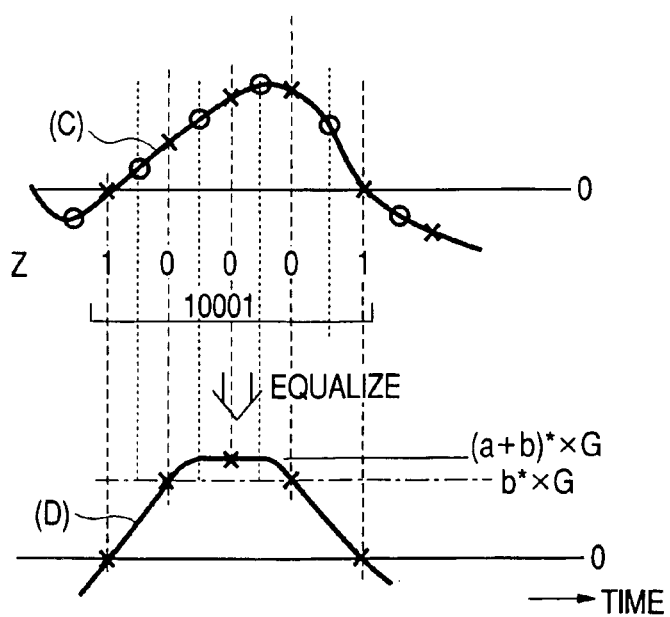
FIG. 15 is a time-domain diagram of a second example of an original waveform and an equalization-resultant waveform.

FIG. 15 shows an example of a waveform (C) of original data points "o" which are represented by respective data segments recorded on the optical disc 15. Sample points "x" on the waveform (C) are given for the PR equalization. As shown in FIG. 15, 0-point information values Z are generated coincidently with sample points "x", respectively. According to the waveform (C), five successive 0-point information values Z are "10001". FIG. 15 also shows an example of an equalization-resultant waveform (D) of sample points "x" which originates from the waveform (C). In the case where the five successive 0-point information values Z are "10001", the waveform equalization is executed on the basis of the previously-indicated equation (1) and the polarity of the present-moment signal DD3 at a timing of the central one among the five successive 0-point information values Z. In FIG. 15, since the polarity of the present-moment signal DD3 at a timing of the central one among the five successive 0-point information values Z ("10001") is positive, the waveform equalization reflects the positive value P equal to $(a+b)* \cdot G$. Specifically, the waveform equalization reflects the temporary decision value Q. The equalization-resultant waveform (D) is basically similar to the original waveform (C).

Figure 16:
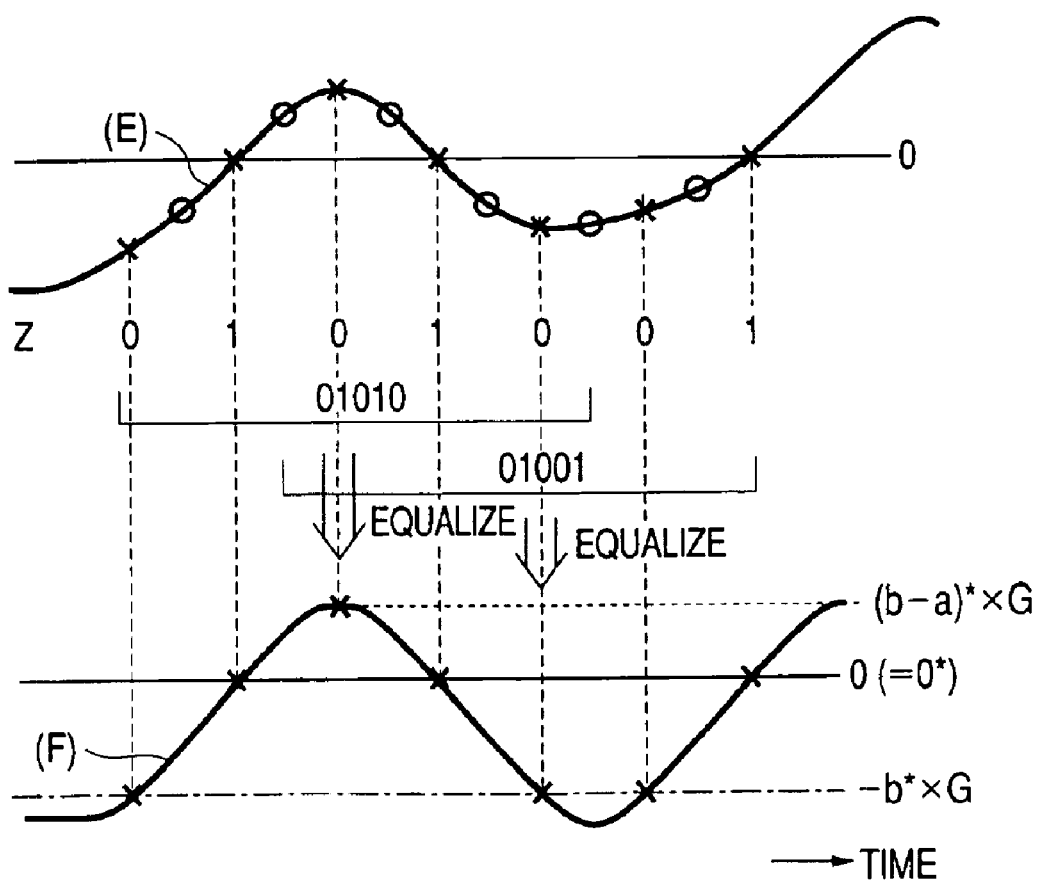
FIG. 16 is a time-domain diagram of a third example of an original waveform and an equalization-resultant waveform.

FIG. 16 shows an example of a waveform (E) of original data points "o" which are represented by respective RLL (1, X) data segments recorded on the optical disc 15. Sample points "x" on the waveform (E) are given for the PR equalization. As shown in FIG. 16, 0-point information values Z are generated coincidently with sample points "x", respectively. According to the waveform (E), five successive 0-point information values Z change as "01010"→"10100"→"01001". FIG. 16 also shows an example of an equalization-resultant waveform (F) of sample points "x" which originates from the waveform (E). In the case where the five successive 0-point information values Z are "01010", the waveform equalization is executed on the basis of the previously-indicated equation (2) and the polarity of the present-moment signal DD3 at a timing of the central one among the five successive 0-point information values Z. In FIG. 16, since the polarity of the present-moment signal DD3 at a timing of the central one among the five successive 0-point information values Z ("01010") is positive, the waveform equalization reflects the positive value P equal to $(b−a)* \cdot G$. Specifically, the waveform equalization reflects the temporary decision value Q. In the case where the five successive 0-point information values Z are "01001", the waveform equalization is executed on the basis of the previously-indicated equation (3) and the polarity of the present-moment signal DD3 at a timing of the central one among the five successive 0-point information values Z. In FIG. 16, since the polarity of the present-moment signal DD3 at a timing of the central one among the five successive 0-point information values Z ("01001") is negative, the waveform equalization reflects the negative value −P equal to −b*·G. Specifically, the waveform equalization reflects the temporary decision value Q. The equalization-resultant waveform (E) is basically similar to the original waveform (F).

Figure 17:
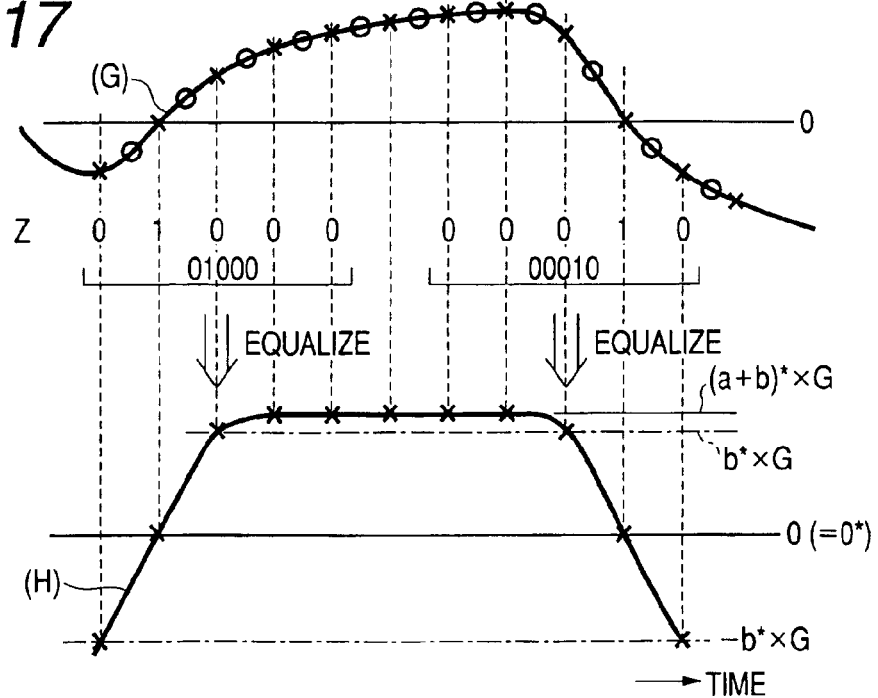
FIG. 17 is a time-domain diagram of a fourth example of an original waveform and an equalization-resultant waveform.

FIG. 17 shows an example of a waveform (G) of original data points "o" which are represented by data segments recorded on the optical disc 15. Sample points "x" on the waveform (G) are given for the PR equalization. As shown in FIG. 17, 0-point information values Z are generated coincidently with sample points "x", respectively. According to the waveform (G), five successive 0-point information values Z change as "01000"→"10000"→"00000"→"00000"→"00000"→"00001"→"00010". FIG. 17 also shows an example of an equalization-resultant waveform (H) of sample points "x" which originates from the waveform (G). In the case where the five successive 0-point information values Z are "01000" or "00010", the waveform equalization is executed on the basis of the previously-indicated equation (3) and the polarity of the present-moment signal DD3 at a timing of the central one among the five successive 0-point information values Z. In FIG. 17, since the polarity of the present-moment signal DD3 at a timing of the central one among the five successive 0-point information values Z ("01000" or "00010") is positive, the waveform equalization reflects the positive value P equal to b*·G. Specifically, the waveform equalization reflects the temporary decision value Q. The equalization-resultant waveform (H) is basically similar to the original waveform (G).

Figure 18:
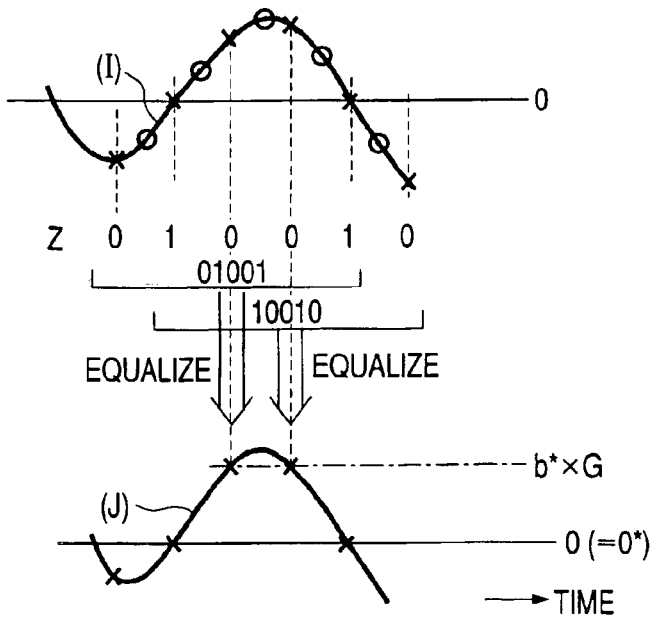
FIG. 18 is a time-domain diagram of a fifth example of an original waveform and an equalization-resultant waveform.

FIG. 18 shows an example of a waveform (I) of original data points "o" which are represented by data segments recorded on the optical disc 15. Sample points "x" on the waveform (I) are given for the PR equalization. As shown in FIG. 18, 0-point information values Z are generated coincidently with sample points "x", respectively. According to the waveform (I), five successive 0-point information values Z change as "01001"→"10010". FIG. 18 also shows an example of an equalization-resultant waveform (J) of sample points "x" which originates from the waveform (I). In the case where the five successive 0-point information values Z are "01001" or "10010", the waveform equalization is executed on the basis of the previously-indicated equation (3) and the polarity of the present-moment signal DD3 at a timing of the central one among the five successive 0-point information values Z. In FIG. 18, since the polarity of the present-moment signal DD3 at a timing of the central one among the five successive 0-point information values Z ("01001" or "10010") is positive, the waveform equalization reflects the positive value P equal to b*·G. Specifically, the waveform equalization reflects the temporary decision value Q. The equalization-resultant waveform (J) is basically similar to the original waveform (I).

The waveform equalization is executed in response to five successive 0-point information values and also the state transition diagram of FIG. 11. Therefore, the executed waveform equalization is less adversely affected by the level represented by a current signal sample. Thus, the executed waveform equalization is reliable. Furthermore, the executed waveform equalization can be changed among different PR equalizations in response to the PR mode signal and the RLL mode signal.

It should be noted that the present embodiment of this invention can be applied to RLL (2, X) since RLL (2, X) is substantially similar to RLL (1, X) in state transitions.

Figure 19:
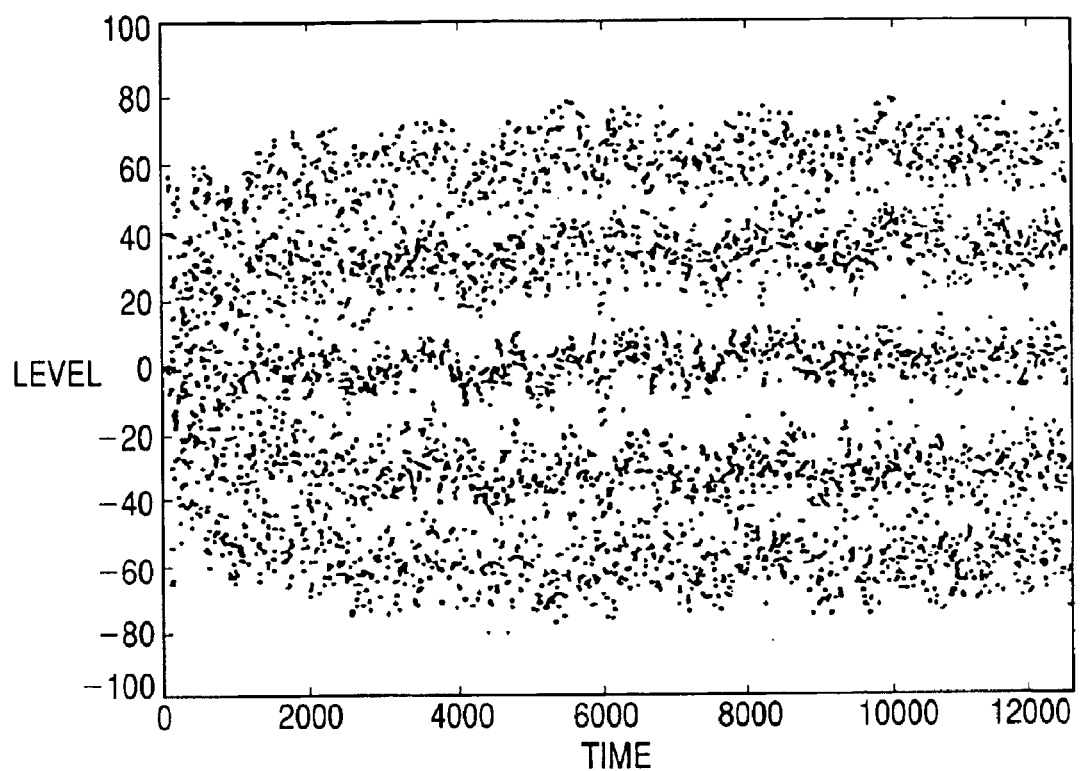
FIG. 19 is a time-domain diagram of the eye pattern indicated by an equalization-resultant odd-sample signal Φ9 outputted from the adaptive equalization circuit in FIGS. 1 and 4.
Figure 20:
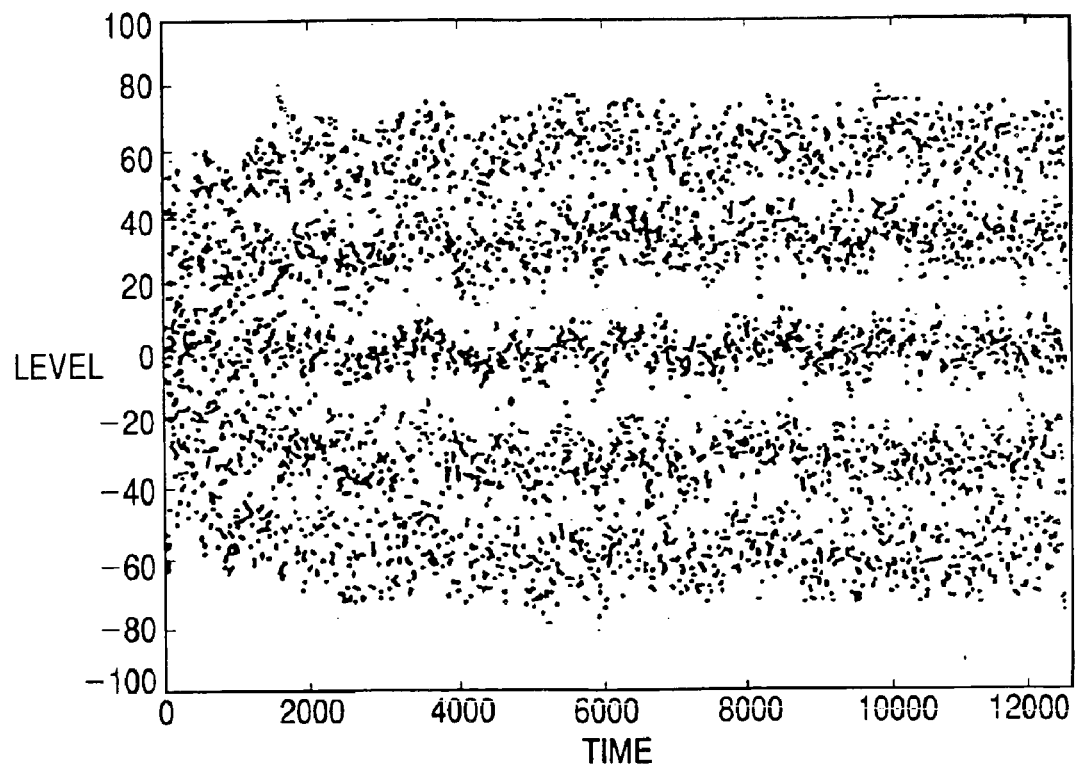
FIG. 20 is a time-domain diagram of the eye pattern indicated by an equalization-resultant even-sample signal Φ10 outputted from the adaptive equalization circuit in FIGS. 1 and 4.

Experiments were carried out. During the experiments, a test signal was inputted into the reproducing apparatus of FIG. 1 which was designed for PR (1, 1, 1, 1). The test signal was processed by the reproducing apparatus of FIG. 1 into an equalization-resultant odd-sample signal Φ9 and an equalization-resultant even-sample signal Φ10 which appeared at the output side of the adaptive equalization circuit 20. FIG. 19 shows time-domain conditions of the equalization-resultant odd-sample signal Φ9, that is, the eye pattern indicated by the equalization-resultant odd-sample signal Φ9. In FIG. 19, the abscissa denotes time elapsed, and the ordinate denotes the quantization levels of signal samples. As shown in FIG. 19, samples of the equalization-resultant odd-sample signal Φ9 quickly converged on five different target levels of "0", "32", "64", "−32", and "−64". FIG. 20 shows time-domain conditions of the equalization-resultant even-sample signal Φ10, that is, the eye pattern indicated by the equalization-resultant even-sample signal Φ10. In FIG. 20, the abscissa denotes time elapsed, and the ordinate denotes the quantization levels of signal samples. As shown in FIG. 20, samples of the equalization-resultant even-sample signal Φ10 quickly converged on five different target levels of "0", "32", "64", "−32", and "−64".

Second Embodiment

Figure 21:
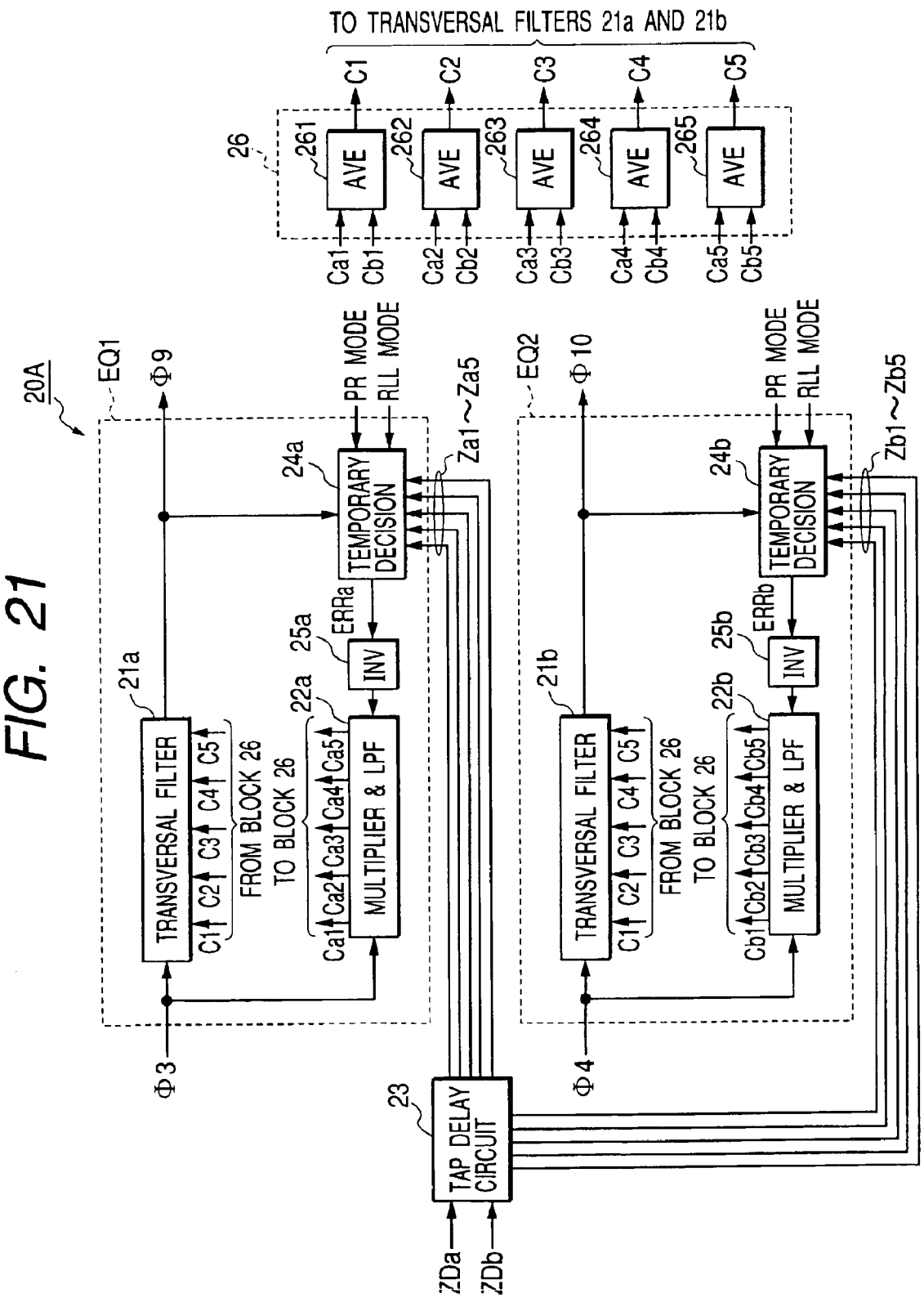
FIG. 21 is a block diagram of an adaptive equalization circuit in a second embodiment of this invention.

A second embodiment of this invention is similar to the first embodiment thereof except that an adaptive equalization circuit 20A replaces the adaptive equalization circuit 20 (see FIGS. 1 and 4). FIG. 21 shows the adaptive equalization circuit 20A. The adaptive equalization circuit 20A is modified from the adaptive equalization circuit 20 so that a coefficient averaging block 26 is provided among the transversal filters 21a and 21b, and the multiplier and LPF sections 22a and 22b.

As shown in FIG. 21, the coefficient averaging block 26 includes averaging circuits 261, 262, 263, 264, and 265. The averaging circuit 261 receives an output signal from the multiplier and LPF section 22a which represents a tap coefficient Ca1. The averaging circuit 261 receives an output signal from the multiplier and LPF section 22b which represents a tap coefficient Cb1. The averaging circuit 261 averages the tap coefficients Ca1 and Cb1 into a mean tap coefficient C1. The averaging circuit 261 outputs a signal representative of the mean tap coefficient C1 to the transversal filters 21a and 21b. The transversal filter 21a responds to the mean tap coefficient C1 instead of the tap coefficient Ca1. The transversal filter 21b responds to the mean tap coefficient C1 instead of the tap coefficient Cb1. The averaging circuit 262 receives an output signal from the multiplier and LPF section 22a which represents a tap coefficient Ca2. The averaging circuit 262 receives an output signal from the multiplier and LPF section 22b which represents a tap coefficient Cb2. The averaging circuit 262 averages the tap coefficients Ca2 and Cb2 into a mean tap coefficient C2. The averaging circuit 262 outputs a signal representative of the mean tap coefficient C2 to the transversal filters 21a and 21b. The transversal filter 21a responds to the mean tap coefficient C2 instead of the tap coefficient Ca2. The transversal filter 21b responds to the mean tap coefficient C2 instead of the tap coefficient Cb2. The averaging circuit 263 receives an output signal from the multiplier and LPF section 22a which represents a tap coefficient Ca3. The averaging circuit 263 receives an output signal from the multiplier and LPF section 22b which represents a tap coefficient Cb3. The averaging circuit 263 averages the tap coefficients Ca3 and Cb3 into a mean tap coefficient C3. The averaging circuit 263 outputs a signal representative of the mean tap coefficient C3 to the transversal filters 21a and 21b. The transversal filter 21a responds to the mean tap coefficient C3 instead of the tap coefficient Ca3. The transversal filter 21b responds to the mean tap coefficient C3 instead of the tap coefficient Cb3. The averaging circuit 264 receives an output signal from the multiplier and LPF section 22a which represents a tap coefficient Ca4. The averaging circuit 264 receives an output signal from the multiplier and LPF section 22b which represents a tap coefficient Cb4. The averaging circuit 264 averages the tap coefficients Ca4 and Cb4 into a mean tap coefficient C4. The averaging circuit 264 outputs a signal representative of the mean tap coefficient C4 to the transversal filters 21a and 21b. The transversal filter 21a responds to the mean tap coefficient C4 instead of the tap coefficient Ca4. The transversal filter 21b responds to the mean tap coefficient C4 instead of the tap coefficient Cb4. The averaging circuit 265 receives an output signal from the multiplier and LPF section 22a which represents a tap coefficient Ca5. The averaging circuit 265 receives an output signal from the multiplier and LPF section 22b which represents a tap coefficient Cb5. The averaging circuit 265 averages the tap coefficients Ca5 and Cb5 into a mean tap coefficient C5. The averaging circuit 265 outputs a signal representative of the mean tap coefficient C5 to the transversal filters 21a and 21b. The transversal filter 21a responds to the mean tap coefficient C5 instead of the tap coefficient Ca5. The transversal filter 21b responds to the mean tap coefficient C5 instead of the tap coefficient Cb5.

The coefficient averaging block 26 compensates for the imbalance between the odd-sample side and the even-sample side.

Third Embodiment

Figure 22:
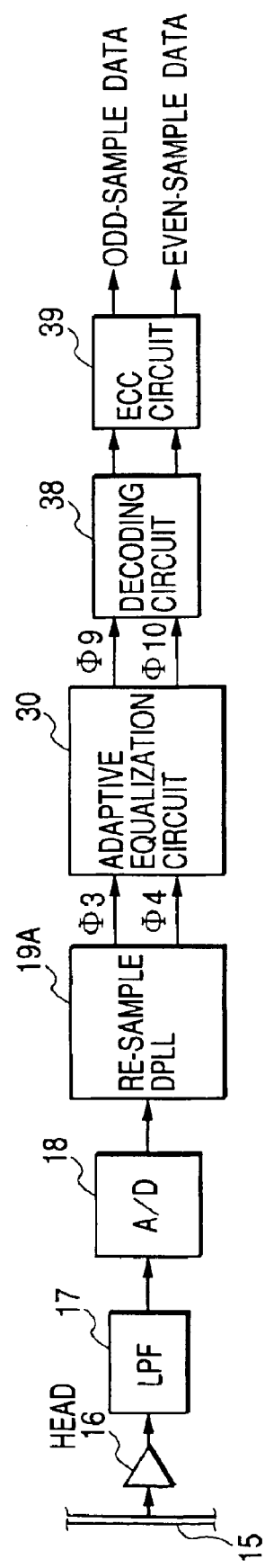
FIG. 22 is a block diagram of a reproducing apparatus according to a third embodiment of this invention.

FIG. 22 shows a reproducing apparatus according to a third embodiment of this invention. The reproducing apparatus of FIG. 22 is similar to that of FIG. 1 except that a re-sampling DPLL section 19A and an adaptive equalization circuit 30 replace the re-sampling DPLL section 19 and the adaptive equalization circuit 20 (see FIGS. 1 and 4) respectively. The re-sampling DPLL section 19A is basically similar to the re-sampling DPLL section 19. The re-sampling DPLL section 19A does not output odd-sample 0-point information ZDa and even-sample 0-point information ZDb.

Figure 23:
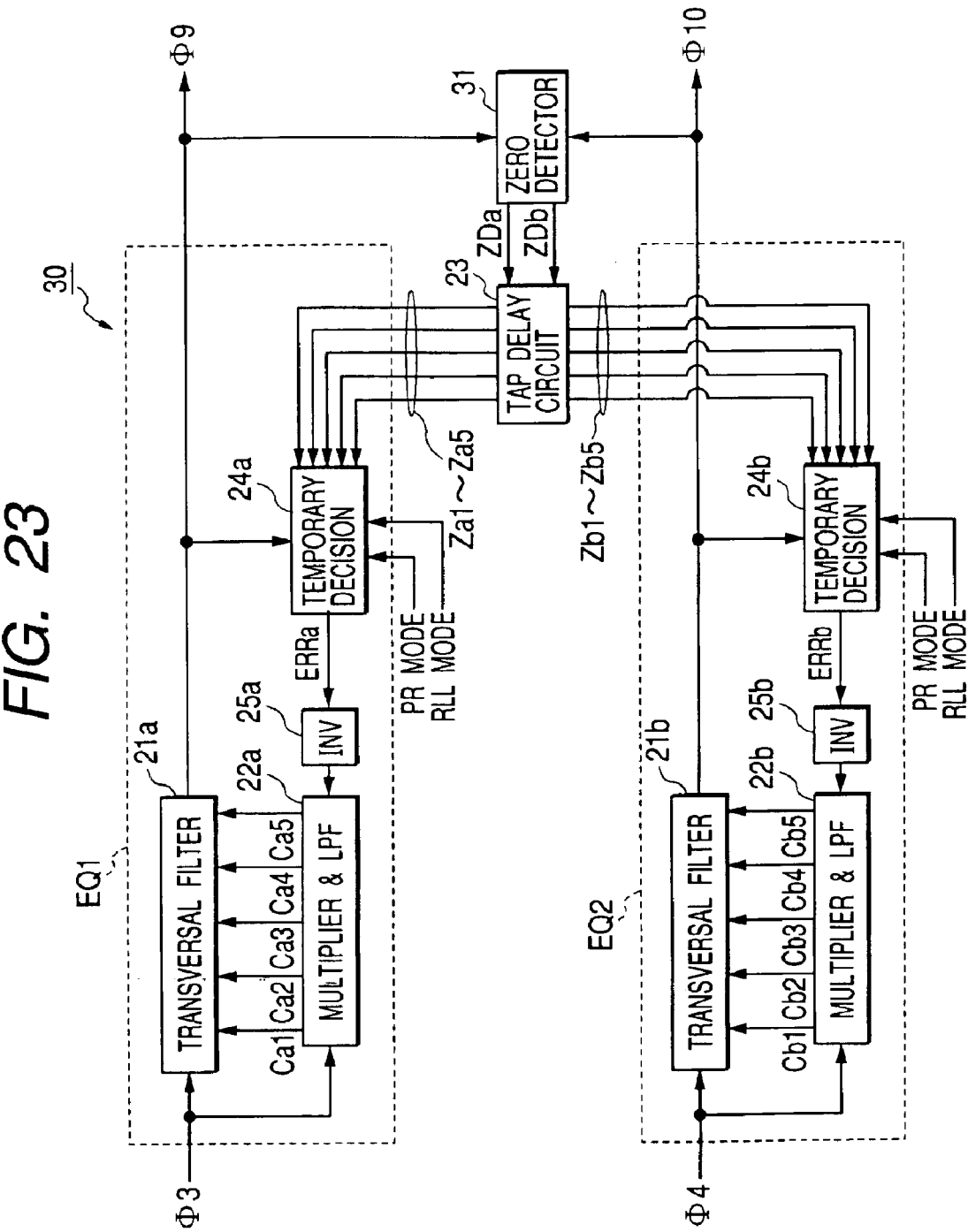
FIG. 23 is a block diagram of an adaptive equalization circuit in FIG. 22.

FIG. 23 shows the adaptive equalization circuit 30. The adaptive equalization circuit 30 is modified from the adaptive equalization circuit 20 so that a zero detector 31 is provided among the transversal filters 21a and 21b, and the tap delay circuit 23.

The zero detector 31 receives an equalization-resultant odd-sample signal Φ9 from the transversal filter 21a. The zero detector 31 receives an equalization-resultant even-sample signal Φ10 from the transversal filter 21b. The zero detector 31 combines the equalization-resultant odd-sample signal Φ9 and the equalization-resultant even-sample signal Φ10 into a sequence of odd and even signal samples. The zero detector 31 senses every point (every zero-cross point) at which the sequence of odd and even signal samples crosses a zero level.

Specifically, the zero detector 31 senses every inversion of the polarity of the sequence of odd and even signal samples by referring to two successive signal samples. For every sensed polarity inversion, the zero detector 31 selects one from among two related signal samples which is closer to "0", and generates 0-point information in response to the selected signal sample. The generated 0-point information includes 0-point information ZDa corresponding to an odd-sample signal Φ3 and 0-point information ZDb corresponding to an even-sample signal Φ4. The zero detector 31 outputs the odd-sample 0-point information ZDa and the even-sample 0-point information ZDb to the tap delay circuit 23.

Fourth Embodiment

Figure 24:
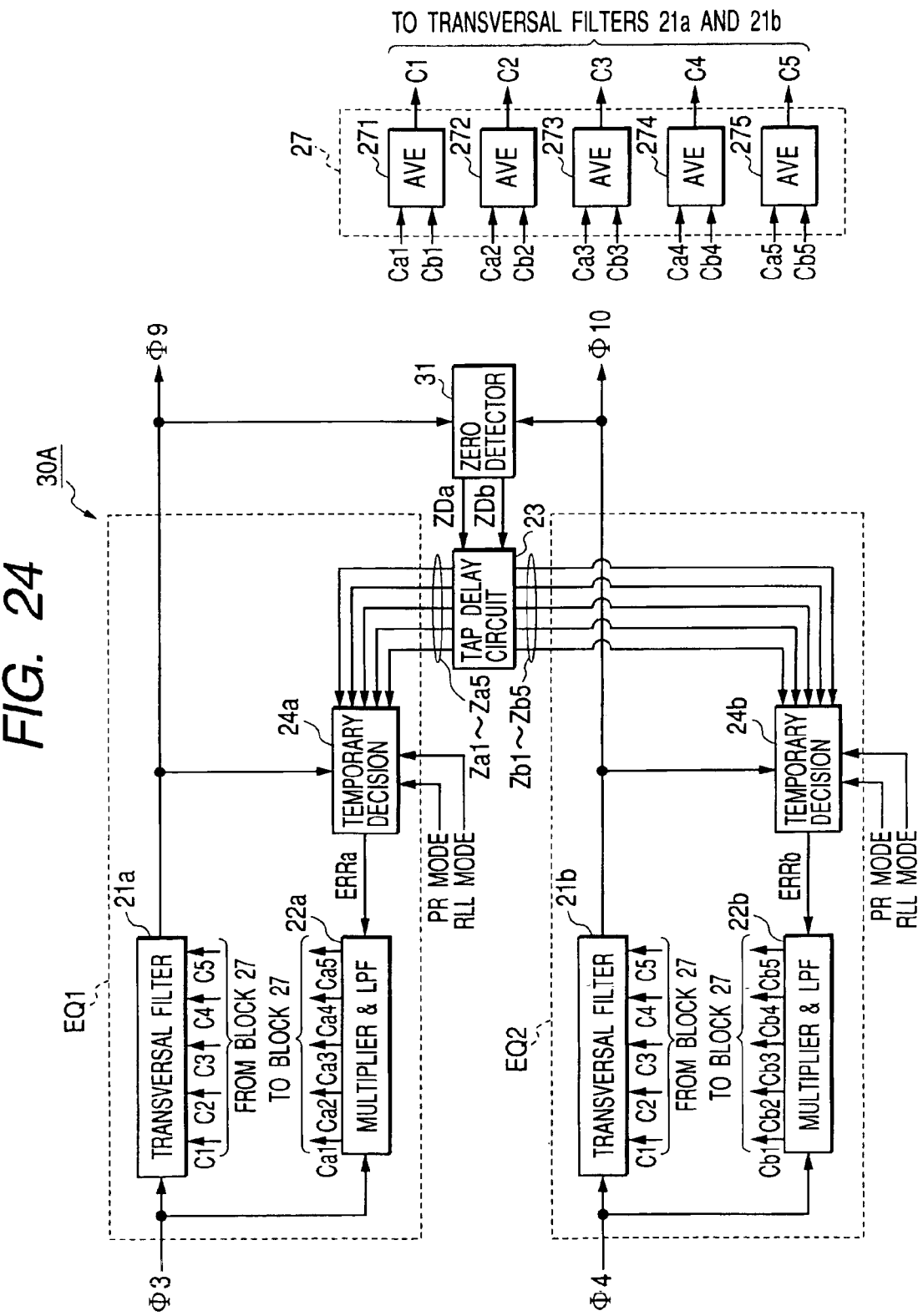
FIG. 24 is a block diagram of an adaptive equalization circuit in a fourth embodiment of this invention.

A fourth embodiment of this invention is similar to the third embodiment thereof except that an adaptive equalization circuit 30A replaces the adaptive equalization circuit 30 (see FIGS. 22 and 23). FIG. 24 shows the adaptive equalization circuit 30A. The adaptive equalization circuit 30A is modified from the adaptive equalization circuit 30 so that a coefficient averaging block 27 is provided among the transversal filters 21a and 21b, and the multiplier and LPF sections 22a and 22b.

As shown in FIG. 24, the coefficient averaging block 27 includes averaging circuits 271, 272, 273, 274, and 275. The averaging circuit 271 receives an output signal from the multiplier and LPF section 22a which represents a tap coefficient Ca1. The averaging circuit 271 receives an output signal from the multiplier and LPF section 22b which represents a tap coefficient Cb1. The averaging circuit 271 averages the tap coefficients Ca1 and Cb1 into a mean tap coefficient C1. The averaging circuit 271 outputs a signal representative of the mean tap coefficient C1 to the transversal filters 21a and 21b. The transversal filter 21a responds to the mean tap coefficient C1 instead of the tap coefficient Ca1. The transversal filter 21b responds to the mean tap coefficient C1 instead of the tap coefficient Cb1. The averaging circuit 272 receives an output signal from the multiplier and LPF section 22a which represents a tap coefficient Ca2. The averaging circuit 272 receives an output signal from the multiplier and LPF section 22b which represents a tap coefficient Cb2. The averaging circuit 272 averages the tap coefficients Ca2 and Cb2 into a mean tap coefficient C2. The averaging circuit 272 outputs a signal representative of the mean tap coefficient C2 to the transversal filters 21a and 21b. The transversal filter 21a responds to the mean tap coefficient C2 instead of the tap coefficient Ca2. The transversal filter 21b responds to the mean tap coefficient C2 instead of the tap coefficient Cb2. The averaging circuit 273 receives an output signal from the multiplier and LPF section 22a which represents a tap coefficient Ca3. The averaging circuit 273 receives an output signal from the multiplier and LPF section 22b which represents a tap coefficient Cb3. The averaging circuit 273 averages the tap coefficients Ca3 and Cb3 into a mean tap coefficient C3. The averaging circuit 273 outputs a signal representative of the mean tap coefficient C3 to the transversal filters 21a and 21b. The transversal filter 21a responds to the mean tap coefficient C3 instead of the tap coefficient Ca3. The transversal filter 21b responds to the mean tap coefficient C3 instead of the tap coefficient Cb3. The averaging circuit 274 receives an output signal from the multiplier and LPF section 22a which represents a tap coefficient Ca4. The averaging circuit 274 receives an output signal from the multiplier and LPF section 22b which represents a tap coefficient Cb4. The averaging circuit 274 averages the tap coefficients Ca4 and Cb4 into a mean tap coefficient C4. The averaging circuit 274 outputs a signal representative of the mean tap coefficient C4 to the transversal filters 21a and 21b. The transversal filter 21a responds to the mean tap coefficient C4 instead of the tap coefficient Ca4. The transversal filter 21b responds to the mean tap coefficient C4 instead of the tap coefficient Cb4. The averaging circuit 275 receives an output signal from the multiplier and LPF section 22a which represents a tap coefficient Ca5. The averaging circuit 275 receives an output signal from the multiplier and LPF section 22b which represents a tap coefficient Cb5. The averaging circuit 275 averages the tap coefficients Ca5 and Cb5 into a mean tap coefficient C5. The averaging circuit 275 outputs a signal representative of the mean tap coefficient C5 to the transversal filters 21a and 21b. The transversal filter 21a responds to the mean tap coefficient C5 instead of the tap coefficient Ca5. The transversal filter 21b responds to the mean tap coefficient C5 instead of the tap coefficient Cb5.

The coefficient averaging block 27 compensates for the imbalance between the odd-sample side and the even-sample side.

Fifth Embodiment

Figure 25:
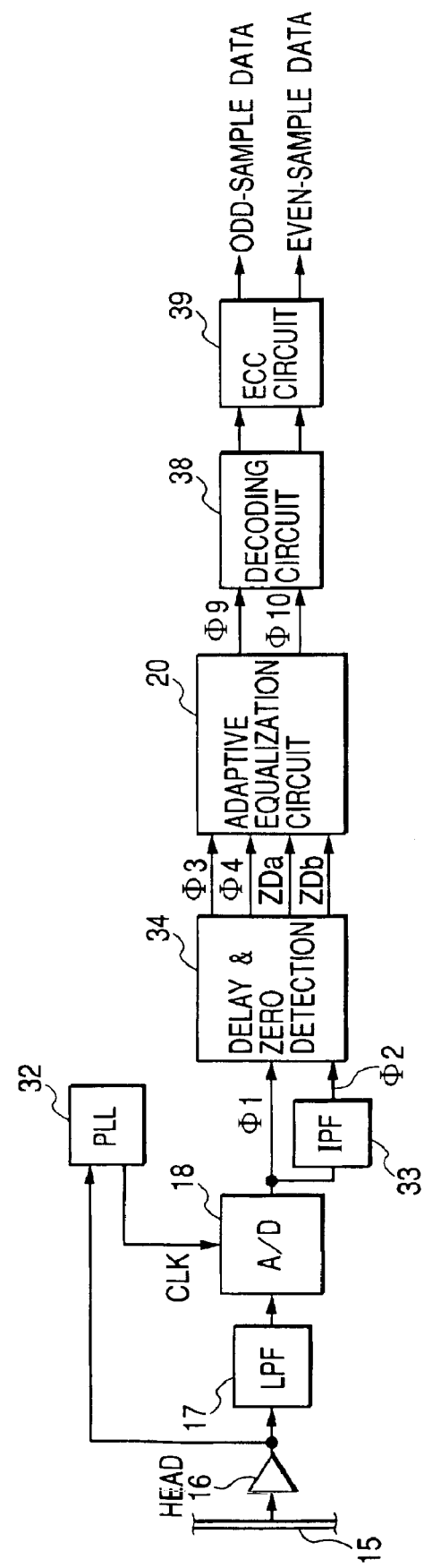
FIG. 25 is a block diagram of a reproducing apparatus according to a fifth embodiment of this invention.

FIG. 25 shows a reproducing apparatus according to a fifth embodiment of this invention. The reproducing apparatus of FIG. 25 is similar to that of FIG. 1 except for design changes mentioned hereafter. The reproducing apparatus of FIG. 25 includes a PLL (phase locked loop) circuit 32, an interpolation filter 33, and a delay and zero detection circuit 34. The re-sampling DPLL section 19 (see FIG. 1) is omitted from the reproducing apparatus of FIG. 25.

As shown in FIG. 25, the PLL circuit 32 receives the output signal of the optical head 16. The PLL circuit 32 generates a clock signal from the output signal of the optical head 16. The generated clock signal is synchronized with a bit clock signal related to the output signal of the optical head 16. The generated clock signal has a period corresponding to two bits. Thus, the generated clock signal has a frequency equal to half the frequency of the bit clock signal. The PLL circuit 32 feeds the generated clock signal to the A/D converter 18 and the interpolation filter 33. The A/D converter 18 periodically samples the output signal of the LPF 17 in response to the clock signal, and converts every resultant sample into a digital sample. The A/D converter 18 outputs a sequence of digital samples to the interpolation filter 33 and the delay and zero detection circuit 34 as a sequence of first alternate 0°-phase samples Φ1.

The interpolation filter 33 responds to the clock signal fed from the PLL circuit 32. The interpolation filter 33 periodically estimates a sample at a position intermediate between two successive 0°-phase samples Φ1 from the values thereof through interpolation. The interpolation filter 33 outputs a sequence of estimated samples to the delay and zero detection circuit 34 as a sequence of second alternate 0°-phase samples Φ2.

The delay and zero detection circuit 34 delays the first 0°-phase-sample signal Φ1 into a 180°-phase-sample signal Φ3 referred to as an odd-sample signal Φ3. The delay and zero detection circuit 34 delays the second 0°-phase-sample signal Φ2 into a 180°-phase-sample signal Φ4 referred to as an even-sample signal Φ4. The delay and zero detection circuit 34 outputs the odd-sample signal Φ3 and the even-sample signal Φ4 to the adaptive equalization circuit 20.

The delay and zero detection circuit 34 combines the first 0°-phase-sample signal Φ1 and the second 0°-phase-sample signal Φ2 into a sequence of signal samples. The delay and zero detection circuit 34 senses every point (every zero-cross point) at which the sequence of signal samples crosses a zero level. Specifically, the delay and zero detection circuit 34 senses every inversion of the polarity of the sequence of signal samples by referring to two successive signal samples. For every sensed polarity inversion, the delay and zero detection circuit 34 selects one from among two related signal samples which is closer to "0", and generates 0-point information in response to the selected signal sample. The generated 0-point information includes 0-point information ZDa corresponding to the odd-sample signal Φ3 and 0-point information ZDb corresponding to the even-sample signal Φ4. The delay and zero detection circuit 34 outputs the odd-sample 0-point information ZDa and the even-sample 0-point information ZDb to the adaptive equalization circuit 20.

It should be noted that the adaptive equalization circuit 20 may be replaced by the adaptive equalization circuit 20A (see FIG. 21).

Sixth Embodiment

Figure 26:
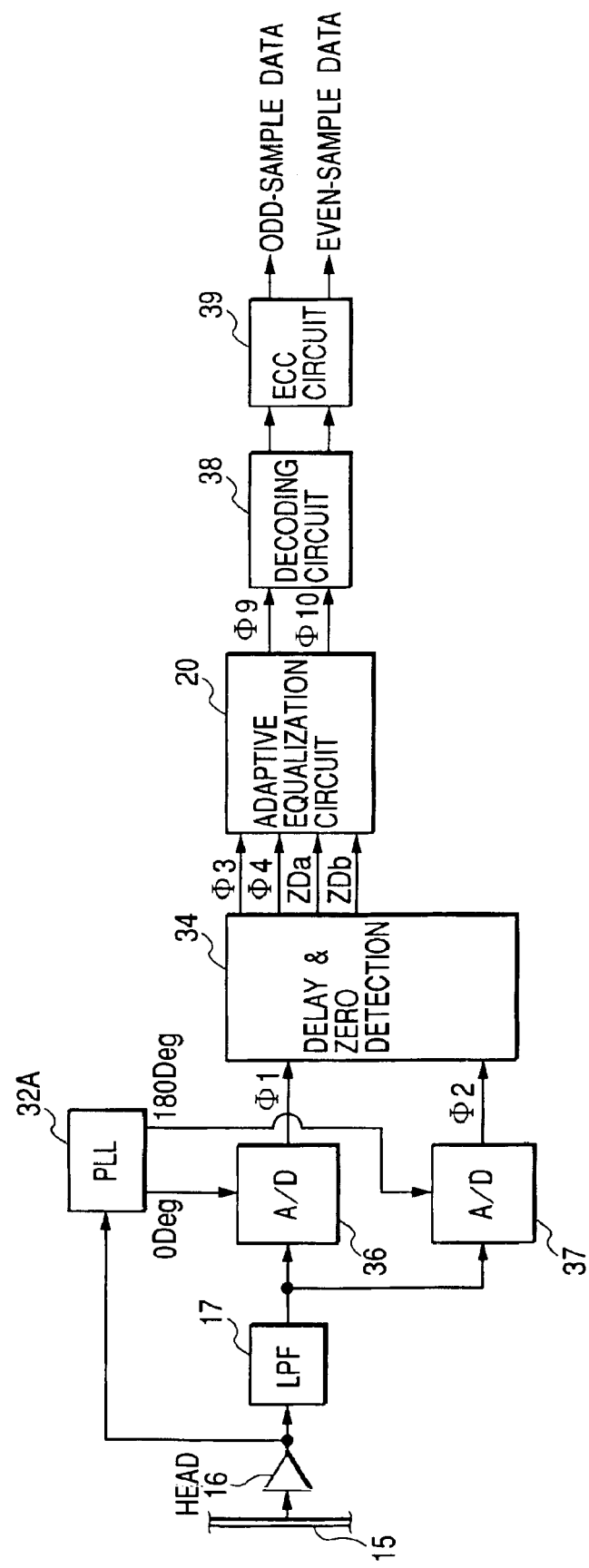
FIG. 26 is a block diagram of a reproducing apparatus according to a sixth embodiment of this invention.

FIG. 26 shows a reproducing apparatus according to a sixth embodiment of this invention. The reproducing apparatus of FIG. 26 is similar to that of FIG. 25 except for design changes mentioned hereafter. The reproducing apparatus of FIG. 26 includes a PLL circuit 32A instead of the PLL circuit 32 (see FIG. 25). The reproducing apparatus of FIG. 26 includes A/D converters 36 and 37 which replace the A/D converter 18 (see FIG. 25). The interpolation filter 33 (see FIG. 25) is omitted from the reproducing apparatus of FIG. 26.

As shown in FIG. 26, the PLL circuit 32A receives the output signal of the optical head 16. The PLL circuit 32A generates first and second clock signals from the output signal of the optical head 16. The first and second clock signals are synchronized with a bit clock signal related to the output signal of the optical head 16. The first and second clock signals have a period corresponding to two bits. Thus, the first and second clock signals have a frequency equal to half the frequency of the bit clock signal. There is a phase difference of 180° between the first clock signal and the second clock signal. The PLL circuit 32A feeds the first clock signal to the A/D converter 36. The PLL circuit 32A feeds the second clock signal to the A/D converter 37.

The A/D converter 36 periodically samples the output signal of the LPF 17 in response to the first clock signal, and converts every resultant sample into a digital sample. The A/D converter 36 outputs a sequence of digital samples to the delay and zero detection circuit 34 as a sequence of first alternate 0°-phase samples Φ1. The A/D converter 37 periodically samples the output signal of the LPF 17 in response to the second clock signal, and converts every resultant sample into a digital sample. The A/D converter 37 outputs a sequence of digital samples to the delay and zero detection circuit 34 as a sequence of second alternate 0°-phase samples Φ2.

It should be noted that the adaptive equalization circuit 20 may be replaced by the adaptive equalization circuit 20A (see FIG. 21).

Seventh Embodiment

Figure 27:
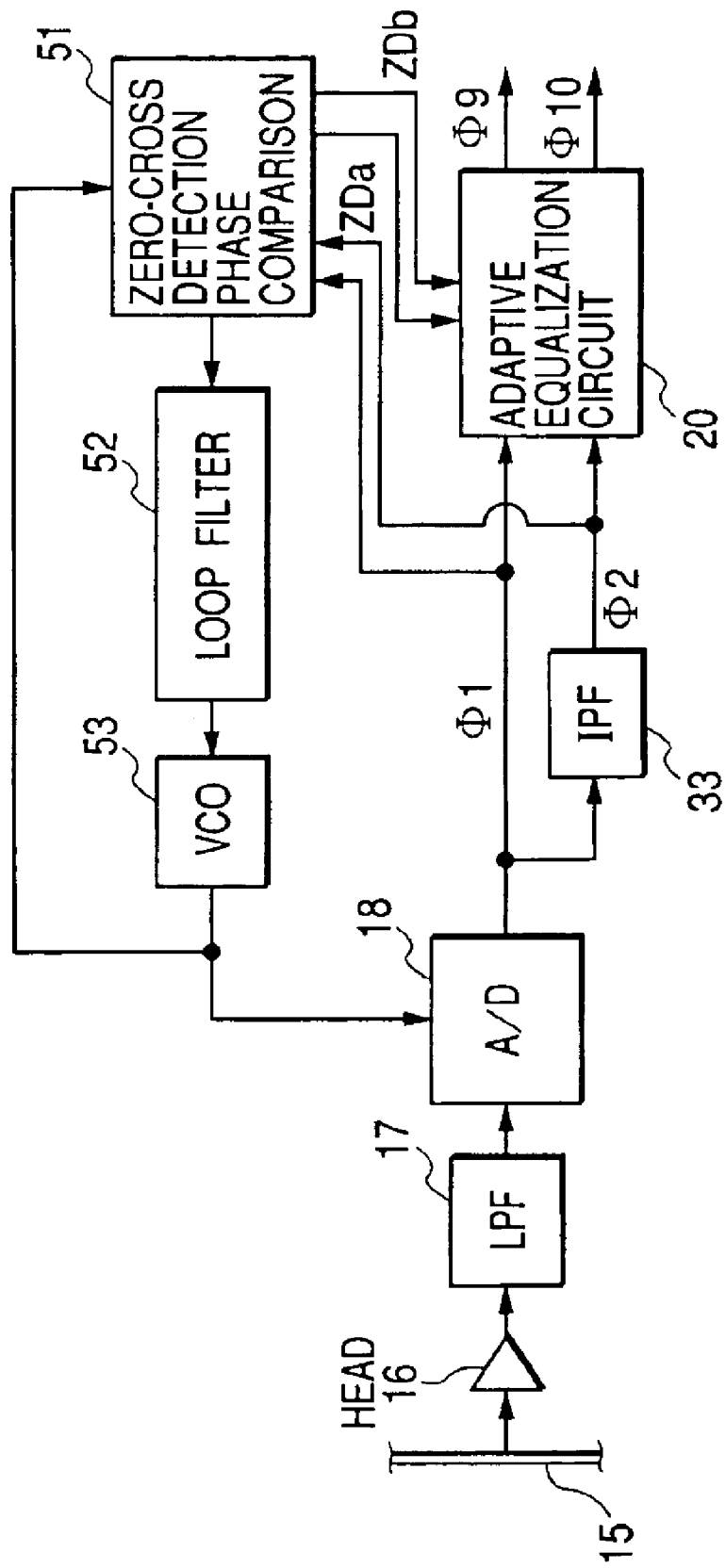
FIG. 27 is a block diagram of a portion of a reproducing apparatus according to a seventh embodiment of this invention.

FIG. 27 shows a portion of a reproducing apparatus according to a seventh embodiment of this invention. The reproducing apparatus in FIG. 27 is similar to that in FIG. 25 except for design changes mentioned hereafter. The reproducing apparatus in FIG. 27 includes a zero-cross detection and phase comparison circuit 51, a loop filter 52, and a voltage-controlled oscillator (VCO) 53 which are connected in a closed loop in that order. The PLL circuit 32 and the delay and zero detection circuit 34 (see FIG. 25) are omitted from the reproducing apparatus in FIG. 27.

The zero-cross detection and phase comparison circuit 51 receives the first 0°-phase-sample signal Φ1 from the A/D converter 18 as an odd-sample signal. The zero-cross detection and phase comparison circuit 51 receives the second 0°-phase-sample signal Φ2 from the interpolation filter 33 as an even-sample signal. The zero-cross detection and phase comparison circuit 51 combines the first 0°-phase-sample signal Φ1 and the second 0°-phase-sample signal Φ2 into a sequence of odd and even signal samples. The zero-cross detection and phase comparison circuit 51 detects every zero-cross point of the sequence of odd and even signal samples. The zero-cross detection and phase comparison circuit 51 compares the phase of the detected zero-cross point and the phase of a clock signal fed from the VCO 53, and generates a phase error signal in response to the result of the phase comparison. The zero-cross detection and phase comparison circuit 51 outputs the phase error signal to the loop filter 52. The loop filter 52 converts the phase error signal into a control voltage. The loop filter 52 outputs the control voltage to the VCO 53. The VCO 53 oscillates at a frequency determined by the control voltage, and thereby generates the clock signal. The generated clock signal is synchronized with a bit clock signal. The generated clock signal has a period corresponding to two bits. Thus, the generated clock signal has a frequency equal to half the frequency of the bit clock signal. The VCO 53 outputs the clock signal to the A/D converter 18 and the zero-cross detection and phase comparison circuit 51.

In addition, the zero-cross detection and phase comparison circuit 51 generates 0-point information in response to the detected zero-cross point. The 0-point information generated by the zero-cross detection and phase comparison circuit 51 includes 0-point information ZDa corresponding to the odd-sample signal Φ1 and 0-point information ZDb corresponding to the even-sample signal Φ2. The zero-cross detection and phase comparison circuit 51 outputs the odd-sample 0-point information ZDa and the even-sample 0-point information ZDb to the adaptive equalization circuit 20.

The adaptive equalization circuit 20 receives the first 0°-phase-sample signal Φ1 from the A/D converter 18 instead of the odd-sample signal Φ3 (see FIG. 25). The adaptive equalization circuit 20 handles the first 0°-phase-sample signal Φ1 as an odd-sample signal. The adaptive equalization circuit 20 receives the second 0°-phase-sample signal Φ2 from the interpolation filter 33 instead of the even-sample signal Φ4 (see FIG. 25). The adaptive equalization circuit 20 handles the second 0°-phase-sample signal Φ2 as an even-sample signal.

It should be noted that the adaptive equalization circuit 20 may be replaced by the adaptive equalization circuit 20A (see FIG. 21).

Eighth Embodiment

Figure 28:
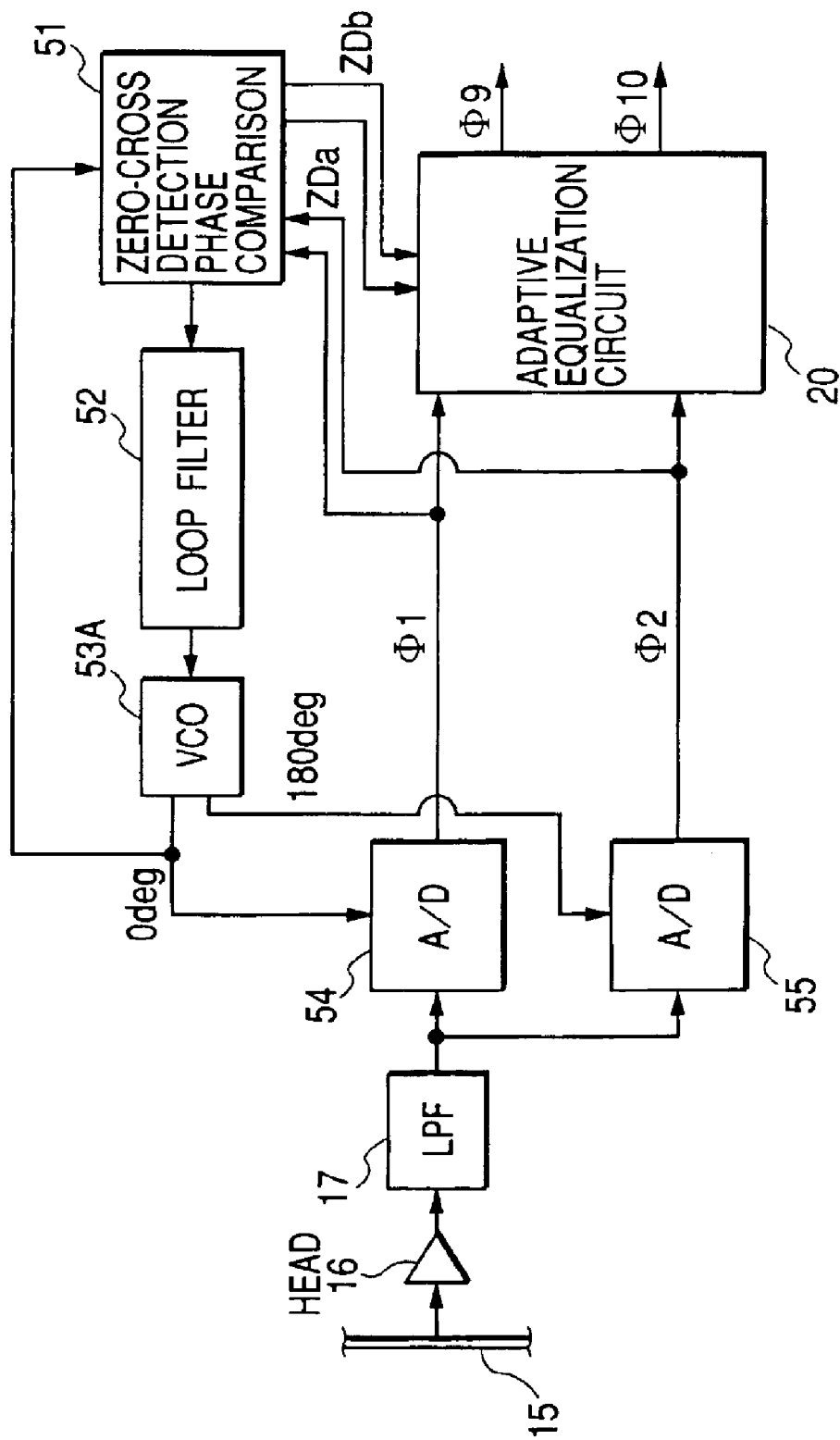
FIG. 28 is a block diagram of a portion of a reproducing apparatus according to an eighth embodiment of this invention.

FIG. 28 shows a portion of a reproducing apparatus according to an eighth embodiment of this invention. The reproducing apparatus in FIG. 28 is similar to that in FIG. 27 except for design changes mentioned hereafter. The reproducing apparatus in FIG. 28 includes a VCO 53A instead of the VCO 53 (see FIG. 27). The reproducing apparatus in FIG. 28 includes A/D converters 54 and 55 which replace the A/D converter 18 (see FIG. 27). The interpolation filter 33 (see FIG. 27) is omitted from the reproducing apparatus in FIG. 28.

The VCO 53A generates first and second clock signals in response to the output signal of the loop filter 52. The first and second clock signals are synchronized with a bit clock signal. The first and second clock signals have a period corresponding to two bits. Thus, the first and second clock signals have a frequency equal to half the frequency of the bit clock signal. There is a phase difference of 180° between the first clock signal and the second clock signal. The VCO 53A outputs the first clock signal to the zero-cross detection and phase comparison circuit 51 as a fed-back signal. In addition, the VCO 53A feeds the first clock signal to the A/D converter 54. The VOC 53A feeds the second clock signal to the A/D converter 55.

The A/D converter 54 periodically samples the output signal of the LPF 17 in response to the first clock signal, and converts every resultant sample into a digital sample. The A/D converter 54 outputs a sequence of digital samples to the adaptive equalization circuit 20 and the zero-cross detection and phase comparison circuit 51 as a sequence of first alternate 0°-phase samples Φ1. The A/D converter 55 periodically samples the output signal of the LPF 17 in response to the second clock signal, and converts every resultant sample into a digital sample. The A/D converter 55 outputs a sequence of digital samples to the adaptive equalization circuit 20 and the zero-cross detection and phase comparison circuit 51 as a sequence of second alternate 0°-phase samples Φ2.

It should be noted that the adaptive equalization circuit 20 may be replaced by the adaptive equalization circuit 20A (see FIG. 21).

Ninth Embodiment

Figure 29:
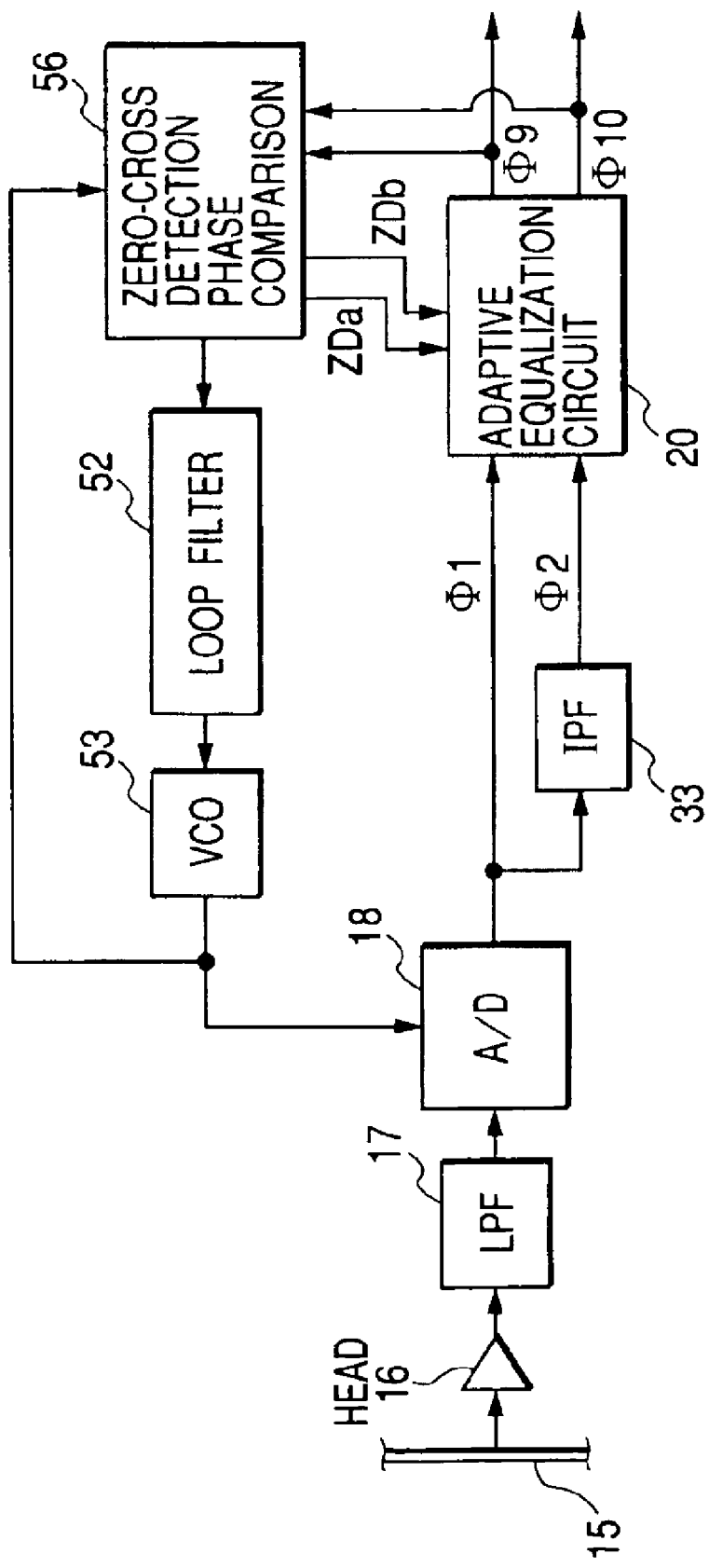
FIG. 29 is a block diagram of a portion of a reproducing apparatus according to a ninth embodiment of this invention.

FIG. 29 shows a portion of a reproducing apparatus according to a ninth embodiment of this invention. The reproducing apparatus in FIG. 29 is similar to that in FIG. 27 except that a zero-cross detection and phase comparison circuit 56 replaces the zero-cross detection and phase comparison circuit 51.

The zero-cross detection and phase comparison circuit 56 receives an equalization-resultant odd-sample signal Φ9 and an equalization-resultant even-sample signal Φ10 from the adaptive equalization circuit 20. The zero-cross detection and phase comparison circuit 56 combines the equalization-resultant odd-sample signal Φ9 and the equalization-resultant even-sample signal Φ10 into a sequence of odd and even signal samples. The zero-cross detection and phase comparison circuit 56 detects every zero-cross point of the sequence of odd and even signal samples. The zero-cross detection and phase comparison circuit 56 compares the phase of the detected zero-cross point and the phase of a clock signal fed from the VCO 53, and generates a phase error signal in response to the result of the phase comparison. The zero-cross detection and phase comparison circuit 56 outputs the phase error signal to the loop filter 52.

In addition, the zero-cross detection and phase comparison circuit 56 generates 0-point information in response to the detected zero-cross point. The 0-point information generated by the zero-cross detection and phase comparison circuit 56 includes 0-point information ZDa corresponding to the odd-sample signal Φ1 and 0-point information ZDb corresponding to the even-sample signal Φ2. The zero-cross detection and phase comparison circuit 56 outputs the odd-sample 0-point information ZDa and the even-sample 0-point information ZDb to the adaptive equalization circuit 20.

It should be noted that the adaptive equalization circuit 20 may be replaced by the adaptive equalization circuit 20A (see FIG. 21).

Tenth Embodiment

Figure 30:
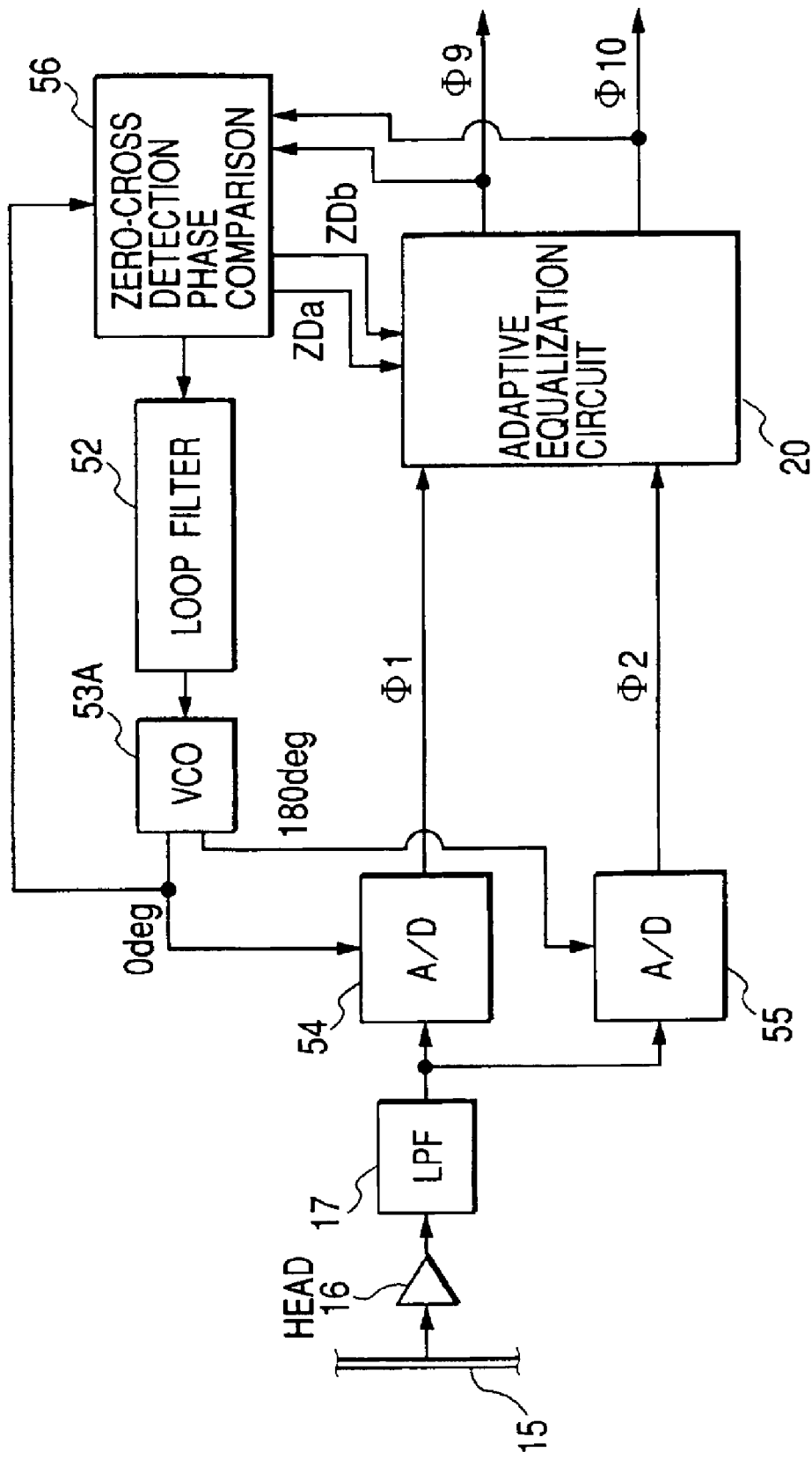
FIG. 30 is a block diagram of a portion of a reproducing apparatus according to a tenth embodiment of this invention.

FIG. 30 shows a portion of a reproducing apparatus according to a tenth embodiment of this invention. The reproducing apparatus in FIG. 30 is similar to that in FIG. 29 except for design changes mentioned hereafter. The reproducing apparatus in FIG. 30 includes a VCO 53A instead of the VCO 53 (see FIG. 29). The reproducing apparatus in FIG. 30 includes A/D converters 54 and 55 which replace the A/D converter 18 (see FIG. 29). The interpolation filter 33 (see FIG. 29) is omitted from the reproducing apparatus in FIG. 30.

The VCO 53A generates first and second clock signals in response to the output signal of the loop filter 52. The first and second clock signals are synchronized with a bit clock signal. The first and second clock signals have a period corresponding to two bits. Thus, the first and second clock signals have a frequency equal to half the frequency of the bit clock signal. There is a phase difference of 180° between the first clock signal and the second clock signal. The VCO 53A outputs the first clock signal to the zero-cross detection and phase comparison circuit 56 as a fed-back signal. In addition, the VCO 53A feeds the first clock signal to the A/D converter 54. The VOC 53A feeds the second clock signal to the A/D converter 55.

The A/D converter 54 periodically samples the output signal of the LPF 17 in response to the first clock signal, and converts every resultant sample into a digital sample. The A/D converter 54 outputs a sequence of digital samples to the adaptive equalization circuit 20 as a sequence of first alternate 0°-phase samples Φ1. The A/D converter 55 periodically samples the output signal of the LPF 17 in response to the second clock signal, and converts every resultant sample into a digital sample. The A/D converter 55 outputs a sequence of digital samples to the adaptive equalization circuit 20 as a sequence of second alternate 0°-phase samples Φ2.

It should be noted that the adaptive equalization circuit 20 may be replaced by the adaptive equalization circuit 20A (see FIG. 21).

Eleventh Embodiment

An eleventh embodiment of this invention is similar to one of the first to tenth embodiments thereof except for design changes mentioned below. According to the eleventh embodiment of this invention, a temporary decision device (for example, 110a in FIG. 8) in each of the temporary decision circuits 24a and 24b refers to only three successive 0-point information values Z.

Figure 31:
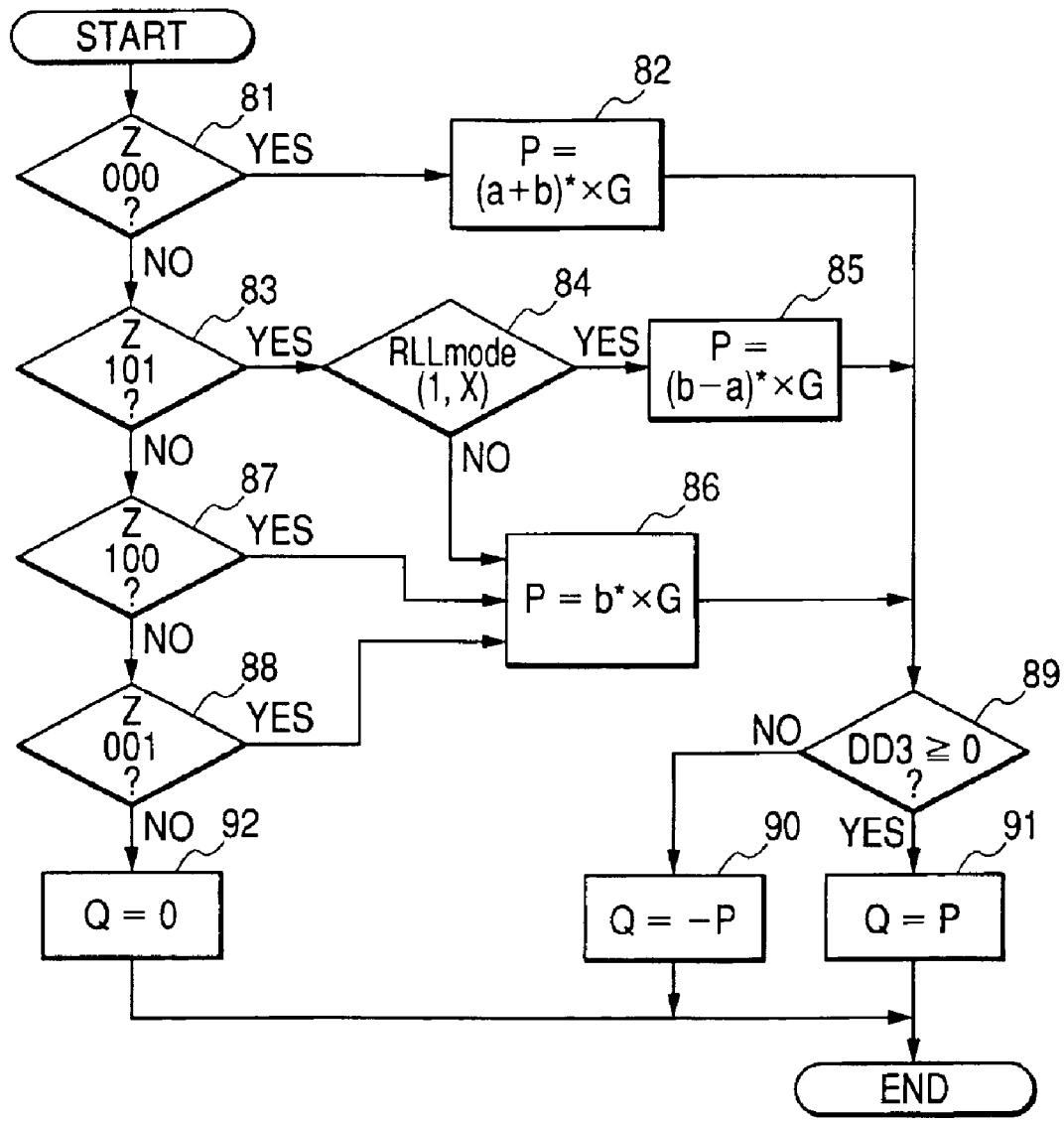
FIG. 31 is a flowchart of an algorithm of a temporary decision by a temporary decision device in an eleventh embodiment of this invention.

FIG. 31 is a flowchart of an algorithm of a temporary decision by the temporary decision device in the eleventh embodiment of this invention. The temporary decision is executed for every two periods of a bit clock signal.

As shown in FIG. 31, a first step 81 of the algorithm decides whether or not three successive 0-point information values Z represented by output signals of the tap delay circuit 23 are "000". When the three successive 0-point information values Z are "000", the algorithm advances from the step 81 to a step 82. Otherwise, the algorithm advances from the step 81 to a step 83.

In the case where the three successive 0-point information values Z are "000", the before-equalization signal waveform is fixed in a positive side or a negative side for a long time interval. Thus, in this case, the step 82 calculates a relatively large value P according to the previously-indicated equation (1). After the step 82, the algorithm advances to a step 89.

The step 83 decides whether or not the three successive 0-point information values Z are "101". When the three successive 0-point information values Z are "101", the algorithm advances from the step 83 to a step 84. Otherwise, the algorithm advances from the step 83 to a step 87.

The step 84 decides whether or not the RLL mode signal represents RLL (1, X). When the RLL mode signal represents RLL (1, X), the algorithm advances from the step 84 to a step 85. Otherwise, the program advances from the step 84 to a step 86.

Three successive 0-point information values Z being "101" can occur only in the case of RLL (1, X). According to the before-equalization signal waveform which corresponds to three successive 0-point information values Z being "101", the signal polarity changes at an early stage. Thus, in this case, the step 85 calculates a relatively small value P according to the previously-indicated equation (2). After the step 85, the algorithm advances to the step 89.

The step 87 decides whether or not the three successive 0-point information values Z are "100". When the three successive 0-point information values Z are "100", the algorithm advances from the step 87 to the step 86. Otherwise, the algorithm advances from the step 87 to a step 88.

The step 88 decides whether or not the three successive 0-point information values Z are "001". When the three successive 0-point information values Z are "001", the algorithm advances from the step 88 to the step 86. Otherwise, the algorithm advances from the step 88 to a step 92.

In the case where the three successive 0-point information values Z are "101" and the RLL mode signal does not represent RLL (1, X), and in the case where the three successive 0-point information values Z are "100" or "001", the before-equalization signal level remains in the same for a short time interval. Thus, in this case, the step 86 calculates an intermediate value P according to the previously-indicated equation (3). After the step 86, the algorithm advances to the step 89.

The step 89 detects the polarity of the present-moment signal DD3. Specifically, the step 89 decides whether or not the present-moment signal DD3 is smaller than "0". When the present-moment signal DD3 is equal to or greater than "0", the algorithm advances from the step 89 to a step 91. When the present-moment signal DD3 is smaller than "0", the algorithm advances from the step 89 to a step 90.

The step 91 sets a temporary decision level (a temporary decision value or a temporary decision result value) Q equal to the value P. On the other hand, the step 90 sets the temporary decision level Q equal to the value −P (the value P multiplied by −1). After the steps 90 and 91, the current execution cycle of the temporary decision ends.

The step 92 sets the temporary decision level Q equal to "0". The algorithm advances to the step 92 in cases including the case where the central one among the three successive 0-point information values Z is "1". After the step 92, the current execution cycle of the temporary decision ends.

The temporary decision device outputs a signal representative of the temporary decision level (the temporary decision value) Q to the subtracter (for example, 111a in FIG. 8) as a temporary decision result signal. The temporary decision value Q is determined on the basis of one of the previously-indicated equations (1), (2), and (3). Accordingly, the equalization by the transversal filter 21a or 21b is based on one of the equations (1), (2), and (3). The equalization based on one of the equations (1), (2), and (3) is periodically executed in response to the polarity of the present-moment signal DD3 at a timing of the central one (the second one) among three successive 0-point information values Z.

Twelfth Embodiment

Figure 32:
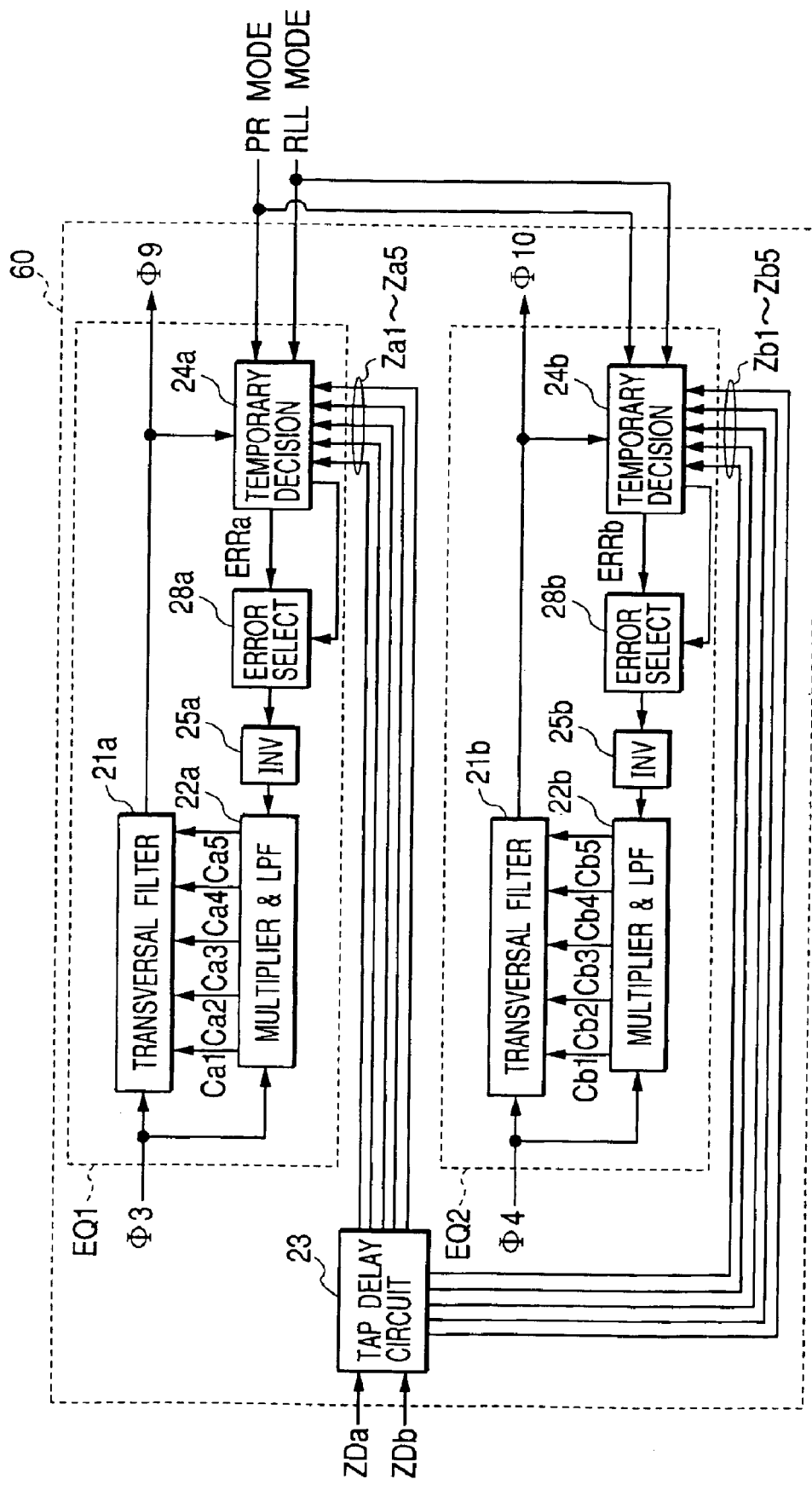
FIG. 32 is a block diagram of an adaptive equalization circuit in a twelfth embodiment of this invention.

A twelfth embodiment of this invention is similar to one of the first, fifth, sixth, seventh, eighth, ninth, tenth, and eleventh embodiments thereof except that an adaptive equalization circuit 60 replaces the adaptive equalization circuit 20. FIG. 32 shows the adaptive equalization circuit 60. The adaptive equalization circuit 60 is modified from the adaptive equalization circuit 20 so that an error selection circuit 28a is provided between the temporary decision circuit 24a and the inverter 25a, and an error selection circuit 28b is provided between the temporary decision circuit 24b and the inverter 25b.

The error selection circuit 28a receives an error signal ERRa and a specified output signal from the temporary decision circuit 24a. The error selection circuit 28a processes the received error signal ERRa into a final error signal in response to the specified output signal from the temporary decision circuit 24a. The error selection circuit 28a outputs the final error signal to the inverter 25a. The inverter 25a acts on the output signal of the error selection circuit 28a.

The error selection circuit 28b receives an error signal ERRb and a specified output signal from the temporary decision circuit 24b. The error selection circuit 28b processes the received error signal ERRb into a final error signal in response to the specified output signal from the temporary decision circuit 24b. The error selection circuit 28b outputs the final error signal to the inverter 25b. The inverter 25b acts on the output signal of the error selection circuit 28b.

Figure 33:
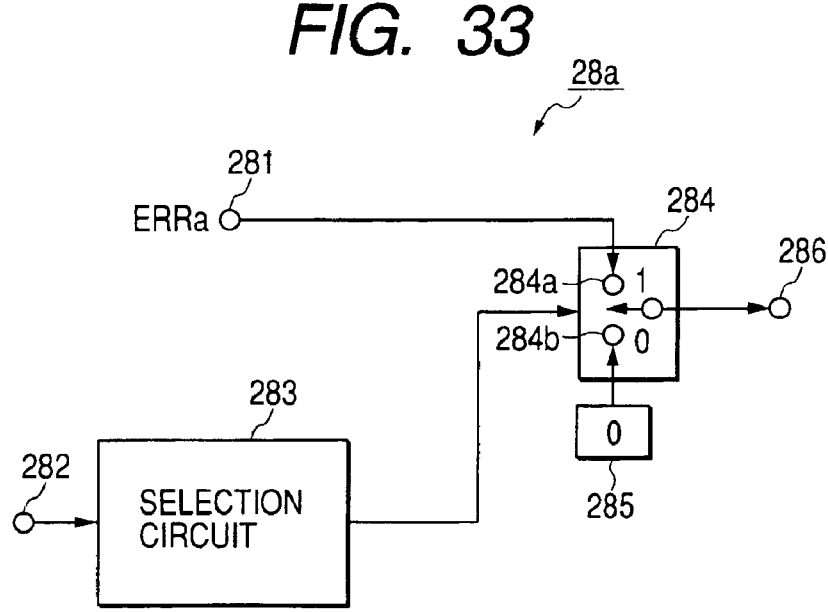
FIG. 33 is a block diagram of an error selection circuit in FIG. 32.

The error selection circuits 28a and 28b are similar to each other. Only the error selection circuit 28a will be explained below in detail. As shown in FIG. 33, the error selection circuit 28a includes a selection circuit 283, a switch 284, and a "0" generator 285. The selection circuit 283 receives the temporary decision result signal from the temporary decision device 110a (see FIG. 8) within the temporary decision circuit 24a via a terminal 282. The temporary decision result signal constitutes the specified output signal from the temporary decision device 110a.

The selection circuit 283 operates as follows. In the case of RLL (2, X), when the temporary decision result signal corresponds to the value +b* or the value −b*, the selection circuit 283 decides that the present value occurs immediately before or after a zero-cross point. Thus, in this case, the selection circuit 283 outputs a "1" signal to a control terminal of the switch 284. When the temporary decision result signal corresponds to a value equal to none of the value +b* and the value −b*, the selection circuit 283 outputs a "0" signal to the control terminal of the switch 284.

In the case of RLL (1, X), when the temporary decision result signal corresponds to the value +(b−a)* or the value −(b−a)*, the selection circuit 283 decides that the present value occurs immediately before or after a zero-cross point. Thus, in this case, the selection circuit 283 outputs a "1" signal to the control terminal of the switch 284. When the temporary decision result signal corresponds to a value equal to none of the value +(b−a)* and the value −(b−a)*, the selection circuit 283 outputs a "0" signal to the control terminal of the switch 284.

A first input side 284a of the switch 284 receives the error signal ERRa from the subtracter 111a (see FIG. 8) within the temporary decision circuit 24a via a terminal 281. The "0" generator 285 continuously outputs a "0" signal to a second input side 284b of the switch 284. The switch 284 selects one from the error signal ERRa and the "0" signal in response to the output signal of the selection circuit 283, and outputs the selected signal to the inverter 25a via a terminal 286 as a final error signal. Specifically, the switch 284 selects the error signal ERRa when the output signal of the selection circuit 283 is "1". The switch 284 selects the "0" signal when the output signal of the selection circuit 283 is "0".

Figure 34:
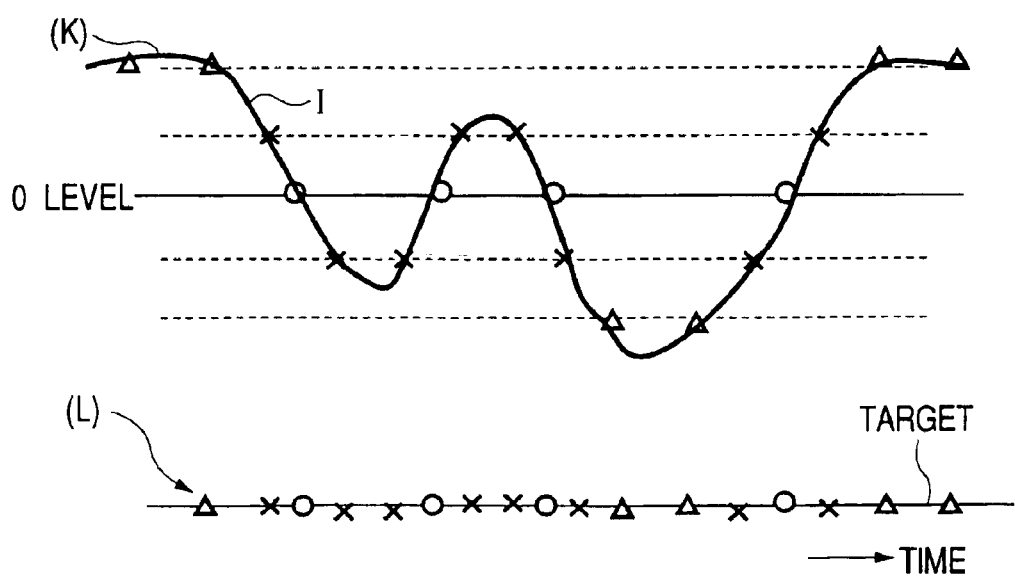
FIG. 34 is a time-domain diagram of a first example of an equalization-resultant waveform and an error signal.

FIG. 34 shows an example of a waveform (K) represented by RLL (2, X) signal samples resulting from correct PR equalization implemented by the adaptive equalization circuit 20 which does not have the error selection circuits 28a and 28b. Regarding the equalization-resultant waveform (K), sample points corresponding to a target value equal to "0" are denoted by the circles. Sample points corresponding to target values equal to +b* and −b* are denoted by the crosses. Sample points corresponding to target values equal to +(a+b)* and −(a+b)* are denoted by the triangles. FIG. 34 also shows an error signal (L) generated in correspondence with the equalization-resultant waveform (K). The error signal (L) only slightly deviates from a target.

Figure 35:
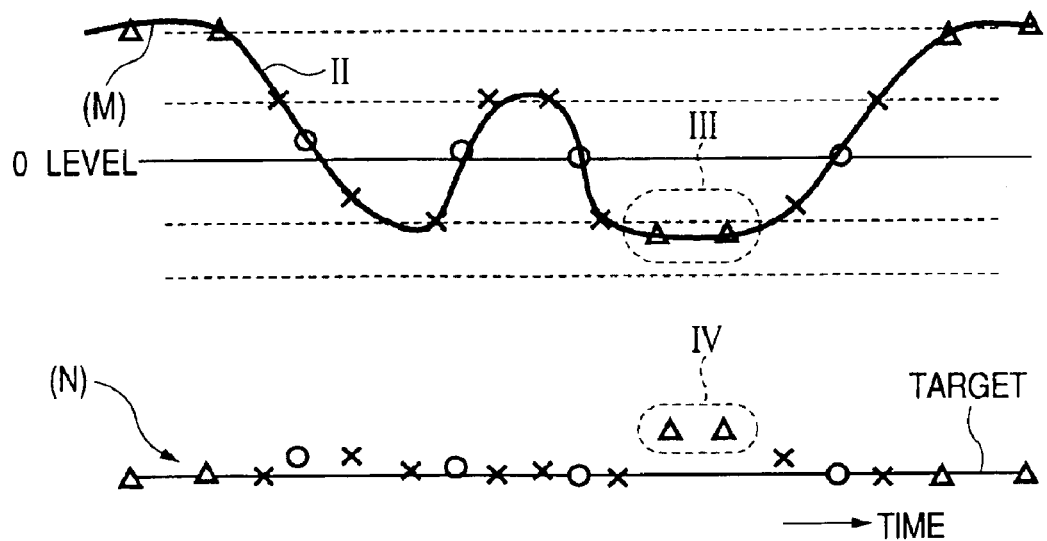
FIG. 35 is a time-domain diagram of a second example of an equalization-resultant waveform and an error signal.

FIG. 35 shows an example of a waveform (M) represented by RLL (2, X) signal samples resulting from PR equalization implemented by the adaptive equalization circuit 20 which does not have the error selection circuits 28a and 28b. The equalization-resultant waveform (M) is similar to the equalization-resultant waveform (K) in FIG. 34 except a time range III which is relatively remote from zero-cross points. Regarding the equalization-resultant waveform (M), sample points corresponding to a target value equal to "0" are denoted by the circles. Sample points corresponding to target values equal to +b* and −b* are denoted by the crosses. Sample points corresponding to target values equal to +(a+b)* and −(a+b)* are denoted by the triangles. The equalization-resultant waveform (M) has a distortion in the time range III where sample points significantly deviate from a target value. FIG. 35 also shows an error signal (N) generated in correspondence with the equalization-resultant waveform (M). In a time range IV corresponding to the time range III, the error signal (N) significantly deviates from a target.

Each of the error selection circuits 28a and 28b corrects such an unreliable error signal into a reliable error signal (a final error signal). In the case of RLL (2, X), when the temporary decision result signal corresponds to the value +b* or the value −b*, the selection circuit 283 within the error selection circuit 28a or 28b decides that the present value occurs immediately before or after a zero-cross point. Thus, in this case, the selection circuit 283 outputs a "1" signal to the control terminal of the switch 284. The switch 284 selects the error signal ERRa (or ERRb) from the temporary decision circuit 24a (or 24b) in response to the output signal of the selection circuit 283. Accordingly, the error signal from the temporary decision circuit 24a or 24b is used as the final error signal. On the other hand, when the temporary decision result signal corresponds to a value equal to neither the value +b* nor the value −b*, the selection circuit 283 decides that the present value occurs at a moment remote from zero-cross points. Thus, in this case, the selection circuit 283 outputs a "0" signal to the control terminal of the switch 284. The switch 284 selects the "0" signal from the "0" generator 285 in response to the output signal of the selection circuit 283. Accordingly, the error signal from the temporary decision circuit 24a or 24b is not used while the final error signal is fixed to "0".

Figure 36:
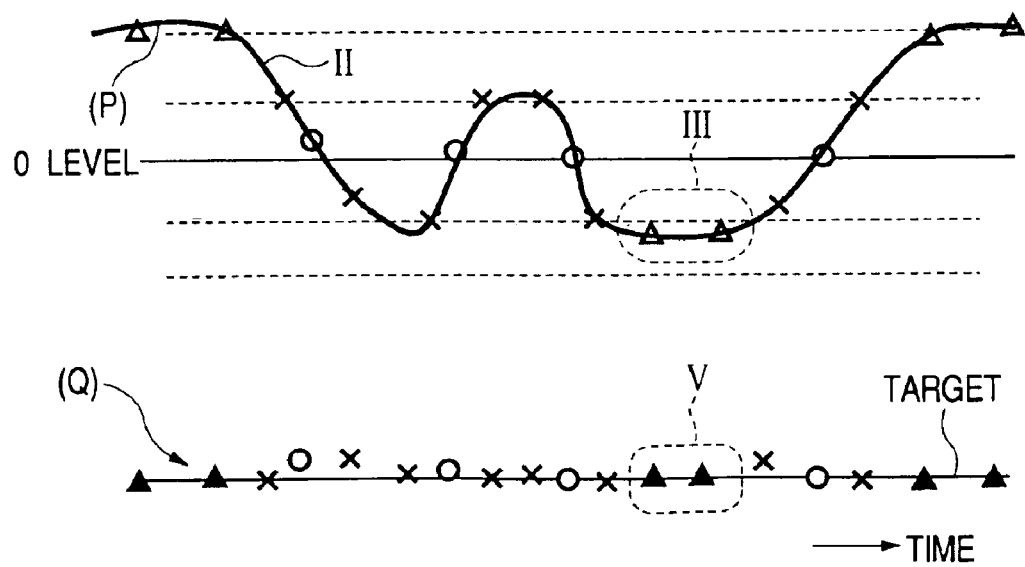
FIG. 36 is a time-domain diagram of a third example of an equalization-resultant waveform and an error signal.

FIG. 36 shows an example of a waveform (P) represented by RLL (2, X) signal samples resulting from PR equalization implemented by the adaptive equalization circuit 60 which has the error selection circuits 28a and 28b. The equalization-resultant waveform (P) is similar to the equalization-resultant waveform (K) in FIG. 34 except a time range III which is relatively remote from zero-cross points. Regarding the equalization-resultant waveform (P), sample points corresponding to a target value equal to "0" are denoted by the circles. Sample points corresponding to target values equal to +b* and −b* are denoted by the crosses. Sample points corresponding to target values equal to +(a+b)* and −(a+b)* are denoted by the triangles. The equalization-resultant waveform (P) has a distortion in the time range III where sample points significantly deviate from a target value. Each of the error selection circuits 28a and 28b compensates for such a signal distortion which occurs in a time range remote from zero-cross points. FIG. 36 also shows a combination (Q) of final error signals generated by the error selection circuits 28a and 28b in correspondence with the equalization-resultant waveform (P). In a time range V corresponding to the time range III, each of the error selection circuits 28a and 28b prevents significant deviation of the final error signal (Q) from a target.

Thirteenth Embodiment

Figure 37:
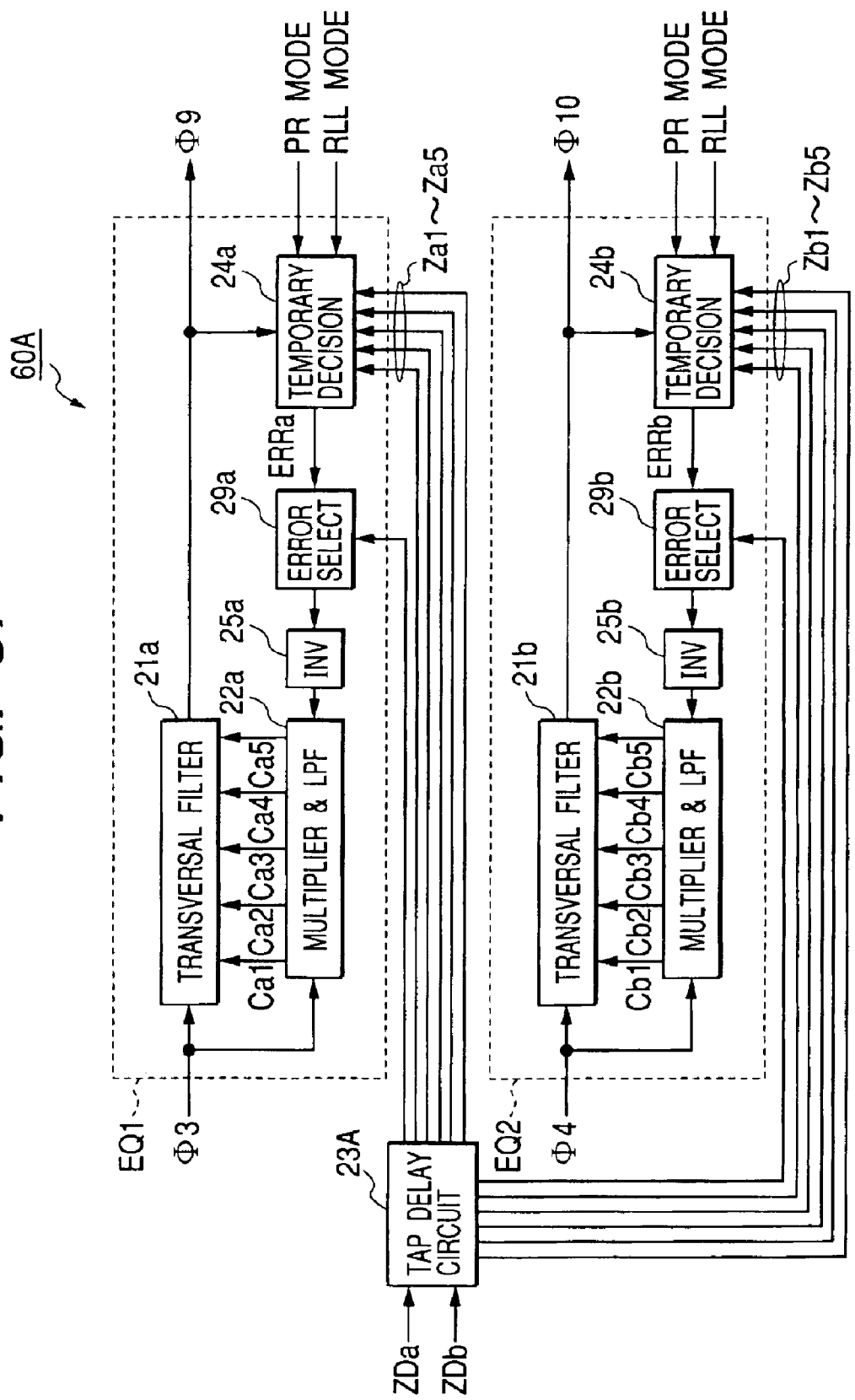
FIG. 37 is a block diagram of an adaptive equalization circuit in a thirteenth embodiment of this invention.

A thirteenth embodiment of this invention is similar to the twelfth embodiment thereof except that an adaptive equalization circuit 60A replaces the adaptive equalization circuit 60. FIG. 37 shows the adaptive equalization circuit 60A. The adaptive equalization circuit 60A is modified from the adaptive equalization circuit 60 (see FIG. 32) in points mentioned later.

The adaptive equalization circuit 60A includes a tap delay circuit 23A instead of the tap delay circuit 23 (see FIG. 32). In addition, the adaptive equalization circuit 60A includes error selection circuits 29a and 29b which replace the error selection circuits 28a and 28b (see FIG. 32). The error section circuit 29a is connected among the tap delay circuit 23A, the temporary decision circuit 24a, and the inverter 25a. The error section circuit 29b is connected among the tap delay circuit 23A, the temporary decision circuit 24b, and the inverter 25b. The error selection circuits 29a and 29b are similar to each other. Only the error selection circuit 29a will be explained later in detail.

Figure 38:
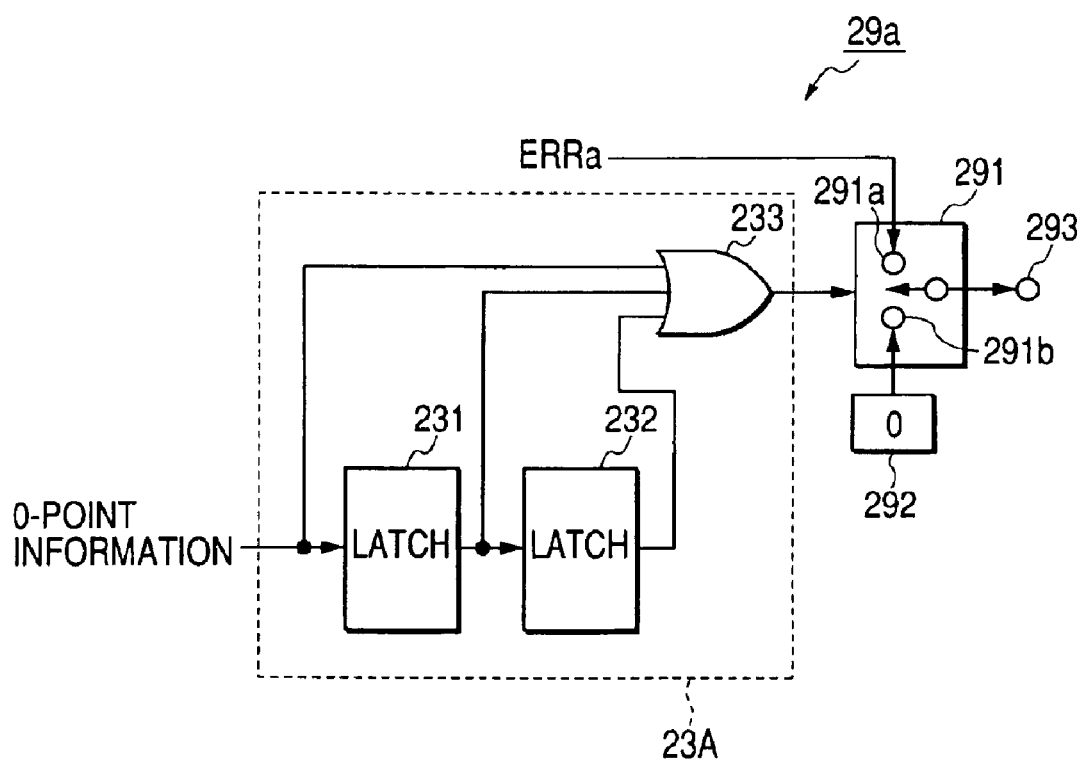
FIG. 38 is a block diagram of an error selection circuit and a portion of a tap delay circuit in FIG. 37.

The tap delay circuit 23A has an arrangement in addition to the design of the tap delay circuit 23 for each of the odd-sample side and the even-sample side. With reference to FIG. 38, the additional arrangement in the tap delay circuit 23A includes latch circuits 231 and 232, and an OR circuit 233. The tap delay circuit 23A includes a section for combining an odd-sample 0-point information ZDa and an even-sample 0-point information ZDb into a composite 0-point information. The latch circuit 231 receives the composite 0-point information. Also, a first input terminal of the OR circuit 233 receives the composite 0-point information. The latch circuit 231 and the first input terminal of the OR circuit 233 may receive the odd-sample 0-point information ZDa (or the even-sample 0-point information ZDb). The latch circuit 231 delays the received 0-point information by a time interval equal to one period of the bit clock signal. The latch circuit 231 may delay the received 0-point information by a time interval equal to two periods of the bit clock signal. The latch circuit 231 outputs the resultant signal to the latch circuit 232 and the OR circuit 233. The latch circuit 232 delays the output signal of the latch circuit 231 by a time interval equal to one period of the bit clock signal. The latch circuit 232 may delay the output signal of the latch circuit 231 by a time interval equal to two periods of the bit clock signal. The latch circuit 232 outputs the resultant signal to the OR circuit 233. Accordingly, the OR circuit 233 receives the non-delayed 0-point information, the output signal of the latch circuit 231, and the output signal of the latch circuit 232 which are three successive samples of the 0-point information. When at least one of the three successive samples of the 0-point information is "1", the OR circuit 233 outputs a "1" signal. When all of the three successive samples of the 0-point information are "0", the OR circuit 233 outputs a "0" signal.

As shown in FIG. 38, the error selection circuit 29a includes a switch 291 and a "0" generator 292. The switch 291 has a control terminal subjected to the output signal of the OR circuit 233 within the tap delay circuit 23A. A first input side 291a of the switch 291 receives the error signal ERRa from the temporary decision circuit 24a. The "0" generator 292 continuously outputs a "0" signal to a second input side 291b of the switch 291. The switch 291 selects one from the error signal ERRa and the "0" signal in response to the output signal of the OR circuit 233, and outputs the selected signal to the inverter 25a via a terminal 293 as a final error signal. Specifically, the switch 291 selects the error signal ERR when the output signal of the OR circuit 233 is "1". The switch 291 selects the "0" signal when the output signal of the OR circuit 233 is "0".

In a time range at or near a zero-cross point, at least one of three successive samples of the 0-point information which are applied to the OR circuit 233 is "1" so that the OR circuit 233 outputs a "1" signal to the control terminal of the switch 291. The switch 291 selects the error signal ERRa from the temporary decision circuit 24a in response to the output signal of the OR circuit 233. Accordingly, the error signal ERRa from the temporary decision circuit 24a is used as the final error signal. On the other hand, in a time range remote from zero-cross points, all of three successive samples of the 0-point information which are applied to the OR circuit 233 are "0" so that the OR circuit 233 outputs a "0" signal to the control terminal of the switch 291. The switch 291 selects the "0" signal from the "0" generator 292 in response to the output signal of the OR circuit 233. Accordingly, the error signal ERRa from the temporary decision circuit 24a is not used while the final error signal is fixed to "0". Thus, the error selection circuit 29a compensates for a reduction in the reliability of the error signal which might occur in a time range remote from zero-cross points.

Fourteenth Embodiment

A fourteenth embodiment of this invention is similar to one of the first to tenth, twelfth, and thirteenth embodiments thereof except for design changes mentioned below.

Figure 39:
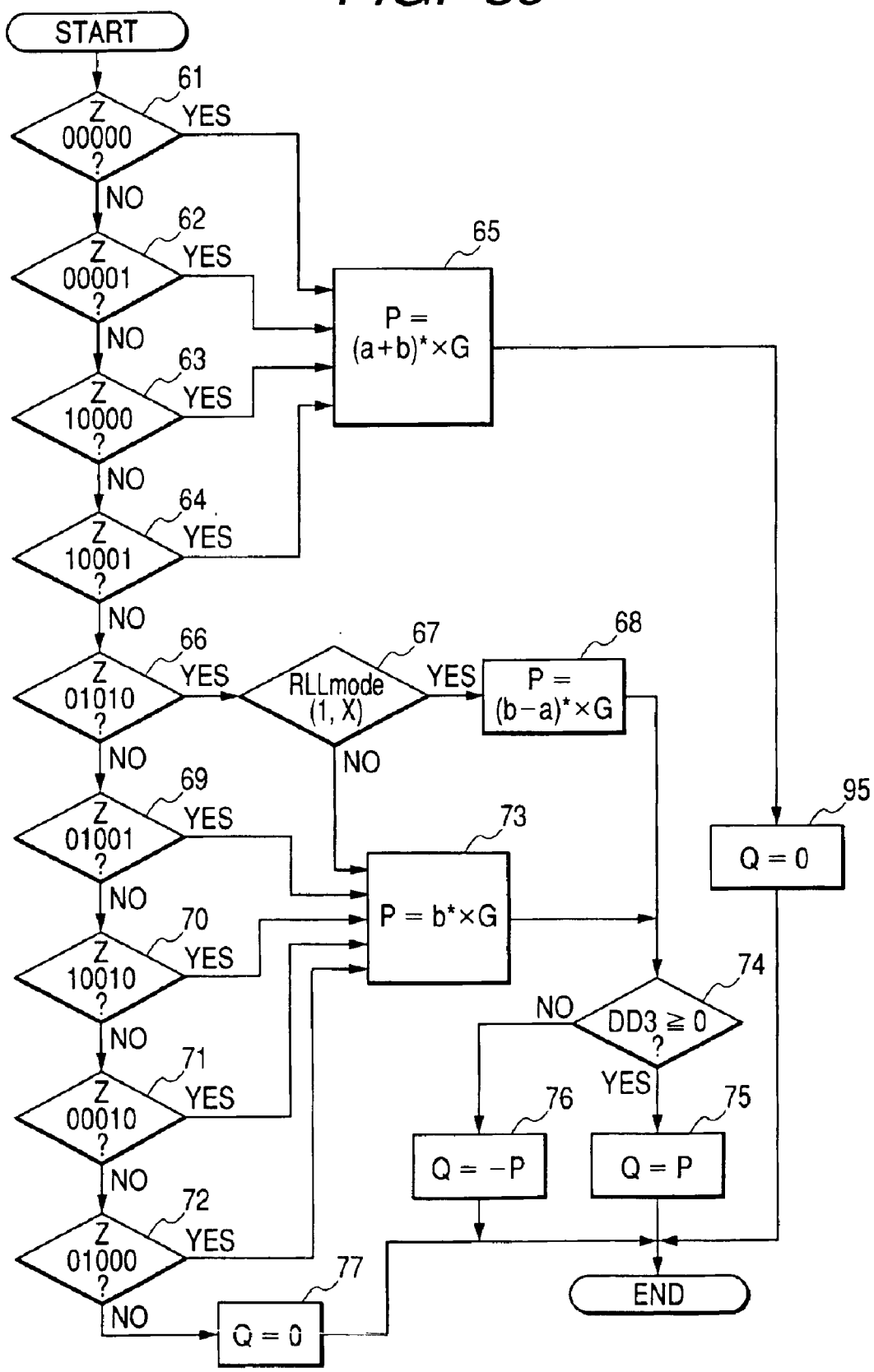
FIG. 39 is a flowchart of an algorithm of a temporary decision by a temporary decision device in a fourteenth embodiment of this invention.

FIG. 39 is a flowchart of an algorithm of a temporary decision by a temporary decision device (for example, 110a in FIG. 8) in each of the temporary decision circuits 24a and 24b in the fourteenth embodiment of this invention. The temporary decision is executed for every two periods of a bit clock signal. The algorithm of FIG. 39 is modified from the algorithm of FIG. 13 in the following points.

As shown in FIG. 39, after the step 65, the algorithm advances to a step 95. The step 95 sets a temporary decision level Q equal to "0". After the step 95, the current execution cycle of the temporary decision ends.

Five successive 0-point information values Z being "00000", "00001", "10000", or "10001" correspond to a time range remote from zero-cross points. Thus, the algorithm advances to the step 95 via the step 65 and the temporary decision level Q is set to "0" by the step 95 for a time range remote from zero-cross points. Therefore, the step 95 compensates for a reduction in the reliability of an error signal which might occur in such a time range.

Fifteenth Embodiment

A fifteenth embodiment of this invention is similar to one of the first to tenth and twelfth to fourteenth embodiments thereof except for design changes mentioned below. According to the fifteenth embodiment of this invention, a temporary decision device (for example, 110a in FIG. 8) in each of the temporary decision circuits 24a and 24b refers to only three successive 0-point information values Z.

Figure 40:
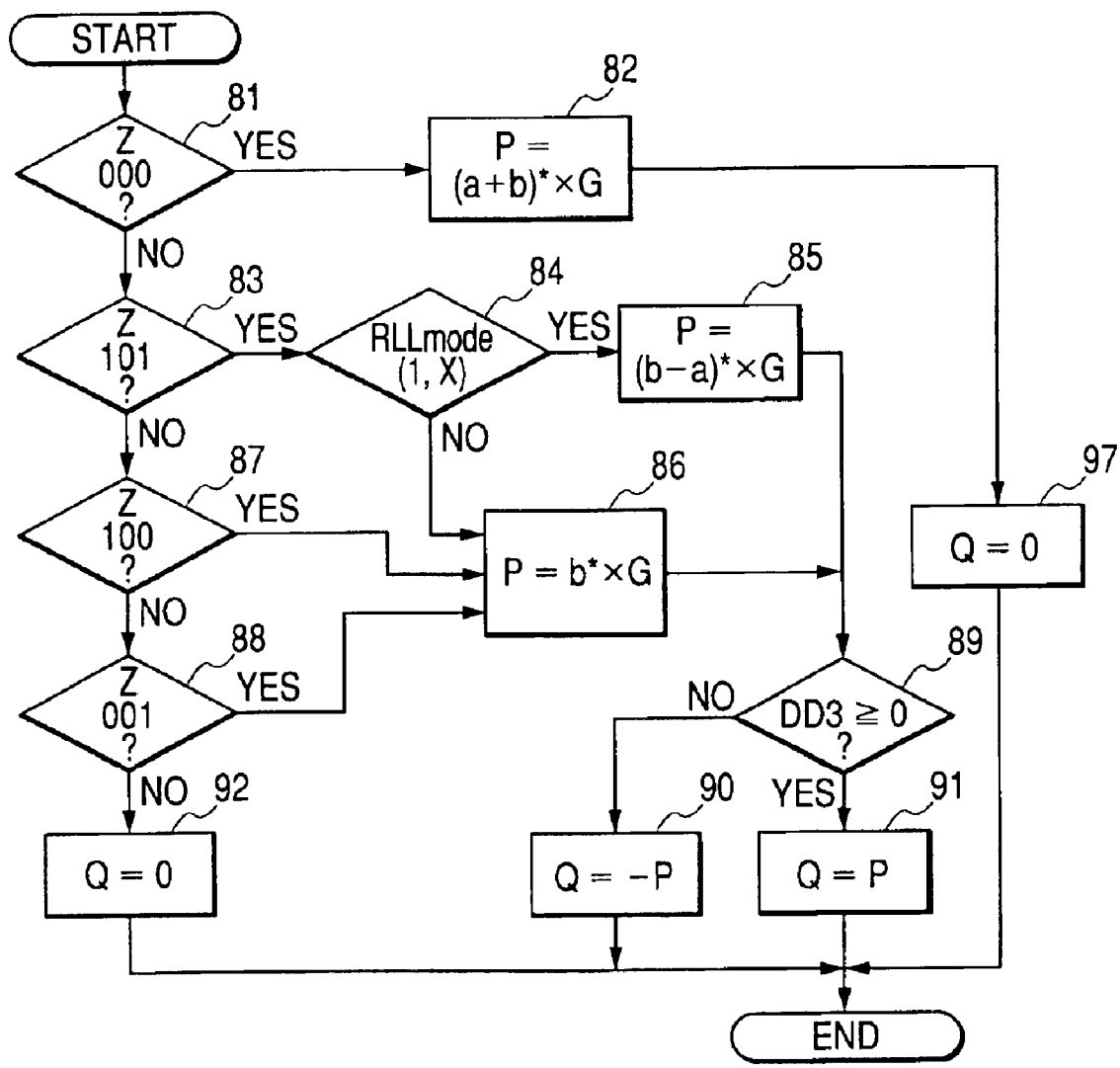
FIG. 40 is a flowchart of an algorithm of a temporary decision by a temporary decision device in a fifteenth embodiment of this invention.

FIG. 40 is a flowchart of an algorithm of a temporary decision by the temporary decision device in each of the temporary decision circuits 24a and 24b in the fifteenth embodiment of this invention. The temporary decision is executed for every two periods of a bit clock signal. The algorithm of FIG. 40 is modified from the algorithm of FIG. 31 in the following points.

As shown in FIG. 40, after the step 82, the algorithm advances to a step 97. The step 97 sets a temporary decision level Q equal to "0". After the step 97, the current execution cycle of the temporary decision ends.

Three successive 0-point information values Z being "000" correspond to a time range remote from zero-cross points. Thus, the algorithm advances to the step 97 via the step 82 and the temporary decision level Q is set to "0" by the step 97 for a time range remote from zero-cross points. Therefore, the step 97 compensates for a reduction in the reliability of an error signal which might occur in such a time range.

Sixteenth Embodiment

A sixteenth embodiment of this invention is similar to one of the first to fourth and eleventh to fifteenth embodiments thereof except for design changes mentioned below. The sixteenth embodiment of this invention includes first, second, third, and fourth FIFO (fast-in fast-out) memories each connected between the re-sampling DPLL section 19 and the adaptive equalization circuit 20 (or 20A).

The odd-sample signal Φ3 from the re-sampling DPLL section 19 is periodically written into the first FIFO memory at a timing determined by the bit clock signal. As previously mentioned, the bit clock signal is generated by the re-sampling DPLL section 19. The even-sample signal Φ4 from the re-sampling DPLL section 19 is periodically written into the second FIFO memory at a timing determined by the bit clock signal. The odd-sample 0-point information ZDa from the re-sampling DPLL section 19 is periodically written into the third FIFO memory at a timing determined by the bit clock signal. The even-sample 0-point information ZDb from the re-sampling DPLL section 19 is periodically written into the fourth FIFO memory at a timing determined by the bit clock signal.

The first, second, third, and fourth FIFO memories receive a new clock signal from an oscillator as a read clock signal. The new clock signal has a frequency equal to a mean of the frequency of the bit clock signal. The odd-sample signal Φ3 is periodically read out from the first FIFO memory in response to the new clock signal before being fed to the adaptive equalization circuit 20 (or 20A). The even-sample signal Φ4 is periodically read out from the second FIFO memory in response to the new clock signal before being fed to the adaptive equalization circuit 20 (or 20A). The odd-sample 0-point information ZDa is periodically read out from the third FIFO memory in response to the new clock signal before being fed to the adaptive equalization circuit 20 (or 20A). The even-sample 0-point information ZDb is periodically read out from the fourth FIFO memory in response to the new clock signal before being fed to the adaptive equalization circuit 20 (or 20A).

It should be noted that the first, second, third, and fourth FIFO memories may be replaced by other memories such as RAMs.

Seventeenth Embodiment

A seventeenth embodiment of this invention is similar to one of the first to sixteenth embodiments thereof except that at least one of the RLL mode signal and the PR mode signal applied to the temporary decision circuits 24a and 24b is fixed.

Eighteenth Embodiment

An eighteenth embodiment of this invention is similar to one of the first to seventeenth embodiments thereof except that the inverter 25a is replaced by a first inverter array receiving the tap output signals from the transversal filter 21a, and the inverter 25b is replaced by a second inverter array receiving the tap output signals from the transversal filter 21b. The first inverter array inverts the tap output signals from the transversal filter 21a, and outputs the inversion-resultant signals to the multiplier and LPF section 22a. The second inverter array inverts the tap output signals from the transversal filter 21b, and outputs the inversion-resultant signals to the multiplier and LPF section 22b.

Nineteenth Embodiment

A nineteenth embodiment of this invention is similar to one of the first to seventeenth embodiments thereof except that the inverter 25a is replaced by a first inverter array receiving the output signals of the multiplier and LPF section 22a which represent tap coefficients Ca1–Ca5, and the inverter 25b is replaced by a second inverter array receiving the output signals of the multiplier and LPF section 22b which represent tap coefficients Cb1–Cb5. The first inverter array inverts the tap-coefficient signals from the multiplier and LPF section 22a, and outputs the inversion-resultant signals to the transversal filter 21a. The second inverter array inverts the tap-coefficient signals from the multiplier and LPF section 22b, and outputs the inversion-resultant signals to the transversal filter 21b.

Twentieth Embodiment

A twentieth embodiment of this invention is similar to one of the first to seventeenth embodiments thereof except that the inverter 25a is replaced by an arrangement which changes the polarity of the odd-sample signal Φ3 within the transversal filter 21a, and the inverter 25b is replaced by an arrangement which changes the polarity of the even-sample signal Φ4 within the transversal filter 21b.

Twenty-first Embodiment

A twenty-first embodiment of this invention is similar to one of the first to seventeenth embodiments thereof except that the inverter 25a is replaced by an arrangement which implements signal-polarity inversion at a place in the loop of an odd-sample signal propagation path, and the inverter 25b is replaced by an arrangement which implements signal-polarity inversion at a place in the loop of an even-sample signal propagation path.

Twenty-second Embodiment

Figure 41:
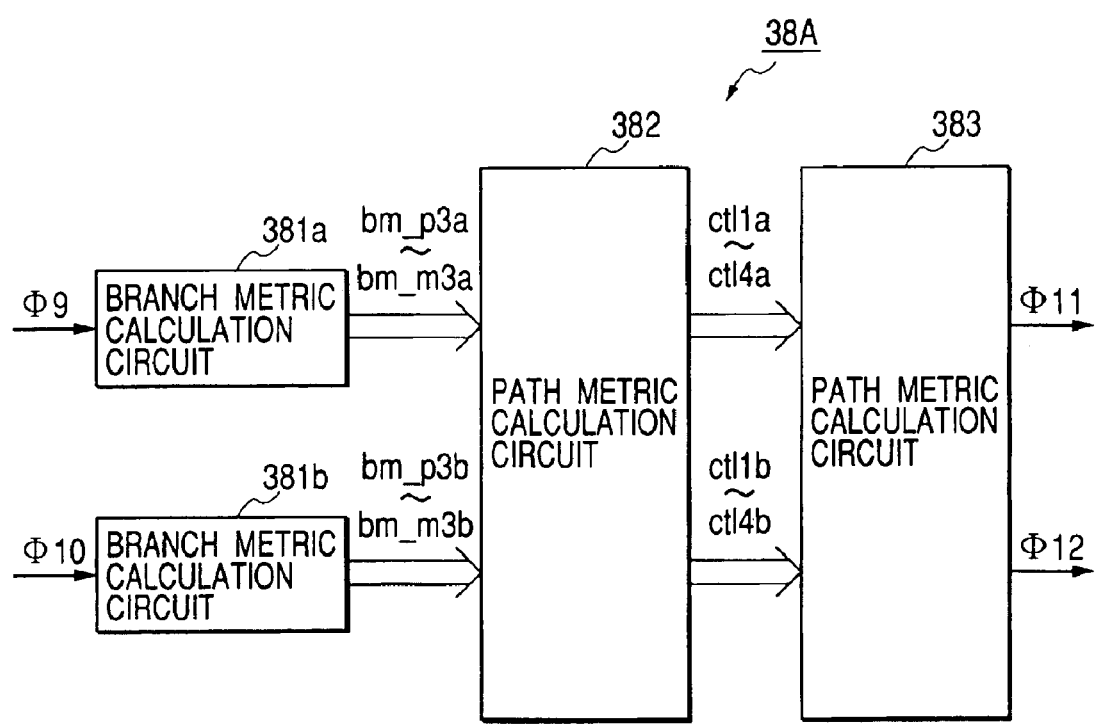
FIG. 41 is a block diagram of a decoding circuit in a twenty-second embodiment of this invention.

A twenty-second embodiment of this invention is similar to one of the first to twenty-first embodiments thereof except that a decoding circuit 38A replaces the decoding circuit 38. FIG. 41 shows the decoding circuit 38A. As shown in FIG. 41, the decoding circuit 38A includes a branch metric calculation circuits 381a and 381b, a path metric calculation circuit 382, and a path memory calculation circuit 383.

The branch metric calculation circuit 381a receives the equalization-resultant odd-sample signal Φ9 from the adaptive equalization circuit 20. The branch metric calculation circuit 381a computes branch metric values (the squares of Euclidean distances or differences from all possible values indicated by state transitions, or the addition of the negative polarity thereto) bm_p3a, bm_p2a, bm_P1a, bm_0a, mb_m1a, bm_m2a, and bm_m3a from samples of the output signal Φ9 of the adaptive equalization circuit 20. The branch metric calculation circuit 381a informs the path metric calculation circuit 382 of the computed branch metric values bm_p3a to bm_m3a.

The branch metric calculation circuit 381b receives the equalization-resultant even-sample signal Φ10 from the adaptive equalization circuit 20. The branch metric calculation circuit 381b computes branch metric values (the squares of Euclidean distances or differences from all possible values indicated by state transitions, or the addition of the negative polarity thereto) bm_p3b, bm_p2b, bm_P1b, bm_0b, mb_m1b, bm_m2b, and bm_m3b from samples of the output signal Φ10 of the adaptive equalization circuit 20. The branch metric calculation circuit 381b informs the path metric calculation circuit 382 of the computed branch metric values bm_p3b to bm_m3b.

The path metric calculation circuit 382 computes a first set of path metric values from the branch metric values bm_p3a to bm_m3a. During the computation of the first set of path metric values, the path metric calculation circuit 32 generates path memory control signals ctl1a, ctl2a, ctl3a, and ctl4a. The path metric calculation circuit 382 outputs the generated path memory control signals ctl1a-ctl4a to the path memory calculation circuit 383. In addition, the path metric calculation circuit 382 computes a second set of path metric values from the branch metric values bm_p3b to bm_m3b. During the computation of the second set of path metric values, the path metric calculation circuit 32 generates path memory control signals ctl1b, ctl2b, ctl3b, and ctl4b. The path metric calculation circuit 382 outputs the generated path memory control signals ctl1b-ctl4b to the path memory calculation circuit 383.

The path memory calculation circuit 383 recovers original odd-sample data Φ11 in response to the path memory control signals ctl1a-ctl4a and ctl1b-ctl4b. The path memory calculation circuit 383 outputs the recovered original odd-sample data Φ11. In addition, the path memory calculation circuit 383 recovers original even-sample data Φ12 in response to the path memory control signals ctl1a-ctl4a and ctl1b-ctl4b. The path memory calculation circuit 383 outputs the recovered original even-sample data Φ12.

Figure 42:
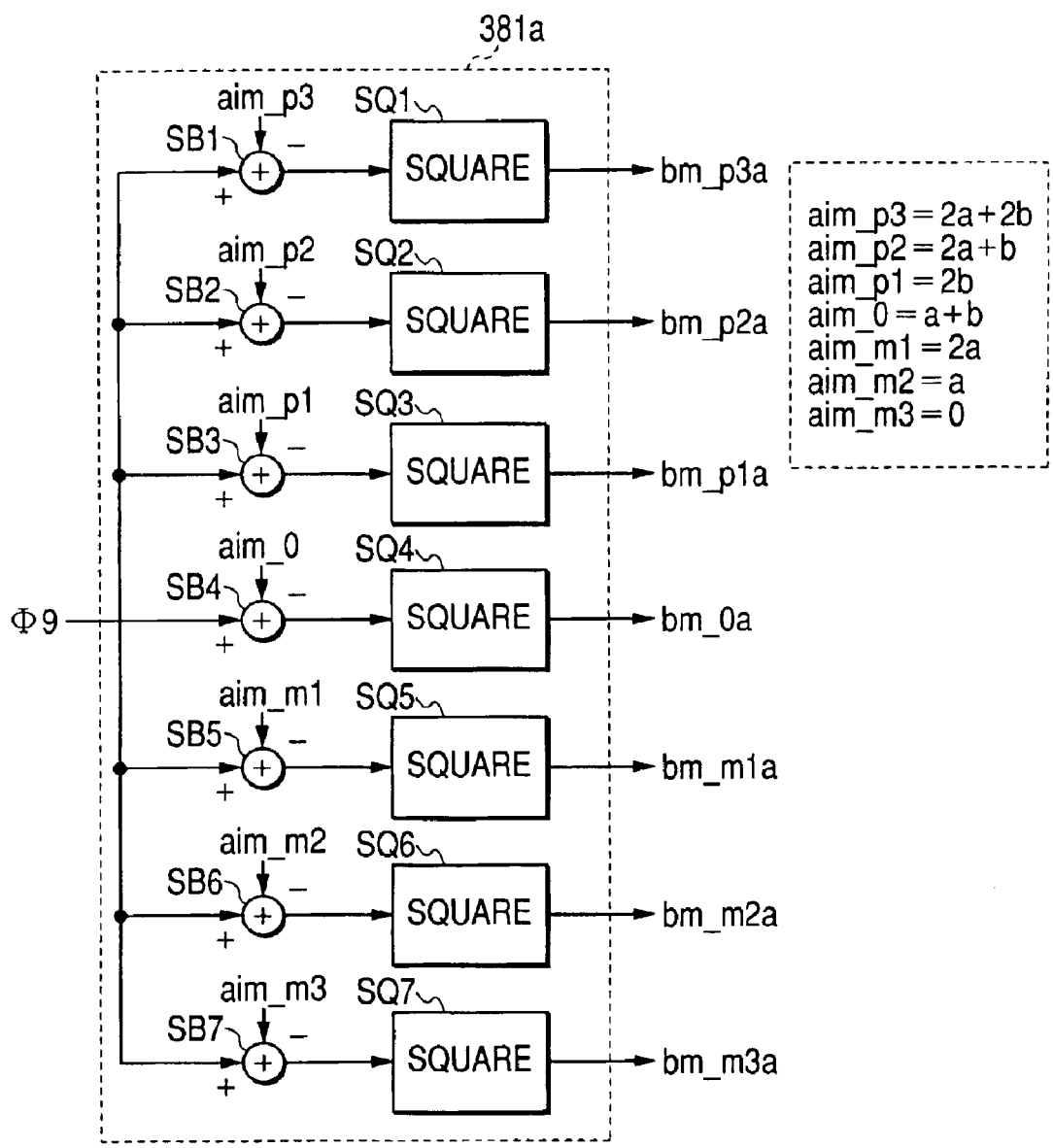
FIG. 42 is a block diagram of a branch metric calculation circuit in FIG. 41.

The branch metric calculation circuits 381a and 381b are similar to each other. Only the branch metric calculation circuit 381b will be explained below in detail. As shown in FIG. 42, the branch metric calculation circuit 381a includes subtracters SB1, SB2, SB3, SB4, SB5, SB6, and SB7, and calculators SQ1, SQ2, SQ3, SQ4, SQ5, SQ6, and SQ7. The device SB1 subtracts a prescribed value aim_p3, which is equal to the input value "2a+2b" in FIG. 11, from the value represented by the equalization-resultant odd-sample signal Φ9. The subtracter SB1 informs the calculator SQ1 of the subtraction result. The calculator SQ1 squares the subtraction result to get the branch metric value bm_p3a. The calculator SQ1 outputs a signal representative of the branch metric value bm_p3a. The device SB2 subtracts a prescribed value aim_p2, which is equal to the input value "2a+b" in FIG. 11, from the value represented by the equalization-resultant odd-sample signal Φ9. The subtracter SB2 informs the calculator SQ2 of the subtraction result.

The calculator SQ2 squares the subtraction result to get the branch metric value bm_p2a. The calculator SQ2 outputs a signal representative of the branch metric value bm_p2a. The device SB3 subtracts a prescribed value aim_p1, which is equal to the input value "2b" in FIG. 11, from the value represented by the equalization-resultant odd-sample signal Φ9. The subtracter SB3 informs the calculator SQ3 of the subtraction result. The calculator SQ3 squares the subtraction result to get the branch metric value bm_p1a. The calculator SQ3 outputs a signal representative of the branch metric value bm_p1a. The device SB4 subtracts a prescribed value aim_0, which is equal to the input value "a+b" in FIG. 11, from the value represented by the equalization-resultant odd-sample signal Φ9. The subtracter SB4 informs the calculator SQ4 of the subtraction result. The calculator SQ4 squares the subtraction result to get the branch metric value bm_0a. The calculator SQ4 outputs a signal representative of the branch metric value bm_0a. The device SB5 subtracts a prescribed value aim_m1, which is equal to the input value "2a" in FIG. 11, from the value represented by the equalization-resultant odd-sample signal Φ9. The subtracter SB5 informs the calculator SQ5 of the subtraction result. The calculator SQ5 squares the subtraction result to get the branch metric value bm_m1a. The calculator SQ5 outputs a signal representative of the branch metric value bm_m1a. The device SB6 subtracts a prescribed value aim_m2, which is equal to the input value "a" in FIG. 11, from the value represented by the equalization-resultant odd-sample signal Φ9. The subtracter SB6 informs the calculator SQ6 of the subtraction result. The calculator SQ6 squares the subtraction result to get the branch metric value bm_m2a. The calculator SQ6 outputs a signal representative of the branch metric value bm_m2a. The device SB7 subtracts a prescribed value aim_m3, which is equal to the input value "0" in FIG. 11, from the value represented by the equalization-resultant odd-sample signal Φ9. The subtracter SB7 informs the calculator SQ7 of the subtraction result. The calculator SQ7 squares the subtraction result to get the branch metric value bm_m3a. The calculator SQ7 outputs a signal representative of the branch metric value bm_m3a.

Figure 43:
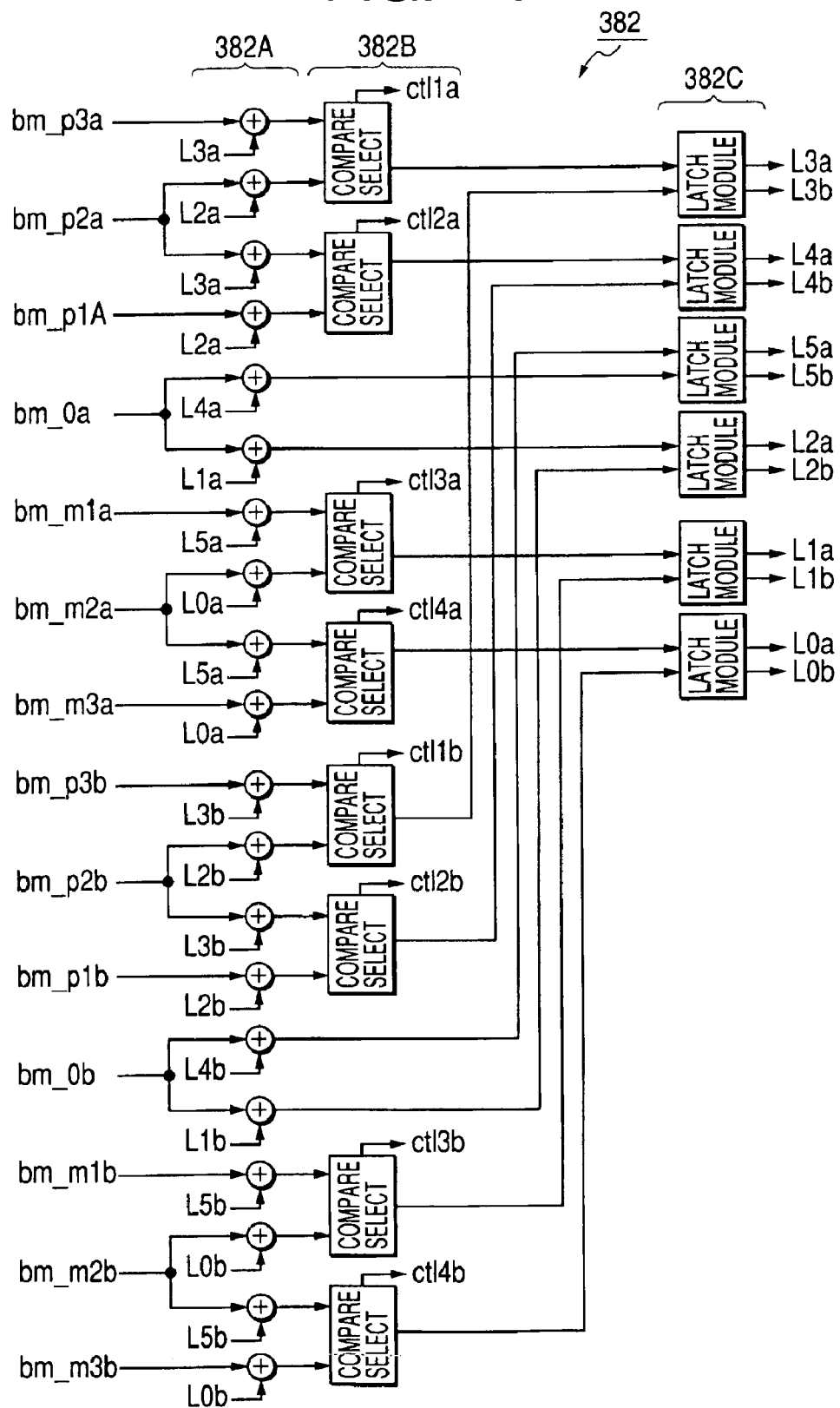
FIG. 43 is a block diagram of a path metric calculation circuit in FIG. 41.

As shown in FIG. 43, the path metric calculation circuit 382 includes an adder array 382A, comparator/selector array 382B, and a latch module array 382C. Each of latch modules in the array 382C has the same structure as that in FIG. 7. The adder array 382A executes additions among the branch metric values bm_p3a, bm_p2a, bm_P1a, bm_0a, mb_m1a, bm_m2a, and bm_m3a, and first path metric values L3a, L4a, L5a, L2a, L1a, and L0a according to the prescribed inter-state paths in FIG. 11. The addition results at the merging points (corresponding to the states S3, S4, S1, and S0 in FIG. 11) are compared by the comparator/selector array 382B, and smaller ones are selected thereby. Signals representative of the selected addition results are inputted into the latch module array 382C before being outputted therefrom as second path metric values L3b, L4b, L5b, L2b, L1b, and L0b. The comparator/selector array 382B generates the path memory control signals ctl1a, ctl2a, ctl3a, and ctl4a representative of information resulting from the previously-mentioned comparisons and selections. Thus, the generated path memory control signals ctl1a, ctl2a, ctl3a, and ctl4a depend on the results of the previously-mentioned comparisons and selections. The comparator/selector array 382B outputs the generated path memory control signals ctl1a-ctl4a. In addition, the adder array 382A executes additions among the branch metric values bm_p3b, bm_p2b, bm_P1b, bm_0b, mb_m1b, bm_m2b, and bm_m3b, and the second path metric values L3b, L4b, L5b, L2b, L1b, and L0b according to the prescribed inter-state paths in FIG. 11. The addition results at the merging points (corresponding to the states S3, S4, S1, and S0 in FIG. 11) are compared by the comparator/selector array 382B, and smaller ones are selected thereby. Signals representative of the selected addition results are inputted into the latch module array 382C before being delayed by one unit data period and being outputted therefrom as the first path metric values L3a, L4a, L5a, L2a, L1a, and L0a. The comparator/selector array 382B generates the path memory control signals ctl1b, ctl2b, ctl3b, and ctl4b representative of information resulting from the previously-mentioned comparisons and selections. Thus, the generated path memory control signals ctl1b, ctl2b, ctl3b, and ctl4b depend on the results of the previously-mentioned comparisons and selections. The comparator/selector array 382B outputs the generated path memory control signals ctl1b–ctl4b.

Figure 44:
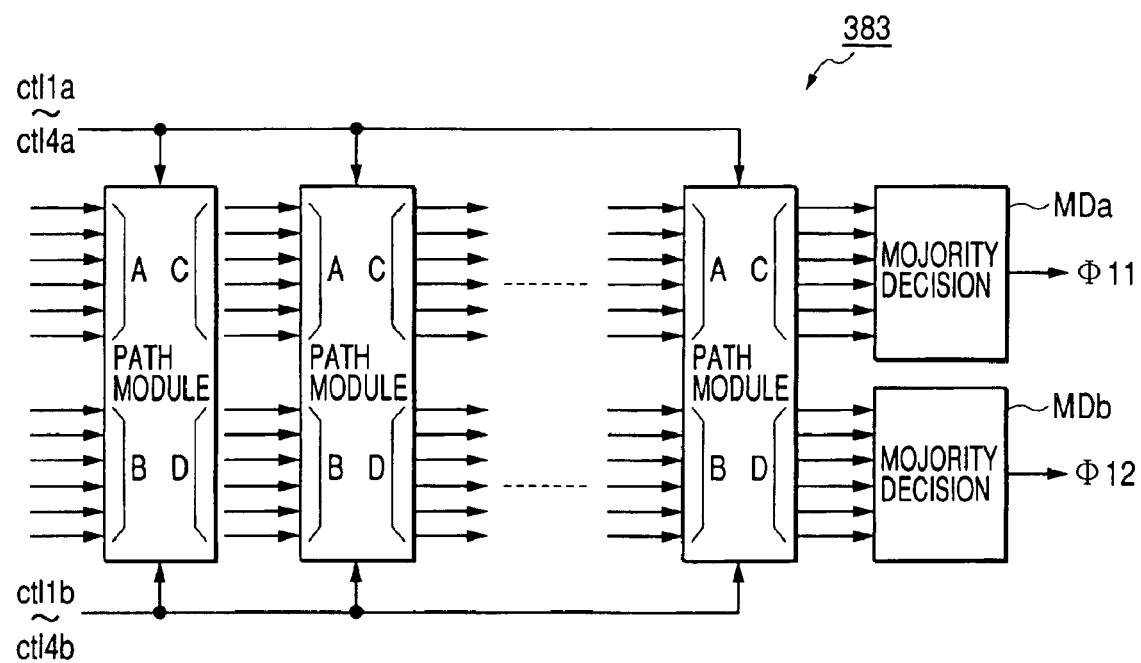
FIG. 44 is a block diagram of a path memory calculation circuit in FIG. 41.

As shown in FIG. 44, the path memory calculation circuit 383 includes path modules, and majority decision circuits MDa and MDb. The path modules are connected in cascade. Each of the path modules has a first input side "A", a second input side "B", a first output side "C", a second output side "D", and a control terminal array. The path memory control signals ctl1a–ctl4a and ctl1b–ctl4b are applied to the control terminal array of each of the path modules. Signals representative of fixed values are applied to the first and second input sides "A" and "B" of the first path module. The first output side "C" of the first path module is connected to the first input side "A" of the second path module while the second output side "D" of the first path module is connected to the second input side "B" of the second path module. Similarly, the second and later path modules are connected. The first output side "C" of the final path module is connected to the majority decision circuit MDa while the second output side "D" thereof is connected to the majority decision circuit MDb. The fixed-value signals propagate through the latch modules while undergoing selection responsive to the path memory control signals ctl1a–ctl4a and ctl1b–ctl4b, latching, and matrixing. The circuit MDa decides the majority among the values represented by the signals outputted from the final path module via the first output side "C" thereof. The circuit MDa outputs a signal representative of the decided majority as the recovered original odd-sample data Φ11. The circuit MDb decides the majority among the values represented by the signals outputted from the final path module via the second output side "D" thereof. The circuit MDb outputs a signal representative of the decided majority as the recovered original even-sample data Φ12.

Figure 45:
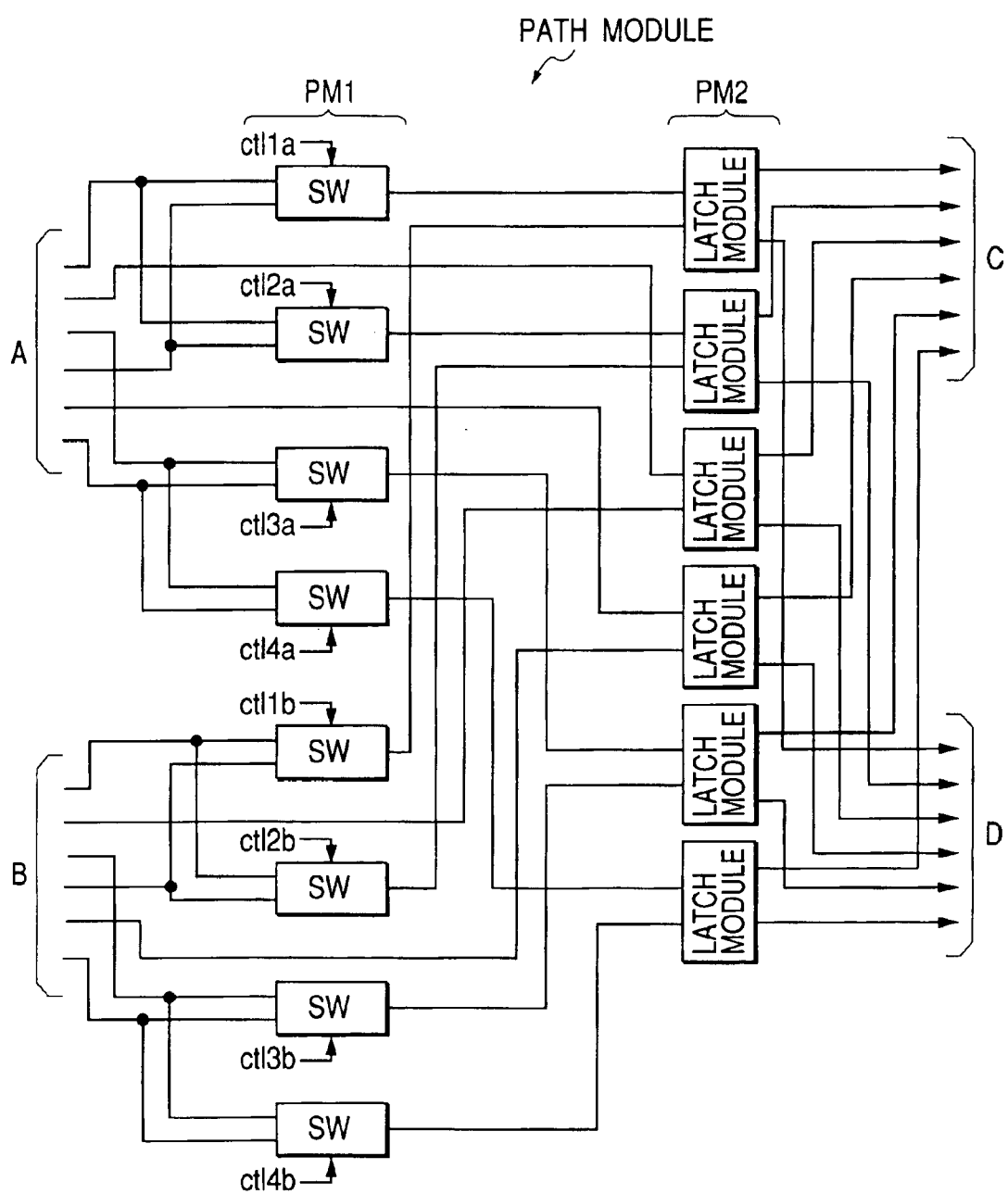
FIG. 45 is a block diagram of a path module in FIG. 44.

The path modules are similar in structure. One path module will be explained below in detail. As shown in FIG. 45, a path module includes a switch array PM1 and a latch module array PM2. The switch array PM1 selects ones from signals received via the input sides "A" and "B" in response to the path memory control signals ctl1a–ctl4a and ctl1b–ctl4b. The selected signals are paired, being fed to the latch module array PM2. Each of latch modules in the array PM2 has the same structure as that in FIG. 7. The selected signals are latched by the latch module array PM2 and propagate therethrough before being transmitted via the output sides "C" and "D".

Twenty-third Embodiment

Figure 46:
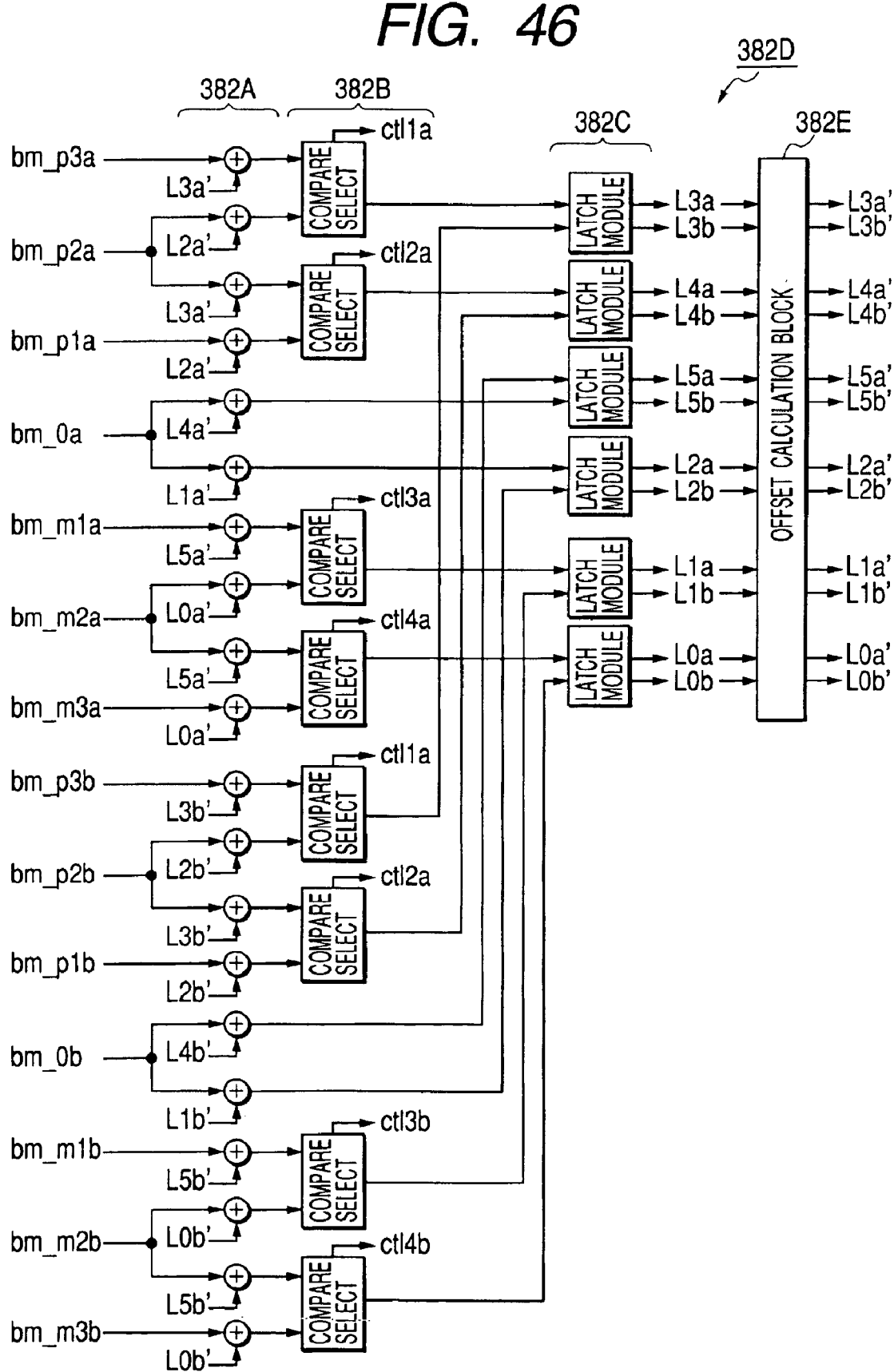
FIG. 46 is a block diagram of a path metric calculation circuit in a twenty-third embodiment of this invention.

A twenty-third embodiment of this invention is similar to the twenty-second embodiment thereof except that a path metric calculation circuit 382D replaces the path metric calculation circuit 382 (see FIG. 43). FIG. 46 shows the path metric calculation circuit 382D. The path metric calculation circuit 382D is modified from the path metric calculation circuit 382 so that an offset calculation block 382E follows the latch module array 382C.

The offset calculation block 382E receives output signals from the latch module array 382C which represent the first path metric values L3a, L4a, L5a, L2a, L1a, and L0a, and the second path metric values L3b, L4b, L5b, L2b, L1b, and L0b. The offset calculation block 382E subtracts offset values from the path metric values L3a, L4a, L5a, L2a, L1a, L0a, L3b, L4b, L5b, L2b, L1b, and L0b to get new path metric values L3a', L4a', L5a', L2a', L1a', L0a', L3b', L4b', L5b', L2b', L1b', and L0b' provided that specified conditions are satisfied. The adder array 382A executes additions among the branch metric values bm_p3a, bm_p2a, bm_P1a, bm_0a, mb_m1a, bm_m2a, and bm_m3a, and the new path metric values L3a', L4a', L5a', L2a', L1a', and L0a'. In addition, the adder array 382A executes additions among the branch metric values bm_p3b, bm_p2b, bm_P1b, bm_0b, mb_m1b, bm_m2b, and bm_m3b, and the new path metric values L3b', L4b', L5b', L2b', L1b', and L0b'.

Specifically, the offset calculation block 382E subtracts an offset value fs1 from the path metric value L3a to get the new path metric value L3a'. The offset calculation block 382E subtracts the offset value fs1 from the path metric value L4a to get the new path metric value L4a'. The offset calculation block 382E subtracts the offset value fs1 from the path metric value L5a to get the new path metric value L5a'. The offset calculation block 382E subtracts the offset value fs1 from the path metric value L2a to get the new path metric value L2a'. The offset calculation block 382E subtracts the offset value fs1 from the path metric value L1a to get the new path metric value L1a'. The offset calculation block 382E subtracts the offset value fs1 from the path metric value L0a to get the new path metric value L0a'. The offset calculation block 382E subtracts an offset value fs2 from the path metric value L3b to get the new path metric value L3b'. The offset calculation block 382E subtracts the offset value fs2 from the path metric value L4b to get the new path metric value L4b'. The offset calculation block 382E subtracts the offset value fs2 from the path metric value L5b to get the new path metric value L5b'. The offset calculation block 382E subtracts the offset value fs2 from the path metric value L2b to get the new path metric value L2b'. The offset calculation block 382E subtracts the offset value fs2 from the path metric value L1b to get the new path metric value L1b'. The offset calculation block 382E subtracts the offset value fs2 from the path metric value L0b to get the new path metric value L0b'.

As shown in FIG. 47, the offset calculation block 382E includes offset calculation circuits 382F and 382G. The offset calculation circuit 382F compares a preset threshold value with the first path metric values L3a, L4a, L5a, L2a, L1a, and L0a. When all the first path metric values L3a, L4a, L5a, L2a, L1a, and L0a exceed the preset threshold value, the offset calculation circuit 382F sets the offset value fs1 to the preset threshold value. Otherwise, the offset calculation circuit 382F sets the offset value fs1 to "0". As previously mentioned, the offset value fs1 is subtracted from the first path metric values L3a, L4a, L5a, L2a, L1a, and L0a to get the new path metric values L3a', L4a', L5a', L2a', L1a', and L0a'. The offset calculation circuit 382G compares the preset threshold value with the second path metric values L3b, L4b, L5b, L2b, L1b, and L0b. When all the second path metric values L3b, L4b, L5b, L2b, L1b, and L0b exceed the preset threshold value, the offset calculation circuit 382G sets the offset value fs2 to the preset threshold value. Otherwise, the offset calculation circuit 382F sets the offset value fs2 to "0". As previously mentioned, the offset value fs2 is subtracted from the second path metric values L3b, L4b, L5b, L2b, L1b, and L0b to get the new path metric values L3b', L4b', L5b', L2b', L1b', and L0b'.

Only one of the offset values fs1 and fs2 may be used in generating the new path metric values L3a', L4a', L5a', L2a', L1a', and L0a' and the new path metric values L3b', L4b', L5b', L2b', L1b', and L0b'. The set of the first path metric values L3a, L4a, L5a, L2a, L1a, and L0a and the set of the second path metric values L3b, L4b, L5b, L2b, L1b, and L0b may be exchanged in connection with the offset values fs1 and fs2.

Twenty-fourth Embodiment

Figure 48:
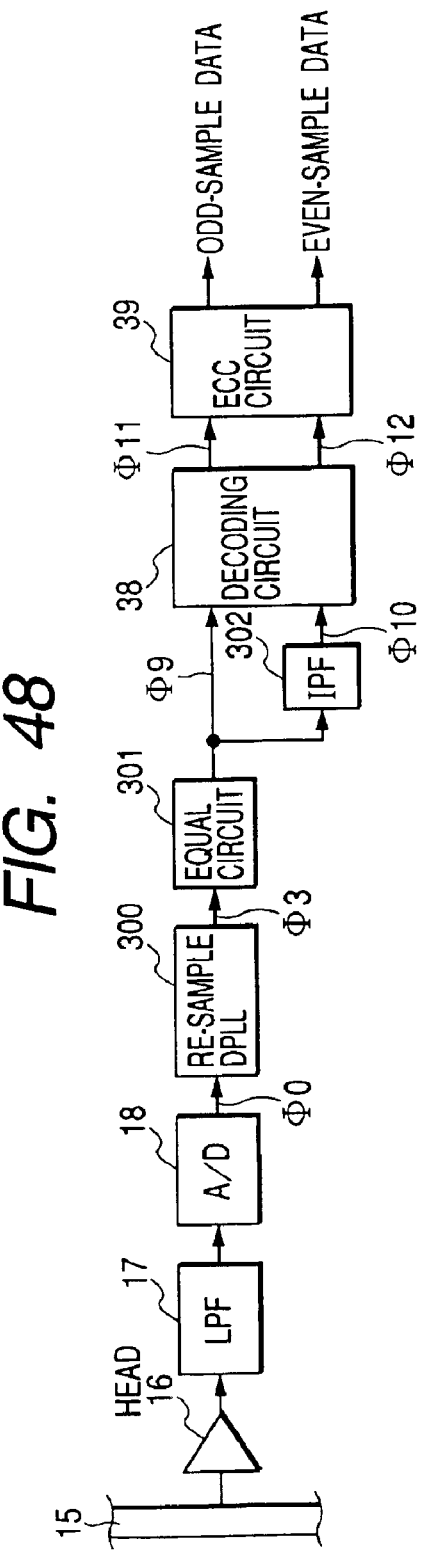
FIG. 48 is a block diagram of a reproducing apparatus according to a twenty-fourth embodiment of this invention.

FIG. 48 shows a reproducing apparatus according to a twenty-fourth embodiment of this invention. The reproducing apparatus of FIG. 48 is similar to that of FIG. 1 or FIG. 22 except that a re-sampling DPLL section 300, an equalization circuit 301, and an interpolation filter 302 replace the re-sampling DPLL section 19 and the adaptive equalization circuit 20 or the re-sampling DPLL section 19A and the adaptive equalization circuit 30. The re-sampling DPLL section 300 is basically similar to the re-sampling DPLL section 19 or 19A. The re-sampling DPLL section 300 outputs only the odd-sample signal Φ3 to the equalization circuit 301.

The equalization circuit 301 has a known structure including a transversal filter. The equalization circuit 301 subjects the odd-sample signal Φ3 to equalization to get the equalization-resultant odd-sample signal Φ9. The equalization circuit 301 outputs the equalization-resultant odd-sample signal Φ9 to the decoding circuit 38 and the interpolation filter 302. The interpolation filter 302 estimates the equalization-resultant even-sample signal Φ10 from the equalization-resultant odd-sample signal Φ9 through interpolation. The interpolation filter 302 outputs the equalization-resultant even-sample signal Φ10 to the decoding circuit 38.

The re-sampling DPLL section 300 may output only the even-sample signal Φ4 to the equalization circuit 301. In this case, the equalization circuit 301 outputs the equalization-resultant even-sample signal Φ10 to the decoding circuit 38 and the interpolation filter 302, and the interpolation filter 302 outputs the equalization-resultant odd-sample signal Φ9 to the decoding circuit 38.

Twenty-fifth Embodiment

Figure 49:
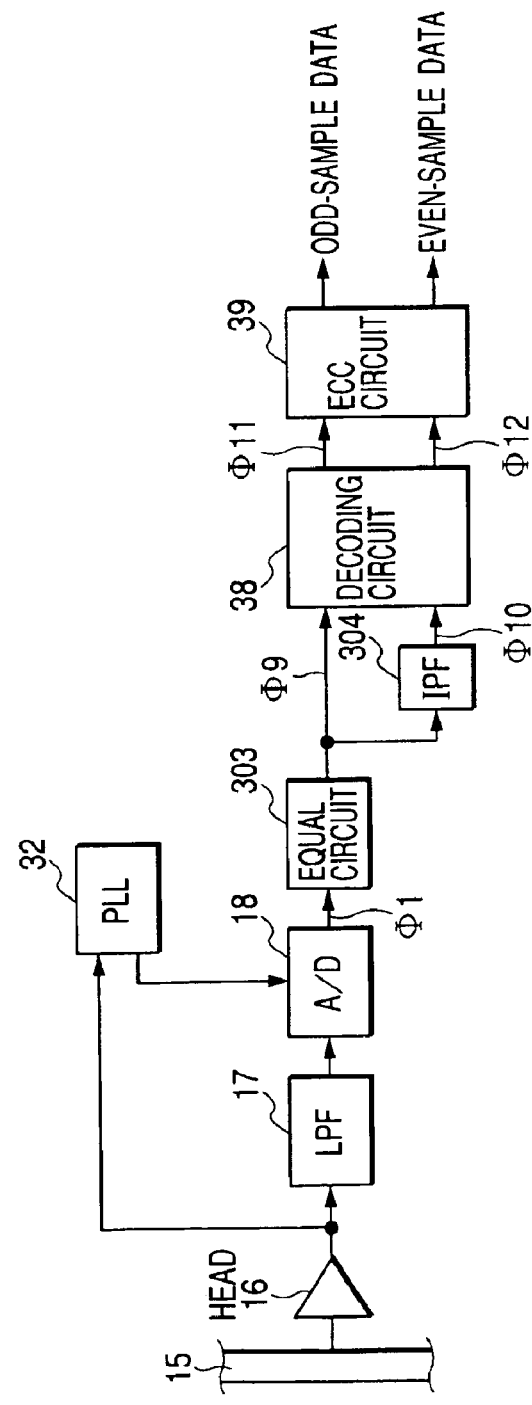
FIG. 49 is a block diagram of a reproducing apparatus according to a twenty-fifth embodiment of this invention.

FIG. 49 shows a reproducing apparatus according to a twenty-fifth embodiment of this invention. The reproducing apparatus of FIG. 49 is similar to that of FIG. 25 except that an equalization circuit 303 and an interpolation filter 304 replace the interpolation filter 33, the delay and zero detection circuit 34, and the adaptive equalization circuit 20.

The equalization circuit 303 receives the first 0°-phase-sample signal Φ1 from the A/D converter 18. The equalization circuit 303 has a known structure including a transversal filter. The equalization circuit 303 subjects the first 0°-phase-sample signal Φ1 to equalization to get the equalization-resultant odd-sample signal Φ9. The equalization circuit 303 outputs the equalization-resultant odd-sample signal Φ9 to the decoding circuit 38 and the interpolation filter 304. The interpolation filter 304 estimates the equalization-resultant even-sample signal Φ10 from the equalization-resultant odd-sample signal Φ9 through interpolation. The interpolation filter 304 outputs the equalization-resultant even-sample signal Φ10 to the decoding circuit 38.

What is claimed is:

1. A reproducing apparatus comprising:
    first means for reproducing a signal of a run-length-limited code from a recording medium;
    second means for sampling the signal reproduced by the first means to generate a sampling-resultant signal;
    third means for generating an odd-sample signal and an even-sample signal in response to the sampling-resultant signal generated by the second means;
    a first transversal filter subjecting the odd-sample signal generated by the third means to first partial-response waveform equalization to generate an equalization-resultant odd-sample signal, the first partial-response waveform equalization depending on first tap coefficients;
    a second transversal filter subjecting the even-sample signal generated by the third means to second partial-response waveform equalization to generate an equalization-resultant even-sample signal, the second partial-response waveform equalization depending on second tap coefficients;
    a first temporary decision device for calculating a temporary decision value of the equalization-resultant odd-sample signal generated by the first transversal filter;
    a first subtracter for calculating a first difference between the temporary decision value of the equalization-resultant odd-sample signal and an actual value thereof, and generating a first error signal in response to the calculated first difference;
    a second temporary decision device for calculating a temporary decision value of the equalization-resultant even-sample signal generated by the second transversal filter;
    a second subtracter for calculating a second difference between the temporary decision value of the equalization-resultant even-sample signal and an actual value thereof, and generating a second error signal in response to the calculated second difference;
    fourth means for controlling the first tap coefficients of the first transversal filter in response to the first error signal generated by the first subtracter;
    fifth means for controlling the second tap coefficients of the second transversal filter in response to the second error signal generated by the second subtracter;
    a first decoder for decoding the equalization-resultant odd-sample signal generated by the first transversal filter; and
    a second decoder for decoding the equalization-resultant even-sample signal generated by the second transversal filter.

2. A reproducing apparatus as recited in claim 1, wherein the fourth means and the fifth means comprise means for calculating first basic coefficients in response to the first error signal, means for calculating second basic coefficients in response to the second error signal, means for averaging the calculated first basic coefficients and the calculated second basic coefficients into average tap coefficients, and means for using the average tap coefficients as the first tap coefficients of the first transversal filter and also the second tap coefficients of the second transversal filter.

3. A reproducing apparatus as recited in claim 1, further comprising:
    sixth means for detecting whether or not a combination of the odd-sample signal and the even-sample signal generated by the third means corresponds to a zero-cross point, and generating 0-point information in response to a result of said detecting, the generated 0-point information including a first 0-point information signal relating to the odd-sample signal and a second 0-point information signal relating to the even-sample signal;

a delay circuit for delaying the first and second 0-point information signals by different time intervals to generate a first set of at least three successive 0-point information samples and a second set of at least three successive 0-point information samples;

seventh means in the first temporary decision device for calculating the temporary decision value of the equalization-resultant odd-sample signal on the basis of a PR mode signal, an RLL mode signal, the first set of the successive 0-point information samples, and the actual value of the equalization-resultant odd-sample signal, the PR mode signal representing a type of the first partial-response waveform equalization and the second partial-response waveform equalization, the RLL mode signal representing a type of the run-length-limited code; and eighth means in the second temporary decision device for calculating the temporary decision value of the equalization-resultant even-sample signal on the basis of the PR mode signal, the RLL mode signal, the second set of the successive 0-point information samples, and the actual value of the equalization-resultant even-sample signal.

4. A reproducing apparatus as recited in claim 1, further comprising:

sixth means for detecting whether or not a combination of the equalization-resultant odd-sample signal generated by the first transversal filter and the equalization-resultant even-sample signal generated by the second transversal filter corresponds to a zero-cross point, and generating 0-point information in response to a result of said detecting, the generated 0-point information including a first 0-point information signal relating to the equalization-resultant odd-sample signal and a second 0-point information signal relating to the equalization-resultant even-sample signal;

a delay circuit for delaying the first and second 0-point information signals by different time intervals to generate a first set of at least three successive 0-point information samples and a second set of at least three successive 0-point information samples;

seventh means in the first temporary decision device for calculating the temporary decision value of the equalization-resultant odd-sample signal on the basis of a PR mode signal, an RLL mode signal, the first set of the successive 0-point information samples, and the actual value of the equalization-resultant odd-sample signal, the PR mode signal representing a type of the first partial-response waveform equalization and the second partial-response waveform equalization, the RLL mode signal representing a type of the run-length-limited code; and eighth means in the second temporary decision device for calculating the temporary decision value of the equalization-resultant even-sample signal on the basis of the PR mode signal, the RLL mode signal, the second set of the successive 0-point information samples, and the actual value of the equalization-resultant even-sample signal.

5. A reproducing apparatus as recited in claim 3, wherein at least one of the PR mode signal and the RLL mode signal remains fixed.

6. A reproducing apparatus as recited in claim 3, wherein the second means, the third means, and the sixth means comprise:

an A/D converter for periodically sampling the signal reproduced by the first means in response to a system clock signal, and converting a result of said sampling into a digital reproduced signal;

re-sampling means for re-sampling the digital reproduced signal in response to a bit clock signal to generate the odd-sample signal and the even-sample signal; and detecting means for detecting whether or not a combination of the odd-sample signal and the even-sample signal generated by the re-sampling means corresponds to a zero-cross point, and generating 0-point information in response to a result of said detecting, the generated 0-point information including the first 0-point information signal relating to the odd-sample signal and the second 0-point information signal relating to the even-sample signal.

7. A reproducing apparatus as recited in claim 3, wherein the type of the partial-response waveform equalization which is represented by the PR mode signal is expressed as PR (a, b, b, a), and the first set is of three successive 0-point information samples while the second set is of three successive 0-point information samples, and wherein each of the first and second temporary decision devices comprises means for calculating a value P on the basis of the related set of the three successive 0-point information samples, the value P being equal to $(a+b)^* \cdot G$ when none of the three successive 0-point information samples corresponds to a zero-cross point, the value P being equal to $(b-a)^* \cdot G$ when each of the three successive 0-point information samples except a central sample corresponds to a zero-cross point and a minimum transition interval represented by the RLL mode signal is equal to "2", the value P being equal to $b^* \cdot G$ when each of the three successive 0-point information samples except a central sample corresponds to a zero-cross point and the minimum transition interval represented by the RLL mode signal is not equal to "2", the value P being equal to $b^* \cdot G$ when only one of the three successive 0-point information samples except a central sample corresponds to a zero-cross point, means for calculating the related temporary decision value on the basis of the calculated value P, and means for setting the related temporary decision value equal to "0" when the central sample among the three successive 0-point information samples corresponds to a zero-cross point, where "*" denotes related values resulting from offset to equalize a central value (a+b) to "0", and G denotes a gain factor.

8. A reproducing apparatus as recited in claim 3, wherein the type of the partial-response waveform equalization which is represented by the PR mode signal is expressed as PR (a, b, b, a), and the first set is of five successive 0-point information samples while the second set is of five successive 0-point information samples, and wherein each of the first and second temporary decision devices comprises means for calculating a value P on the basis of the related set of the five successive 0-point information samples, the value P being equal to $(a+b)^* \cdot G$ when none of second, third, and fourth samples among the five successive 0-point information samples corresponds to a zero-cross point, the value P being equal to $(b-a)^* \cdot G$ when only second and fourth samples among the five successive 0-point information samples correspond to zero-cross points and a minimum transition interval represented by the RLL mode signal is equal to "2", the value P being equal to $b^* \cdot G$ when only second and fourth samples among the five successive 0-point information samples correspond to zero-cross points and the minimum transition interval represented by the RLL mode signal is not equal to "2", the value P being equal to b*·G when only one of second and fourth samples among the five successive 0-point information samples corresponds to a zero-cross point, the value P being equal to b*·G when only first and fourth samples among the five successive 0-point information samples corresponds to a zero-cross point, the value P being equal to b*·G when only second and fifth samples among the five successive 0-point information samples corresponds to a zero-cross point, means for calculating the related temporary decision value on the basis of the calculated value P, and means for setting the related temporary decision value equal to "0" when a central sample among the five successive 0-point information samples corresponds to a zero-cross point, where "*" denotes related values resulting from offset to equalize a central value (a+b) to "0", and G denotes a gain factor.

9. A decoding apparatus comprising:

first means for sampling an input signal to generate a sampling-resultant signal;

second means for generating an odd-sample signal and an even-sample signal in response to the sampling-resultant signal generated by the first means;

third means for calculating first branch metric values in response to the odd-sample signal generated by the second means;

fourth means for calculating second branch metric values in response to the even-sample signal generated by the second means;

fifth means for adding the first branch metric values and first path metric values, comparing results of said adding, and selecting ones from said results of said adding in response to results of said comparing to calculate second path metric values and to generate first path memory control signals which depend on said results of said adding and results of said selecting;

sixth means for adding the second branch metric values and the second path metric values, comparing results of said adding, and selecting ones from said results of said adding in response to results of said comparing to calculate the first path metric values and to generate second path memory control signals which depend on said results of said adding and results of said selecting; and seventh means for generating decoding-resultant odd-sample data and decoding-resultant even-sample data in response to the first path memory control signals generated by the fifth means and the second path memory control signals generated by the sixth means.

10. A reproducing apparatus as recited in claim 1, wherein the first and second decoders comprise:

sixth means for calculating first branch metric values in response to the equalization-resultant odd-sample signal generated by the first transversal filter;

seventh means for calculating second branch metric values in response to the equalization-resultant even-sample signal generated by the second transversal filter;

eighth means for adding the first branch metric values and first path metric values, comparing results of said adding, and selecting ones from said results of said adding in response to results of said comparing to calculate second path metric values and to generate first path memory control signals which depend on said results of said adding and results of said selecting;

ninth means for adding the second branch metric values and the second path metric values, comparing results of said adding, and selecting ones from said results of said adding in response to results of said comparing to calculate the first path metric values and to generate second path memory control signals which depend on said results of said adding and results of said selecting; and tenth means for generating decoding-resultant odd-sample data and decoding-resultant even-sample data in response to the first path memory control signals generated by the eighth means and the second path memory control signals generated by the ninth means.

* * * * *